(12) United States Patent
DeFrancesco et al.

(10) Patent No.: US 7,814,002 B2
(45) Date of Patent: *Oct. 12, 2010

(54) COMPUTER IMPLEMENTED AUTOMATED CREDIT APPLICATION ANALYSIS AND DECISION ROUTING SYSTEM

(75) Inventors: James R. DeFrancesco, Fort Lauderdale, FL (US); Scott L. Freiman, Irvington, NY (US); Arvind K. Agrawal, Gaithersburg, MD (US)

(73) Assignee: DealerTrack, Inc., Lake Success, NY (US)

( * ) Notice: Subject to any disclaimer, the term of this patent is extended or adjusted under 35 U.S.C. 154(b) by 1429 days.

This patent is subject to a terminal disclaimer.

(21) Appl. No.: 10/650,389

(22) Filed: Aug. 28, 2003

(65) Prior Publication Data

US 2004/0138993 A1 Jul. 15, 2004
US 2009/0234769 A9 Sep. 17, 2009

Related U.S. Application Data

(60) Division of application No. 10/441,534, filed on May 20, 2003, which is a division of application No. 09/107,321, filed on Jun. 30, 1998, now Pat. No. 6,587,841, which is a division of application No. 08/526,776, filed on Sep. 12, 1995, now Pat. No. 5,878,403, application No. 10/650,389, and a continuation-in-part of application No. 08/922,462, filed on Sep. 3, 1997, now Pat. No. 7,181,427.

(51) Int. Cl.
G06Q 40/00 (2006.01)

(52) U.S. Cl. .............................. 705/38; 705/35; 705/36; 705/37

(58) Field of Classification Search .................. 705/35, 705/36, 37, 38
See application file for complete search history.

(56) References Cited

U.S. PATENT DOCUMENTS 3,970,992 A 7/1976 Boothroyd et al.
4,017,835 A 4/1977 Randolph (Continued)

FOREIGN PATENT DOCUMENTS

| EP | 0629962 | 12/1994 |
|---|---|---|
| EP | 0 774 725 | 5/1997 |
| EP | 0774725 | 5/1997 |
| JP | 5-101250 | 4/1993 |
| JP | 5101250 | 4/1993 |

OTHER PUBLICATIONS

"Barnett arm links with auto dealers," Bank Systems & Technology, vol. 34, No. 4, printed from Dialog File 268, 2 pages (Apr. 1997).
Eckerson, W., "Network automates auto loan application process; Speeds loan Oks, helps buyers find best rates," Network World, Network World, Inc., available at http://www.lexis.com, 2 pages (Mar. 6, 1989).

(Continued)

Primary Examiner—Nga B. Nguyen
(74) Attorney, Agent, or Firm—Goodwin Procter LLP

(57) ABSTRACT

A credit application and routing system includes a central processor having and executing a program. The system includes data input capabilities for selectively receiving credit application data from respective applicants at remote locations, and routing capabilities for selectively forwarding the credit application data to remote funding sources and selectively forwarding funding decision data from the funding sources to the respective applicants. The computer program includes routines for receiving a credit application from at least one remote application input and display device, for selectively forwarding a received credit application to at least one funding source, for receiving a funding decision from the at least one funding source, and for forwarding a received funding decision to the at least one remote application input and display device. The system can also obtain credit report data from credit bureau, and analyze and summarize the credit report data. A computer readable storage medium has a substrate physically configured to represent the computer program which causes a computer to provide the credit application and routing system.

12 Claims, 49 Drawing Sheets

U.S. PATENT DOCUMENTS

| | | | |
|---|---|---|---|
| 4,491,725 A | 1/1985 | Pritchard | |
| 4,598,367 A | 7/1986 | DeFrancesco et al. | |
| 4,600,828 A | 7/1986 | Nogami et al. | |
| 4,642,768 A | 2/1987 | Roberts | |
| 4,646,250 A | 2/1987 | Childress | |
| 4,648,037 A | 3/1987 | Valentino | |
| 4,649,037 A | 3/1987 | Marsh et al. | |
| 4,649,832 A | 3/1987 | Hain et al. | |
| 4,675,815 A | 6/1987 | Kuroki et al. | |
| 4,683,536 A | 7/1987 | Yamamoto | |
| 4,722,055 A | 1/1988 | Roberts | |
| 4,730,252 A | 3/1988 | Bradshaw | |
| 4,736,294 A | 4/1988 | Gill et al. | |
| 4,752,877 A | 6/1988 | Roberts et al. | |
| 4,772,055 A | 9/1988 | Fang et al. | |
| 4,774,664 A | 9/1988 | Campbell et al. | |
| 4,814,587 A | 3/1989 | Carter | |
| 4,890,228 A | 12/1989 | Longfield | |
| 4,914,587 A | 4/1990 | Clouse | |
| 4,947,028 A | 8/1990 | Gorog | |
| 4,949,028 A | 8/1990 | Brune | |
| 4,958,368 A | 9/1990 | Parker | |
| 4,965,821 A | 10/1990 | Bishop et al. | |
| 4,992,939 A | 2/1991 | Tyler | |
| 5,023,904 A | 6/1991 | Kaplan et al. | |
| 5,025,138 A | 6/1991 | Cuervo | |
| 5,025,373 A | 6/1991 | Keyser, Jr. et al. | |
| 5,049,862 A | 9/1991 | Dao et al. | |
| 5,083,270 A | 1/1992 | Gross et al. | |
| 5,120,906 A | 6/1992 | Protheroe et al. | |
| 5,126,936 A | 6/1992 | Champion et al. | |
| 5,126,939 A | 6/1992 | Carpentier et al. | |
| 5,198,642 A | 3/1993 | Deniger | |
| 5,202,825 A | 4/1993 | Miller et al. | |
| 5,202,826 A | 4/1993 | McCarthy | |
| 5,206,803 A | 4/1993 | Vitagliano | |
| 5,212,789 A | 5/1993 | Rago | |
| 5,213,571 A | 5/1993 | Fujio et al. | |
| 5,218,539 A | 6/1993 | Elphick et al. | |
| 5,220,501 A | 6/1993 | Lawlor et al. | |
| 5,231,571 A | 7/1993 | D'agostino | |
| 5,239,462 A * | 8/1993 | Jones et al. | 705/38 |
| 5,241,620 A | 8/1993 | Ruggiero | |
| 5,262,941 A | 11/1993 | Saladin et al. | |
| 5,274,547 A | 12/1993 | Zoffel et al. | |
| 5,287,268 A | 2/1994 | McCarthy | |
| 5,297,202 A | 3/1994 | Kapp et al. | |
| 5,301,320 A | 4/1994 | McAtee et al. | |
| 5,361,201 A | 11/1994 | Jost et al. | |
| 5,369,570 A | 11/1994 | Parad | |
| 5,383,113 A | 1/1995 | Kight et al. | |
| 5,537,315 A | 7/1996 | Mitcham | |
| 5,559,895 A | 9/1996 | Lee et al. | |
| 5,576,951 A | 11/1996 | Lockwood | |
| 5,604,341 A | 2/1997 | Grossi et al. | |
| 5,611,052 A * | 3/1997 | Dykstra et al. | 705/38 |
| 5,627,978 A | 5/1997 | Altom et al. | |
| 5,699,527 A * | 12/1997 | Davidson | 705/38 |
| 5,734,837 A | 3/1998 | Flores et al. | |
| 5,744,882 A | 4/1998 | Teshima et al. | |
| 5,774,882 A | 6/1998 | Keen et al. | |
| 5,774,883 A * | 6/1998 | Andersen et al. | 705/38 |
| 5,794,133 A | 8/1998 | Kashima | |
| 5,797,133 A | 8/1998 | Jones et al. | |
| 5,867,799 A | 2/1999 | Lang et al. | |
| 5,870,721 A | 2/1999 | Norris | |
| 5,878,403 A | 3/1999 | DeFrancesco et al. | |
| 5,893,128 A | 4/1999 | Nauckhoff | |
| 5,930,776 A | 7/1999 | Dykstra et al. | |
| 5,940,811 A | 8/1999 | Norris | |
| 5,940,812 A | 8/1999 | Tengel et al. | |
| 5,940,829 A | 8/1999 | Tsuiki et al. | |
| 5,950,169 A | 9/1999 | Borghesi et al. | |
| 5,960,404 A | 9/1999 | Chaar et al. | |
| 5,966,699 A | 10/1999 | Zandi | |
| 5,974,392 A | 10/1999 | Endo | |
| 6,014,645 A | 1/2000 | Cunningham | |
| 6,029,149 A | 2/2000 | Dykstra et al. | |
| 6,105,007 A | 8/2000 | Norris | |
| 6,135,349 A | 10/2000 | Zirkel | |
| 6,135,399 A | 10/2000 | Savoie et al. | |
| 6,233,566 B1 | 5/2001 | Levine et al. | |
| 6,385,594 B1 | 5/2002 | Lebda et al. | |
| 6,603,487 B1 * | 8/2003 | Bennett et al. | 715/751 |
| 6,611,052 B2 | 8/2003 | Poo et al. | |
| 7,181,427 B1 * | 2/2007 | DeFrancesco et al. | 705/38 |

OTHER PUBLICATIONS

Berzof, Ken, "Kiosk Issues Bank Cards for Those Dashing Through Dough," The Courier-Journal, vol. 269, No. 155, p. 12, Dec. 2, 1989.
Capstone Decision Manager: Application Decision Management, HNC Software, 28 pages, Publication date unknown. (Missing pp. 8, 12, 22 and 28).
"Car loans in minutes," Bank Management, Bank Administration Institute, vol. 69, No. 4, Apr. 1993, p. A23.
E-mail Message from Michael J. McEnvoy, Tower Group, to Dennis Warnke, CMSINC, Nov. 5, 1998, 3 pages.
Evans, Steve, "No Longer Processing Just Plastic," SNL Securities, Jan. 2000, pp. 39-40.
Lawrence, Jeannette, "(Part 1 of 3) Untangling Neural Nets (When is one model better than another?)," Dr. Dobbs Journal, Miller Freeman Inc., Apr. 1990, 3 pages, printed from Internet (http address unclear).
Marjanovic, Steven, "Investors Shrink as Fair, Isaac Grows," 1 page, Publication date and source unknown.
Product Description: StrategyWare.RTM. Version 1.2, Fair, Isaac and Company, Incorporated, 1998, 60 pages. (Missing pp. 44 & 48).
RiskWise Products and Services, 2 page brochure, Publication date and source unknown.
RiskWise Technology Overview, 4 page brochure, Publication date and source unknown.
"Atlanta-based COIN Banking Systems signs alliance with NCR for credit authorization solution," Business Wire, Business Wire, Inc., Apr. 3, 1991.
Jason, Rich, "Software;for loan processing;col.," Mortgage Banking, Mortgage Association of America, vol. 50, No. 11, Aug. 1990.
Joe Kolman, Ten Technologies Ahead of the Curve, Institutional Investor, vol. 24, No. 16, pp. 123-124, Dec. 1990.
"Application Processing for Credit Programs," The Magazine of Bank Management, Bank Administrative Institute, p. 75, Nov. 1988.
Bill Atkinson, "Columbia Firm Helps Banks Ring Up Loans on Telephones," Baltimore Business Journal, Baltimore Business Publications, Inc., vol. 6, No. 19, Sec. 2, p. 7B, Oct. 17, 1988.
Patrick Haverson, A man with Grand Visions, Banking Technology, pp. 30-32, dated May 1993.
Richard Read, Crossing the Track to Success, Euromoney, p. 177-180, Jun. 1988.
Anonymous, MortgageWare Resource guide, Interlinq Software Corp, Nov. 1992.
David O. Tyson, Interlinq Mortgage Software Hits Big Time with Prudential Real Estate Subsidiary Deal, American Banker, p. 12, Nov. 18, 1987.
Harry S. Wortmann, "Re-Engineering Update: Where Banks are Going to Fit Along the Information Highway," American Banker, p. 7, vol. 159, No. 98, May 23, 1994.
Conroy, Bill, "Citicorp test-markets device that simplifies home banking," The Business Journal, p. 16, Oct. 29, 1990.
Day, Kathleen, "Cutting Corners at the Kiosk: New services Widen Use of Electronic Devices," The Washington Post, Jul. 22, 1994, p. A1.
Fortunato, Laura, "Loan Lending Magic," Winter 1996/97, vol. 13, No. 4, p. 12-15.

Jost, Allen, "Neural Networks: A logical progression in credit and marketing decision systems," Credit World, International Credit Association, Mar./Apr. 1993, p. 26-33.

Kantrow, Yvette D., "Electronic Network Will Link Car Dealers to Many Lenders: Goal is to Create a Form of EFT Transfer System," American Banker Weekly Review, Feb. 8, 1988, p. 5 & 10.

Karson, Daniel, "Tactical Field Strategies to Trace and Recover Assets in the United States," A practical Guide to Asset Tracing and Recovery: Sure-Fire Strategies to turn hollow judgements into Litigation Victories, The Canadian Institute, Section VII, p. 1-22, Apr. 3 & 4, 1997.

McCall, William, "Microsoft, Banks Team Up to Provide Home Banking," Associated Press, Aug. 3, 1994.

Radding, Alan, "A View of Technology in '92," Bank Management, Bank Administration Institute, p. 28-35, Jan. 1992.

Sugawara, Sandra, "Stocking Up at the ATM: Citibank Machines to Allow Customers to Trade Shares," The Washington Post, Oct. 6, 1994, p. D11.

Thornton, Emily, "Going Belly-up in Japan: Bankruptcies are soaring as consumers binge on borrowing," Business Week, The McGraw-Hill Companies, Inc., p. 54, May 5, 1997.

Wilmsen, Steven, "Home-banking service adding Denver to financial network," The Denver Post, p. A-2, Jun. 8, 1989.

"New Paradigms in Retail Banking: The RDS Report on the Future of Retail Banking Delivery," Bank Administrative Institute, 88 Pages, 1994.

Barchard, David, "Cautious mortgage lenders redo their sums," Financial Times, Weekend Jun. 20/Jun. 21, 1992.

Fix, Janet L., "Shopping list: Car loan, canned corn," USA Today, Jul. 20, 1994, p. 68. "Interactive Banking Gets a Push Up North," Bank Systems and Technology, Mill Freeman, Inc., Mar. 1994, p. 6.

Rothfeder, Jeffrey, "Electronic Bill-Paying for the Little Guy," Business Week, McGraw-Hill, Sep. 25, 1989.

Tauhert, Christy, "Commerce Branches off into PC Banking," Bank Systems and Technology, Miller Freeman, vol. 33, No. 4, p. 34-35, Apr. 1996.

Anonymous, "Car Loans in Minutes," Bank Management,v69n4, pp. A23, Apr. 1993, ISSN: 1049-1775.

"Re-Engineering Update: Where Banks are Going to Fit Along the Information Highway," American Banker, p. 7, vol. 159, No. 98, Apr. 1994.

"Barnett arm links with auto dealers", Bank Systems & Technology, v34, n4, p. 14, Apr. 1997.

Baljko, Jennifer, "Automated review system drives BB&T's subprime loan business". Bank Systems & Technology, v34, n7, p. 62, Jul. 1997.

"The Lure of the subprime", Automotive News, n 5673, p. Ii, Aug. 12, 1996.

"Opportunities, Obstacles in Suprime Loan Market", Credit Risk Management Report, Feb. 26, 1996, vol. 6, Issue: 4.

Capstone Decision Manager: Application Decision Management, HNC Software, 28 pages, Publication date unknown. (Missing p. 8, 12, 22, and 28).

Evans, Steve, "No Longer Processing Just Plastic," SNLSecurities, Jan. 2000, pp. 39-40.

Lawrence, Jeanette, "(Part 1 of 3) Untangling Neural Nets (When is one model better than another?)," Dr. Dobbs Journal, Miller Freeman Inc., Apr. 1990, 3 pages, printed from Internet (http address unclear).

Product Description: StrategyWare.RTM. Version 1.2, Fair, Isaac and Company, Incorporated, 1998, 60 pages. (Missing pp. 44 and 48).

Jason, Rich, "Software;for loan processing;column," Mortgage Banking, Mortgage Association of America, vol. 50, No. 11, Aug. 1990.

Joe Kolman, "Ten Technologies Ahead of the Curve," Institutional Investor, vol. 24, No. 16, p. 123-124, Dec. 1990.

Bill Atkinson, "Columbia Firm Helps Banks Ring Up Loans on Telephone," Baltimore Business Journal, Baltimore Business Publications, Inc., vol. 6, No. 19, Sec. 2, p. 7B, Oct. 17, 1988.

Anonymous, MortgageWare Resource guide, Interling Software Corp, Nov. 1992.

David O. Tyson, Interling Mortgage Software Hits Big Time with Prudential Real Estate Subsidiary Deal, American Banker, p. 12, Nov. 18, 1987.

Anonymous, "Barnett arm links with auto dealers," Bank Systems & Technology, Gralla Publications, vol. 34, No. 4, p. 14, Apr. 1997.

Kantrow, Yvette D., "Electronic Network Will Link Car Dealers to Many Lenders: Goal is to Create a Form of EFT Transfer System," American Banker Weekly Review, Feb. 8, 1988, pp. 5 & 10.

Karson, Daniel, "Tactical Field Strategies to Trace and Recover Assets in the United States," A practical Guide to Asset Tracing and Recovery: Sure-Fire Strategies to turn hollow judgements into Litigation Victories, The Canadian Institute, SectionVII, p. 1-22, Apr. 3 & 4, 1997.

Fix, Janet L., "Shopping list: Car loan, canned corn," USA Today, Jul. 20, 1994, p. 68.

"Interactive Banking Gets a Push Up North," Bank Systems and Technology, Mill Freeman, Inc., Mar. 1994, p. 6.

Rothfeder, Jeffrey, "Electronics Bill-Paying for the Little Guy," Business Week, McGraw-Hill, Sep. 25, 1989.

Eckerson, W., Network automates auto loan application process; Speeds loan Oks, helps buyers find best rates, Network World, Network World, Inc., available at http://www.lexis.com, 2 pages. (Mar. 6, 1989).

Factory Communications for Toyota AS/400 Dealerships. Network World.

*DealerTrack* v. *RouteOne* Declaration of Dr. George T. Liger.

*DealerTrack* v. *RouteOne* Memorandum of Claim Construction Concerning Patents 5,878,403 and 6,588,841.

*Dealer Track* v. *RouteOne* GMAC 000001.

RTC002341—COINLink Team Projects.
RTC002303—COINLink Feature/Benefit Analysis.
RTC002240—Business Plan 1987.
RTC002316—Memo re: New Name for COINLink.
RTC002320—Memo Re: New Name for COINLink.
RTC002326—COINLink Meeting May 13, 1988.
RTC002330—Steering Committee handwritten notes.
RTC002331—Preparations for Pilot and Immediately Thereafter.
RTC002334—Tab—Project Statuses.
RTC002335—COINLinks Team Projects.
RTC002337—COINLinks Team Projects.
RTC002340—Memo re: Project Statuses.
RTC092343—COINLinks Team Projects.
RTC002344—COINLinks Team Projects.
RTC002345—COINLinks Team Projects.
RTC002346—COINLinks Team Projects.
RTC002347—COINLinks Team Projects.
RTC002348—COINLinks Team Projects.
RTC002349—COINLinks Team Projects.
RTC002350—COINLinks Team Projects.
RTC002351—COINLinks Team Projects.
RTC002352—COINLinks Team Projects.
RTC002353—COINLinks Team Projects.
RTC002357—Tab—Chrysler.
RTC002358—Memorandum re: Chrysler Credit Funding Program.
RTC002359—Request for Pricing.
RTC002362—Hand written letter to Mr. Nichols Simonds.
RTC002363—Hand written letter to Mr. Nichols Simonds (mirror image).
RTC002364—Chrysler Credit Pilot.
RTC002366—Presentation present to cc Aug. 24, 1989.
RTC002372—Business Cards.
RTC002373—Summary of COIN's Proposal to Chrysler Credit.
RTC002374—The COIN Proposal.
RTC002376—Technical Aspects of Pilot Project.
RTC002377—Chrysler Credit.
RTC002378—Analysis of Chrysler Needs.
RTC002379—Presentation Continued.
RTC002380—Presentation Continued.
RTC002381—Presentation Continued.
RTC002382—Presentation Presented to MIS Aug. 25, 1989.
RTC002383—Visio.
RTC002384—Memorandum re: Summary of notes from phone conversation with Jack Godwin of Chrysler Credit.
RTC002386—Tab EDI Law.
RTC002387—Memorandum re: Marketing of Electronic Services.
RTC002389—Memorandum re: Marketing of electronic Services.

RTC002390—Memorandum continued.
RTC002391—Correspondence to G.J. Maloney from J.R. Godwin.
RTC002393—Draft EDI Law.
RTC002413—An Introduction to Electronic Data Interchange.
RTC002438—Flow Diagram of the Statute of Frauds.
RTC002440—Draft Discussion Paper on EDI Signatures Issues.
RTC002463—Article 4A—Funds Transfers.
RTC002469—Limitations on Liability.
RTC002477—Press Release Sep. 19, 1989.
RTC002485—Tab Generic Ap.
RTC002486—Notes.
RTC002487—Applicant Data.
RTC002488—Customer's Statement.
RTC002489—Dealer's Work Sheet.
RTC002490—Complete Application.
RTC002491—TRWCredentials Service.
RTC002505—Credit Application.
RTC002506—Omni Auto Confidential Client Statement.
RTC002507—Customer Confidential Statement.
RTC002508—Questions for F&I Managers.
RTC002509—Questions continued.
RTC002510—Customer's Statement.
RTC002511—STD APP Fields.
RTC002512—Notes.
RTC002513—Dealer Information.
RTC002533—Credit Net Survey.
RTC002535—Credit Net Survey—Al Long Ford.
RTC002537—New York Credit Net Survey—Smith-Norwich.
RTC002539—Credit Net Survey—Mike Shad Ford.
RTC002541—Credit Net Survey—Adamson Ford.
RTC002543—Credit Net Survey—Terry Ford.
RTC002545—Credit Net Survey—Don Dan Ford.
RTC002547—Credit Net Survey—Bill Brown.
RTC002549—Credit Net Survey—Morris Ford.
RTC002551—Credit Net Survey—North Park L/M.
RTC002553—Credit Net Survey—Country Ford.
RTC002555—Credit Net Survey—Hilltop L/M.
RTC002557—New York Credit Net Survey—West Seneca.
RTC002559—New York Credit Net Survey—Scarsdale Ford.
RTC002561—Credit Net Survey—Bruckman Ford.
RCT002563—Credit Net Survey—Bill Russell Ford.
RTC002565—Credit Net Survey—Jack Demmer.
RTC002567—Credit Net Survey—Dobbs Ford.
RTC002569—Draft Creditnet Survey Questions.
RTC002570—Draft Credinet Survey Questions.
RTC002571—Automation Status, Credit Scoring.
RTC002572—Table 89 Automation Status of Customer Service.
RTC002573—Tab—Satellites/Communications.
RTC002574—Missing Link: ADCS Standard.
RTC002577—The Gateway Connection.
RTC002584—COINLink Customer Number.
RT41989-RTE41990—web site articel re: Bank Systems and Technology.
RTE41991-RTE41993—Network World, vol. 6. No. 9, Mar. 6, 1999.
RTE41994-RTE41995—Article titled "Network automates auto loan application process".
RTE41996-RTE42000—Article titled, "Kiosk issues bank cards for those dashing through dough".
RTE42001-RTE42016—Bank Management.
RTE42017-RTE42020—American Banker, vol. CLXIV, No. 49, Mar. 15, 1999.
RTE42021-RTE42030—Mortgage Banking articles, Aug. 1990.
RTE42031-RTE42034—Bank Administration article, Nov. 1988.
RTE42035-RTE42037—Baltimore Business Journal, Oct. 17-23, 1988.
RTE42030-RTE42047—Banking Technology, May 1993.
RTE42048-RTE42062—American Banker, Nov. 28, 1987.
Cross Sections Winter 1996/97 vol. 13 No. 4.
RTE42069-RTE42078—Credit World, Mar./Apr. 1993.
RTE42079-RTE42081—American Banker, Feb. 8, 1988.
RTE42082-RTE42105—A Practical guide to Asset Tracing and Recovery, Apr. 3 & 4, 1997.
RTE42106-RTE42114—web site article Team Up to Provide Home Banking.
RTE42115-RTE42124—The Washinton Post, Oct. 6, 1996.
RTE42125-RTE42216—BAI, Final Report, "The RDS Report on the Future of Retail Banking Delivery", 1994.
RTE42217-RTE42224—Financial Times, 1992.
RTE42225-RTE42227—Bank Systems and Technology, Apr. 1984, vol. 31, No. 4.
RTE42228-RTE42229—Business Week, Sep. 25, 1989.
RTE42230-RTE42232—Bank Systems and Technology, Apr. 1996.
RTE44431-RTE44431—Certificate of Correction for US Patent No. 6,208,979.
RTE44857-RTE44859—Reseller News, Jun. 20, 1988.
RTE44860-RTE44860—News & views.
RTE44861-RTE44863—Vendor Progress Report GSI (UK).
RTE44864-RTE44865—Annual USA systems developments update, Part 2.
RTE44866-RTE44871—CIS-Commercial Inventory Services.
RTE44872-RTE44876—Auto-Dealer systems in the UK & Update on European Strategies, 2.sup.nd Quarter Update, 1992.
RTE44877-RTE44882—Profiting from Computers.
RTE44883-RTE44885—Annual USA systems developments update, Part 2.
RTE44886-RTE44890—Vendor Progress Report GSI (UK).
RTE44891-RTE44900—web site article "Metroteller Hears the Pleasant Jungle of Coins"; Banking Systems and Equipment, May 1988; Business Journal, vol. 3, No. 32, Feb. 22-28, 1988; and Electronic Banking & Finance.
ADP000001-000500 ADP Information Services Host Systems Detailed Specifications Sections 1-2 Product Requirements.
ADP000501-001335 Sections 2-8 of ADP Information Services Host Systems Detailed Specifications Requirements Product Requirements.
ADP001336-001667 ADP Information Services Host Systems Detailed Specifications Product Requirements Sections 1-3.
ADP001668-002083 Section 3 Program Specifications.
ADP002084-002342 Section 3 Program Specifications.
ADP002343-002654 Financial File Application Maintenance, Section 3 Program Specifications.
ADP002655-002973 PC Locator List Maintenance, Section 3 Program Specifications.
ADP002974-ADP003202—Program Secifications.
ADP00001-ADP00012—ADP Information Services Host Systems Detailed Specifications.
RTW00001-RTW00174—Chemical Bank.
RTW00175-RTW00250—Metroteller Dean Miller Referees.
RTW00251-RTW00335—Dean Miller "At a glance" 1990 calendar.
RTW00336—U-Link.
RTW00337-RTW00342—"The Future is Here Why is Elextronic Access Important?".
RTW00343-RTW00349—Coin and Metroteller to Market Electronic Link Between Auto Dealers and Lenders.
RTW00347 RTW00348—Corres. to B. Shah from J. Palmer.
RTW00349-RTW00351—Corres. to M. Singleton from B. Hill.
RTW00352-RTW00376—Corres. to J. Wolfson from J. Palmer.
RTW00377-RTW00390—V-Link Analysis.
RTW00391-RTW00423—V-Link Product Analysis.
RTW00424-RTW00429—Coinlink Project Status Report.
RTW00430-RTW00431—Memo to J. Wolfson from Moot et al.
RTW00432—V-Link Current.
RTW00433—V-Link Logo.
RTW00434—V-Link Update.
RTW00435—Key Bank V-Link Presentation.
RTW00436-RTW00439—Article Marine Midland pland auto loan venture with giants with; Corres.
RTW00440—Article Marine forms venture to expant auto financing.
RTW00444-RTW00445—Memo to J. Wolfson & C. McIntyre from S. Sterman.
RTW00446-RTW00448—Minutes to NFADA Committee Meeting.
RTW00449—Memo re: Marine Involvement in Coinlink Project.
RTW00450-RTW00453—Coinlink Financial Proforma—with Marine Volume.
RTW00454—Memo re: Marine Involvement in Coinlink Project.

RTW00455-RTW00456—Coinlink Financial Proforma.
RTW00457—Corres. re: Coinlink.
RTW00458—Corres. to M. Love from C. Procknal.
RTW00459-RTW00461—System 88—Comparison Sheet.
RTW00462-RTW00463—Memor re: Coinlink Capitalization.
RTW00464-RTW00466—Coinlink Financial Proforma.
RTW00468-RTW00470—Cost Summary.
RTW00471—Corres to M. Singleton re: Metroteller Systems Inc.
RTW00472-RTW00473—Coinlink Functional Specification Outline.
RTW00474—Metroteller Systems Inc. Written notes.
RTW00475-RTW00484—Coinlink Project.
RTW00485-RTW00487—Corres. to P. Willax from J. Willis.
RTW00488—Status.
RTW00489-SRT00492—Corres. to T. Kress from S. Sterman.
RTW00493—V-Link Diagram.
RTW00494-RTW00519—V-Link Program Functional Specification.
RTW00520-RTW00523—Coinlink Technical Specifications Manual.
RTW00524-RTW00617—Coinlink Technical Specifications Manual.
RTW00618—Metroteller Logo.
RTW00619-RTW00646—CoinLink Diagram & Corres. to M. Love.
RTW00647-RTW00651—Concurrent Computer Corp.
RTW00652-RTW00654—Overview of SDM International.
RTW00655-RTW00657—Corres. to M. Love & S. Sterman.
RTW00658-RTW00661—Metroteler Systems—Coinlink spreadsheet.
RTW00662-RTW00665—Metroteler Systems—Coinlink spreadsheet.
RTW00666-RTW00669—Metroteler Systems—Coinlink spreadsheet.
RTW00670-RTW00672—Metroteler Systems—Coinlink spreadsheet.
RTW00673—Metroteller Systems Inc.
RTW00674-RTW00675—Coinlink Project.
RTW00676-RTW00677—Memo to J. Wolfson, C. McIntyre from S. Stermen.
RTW00678-RTW00681—Subscription Agreement for the Purchase of Shares of Common Stock.
RTW00682-RTW00685—Subscription Agreement for the Purchase of Shares of Common Stock.
RTW00686—Written notes.
RTW00687—MEMO re: Coinlink Project Update.
RTW00689-RTW00705—Orig. MSI/Coin Agreement.
RTW00706-RTW00799—Metroteller Systems Inc. Binder.
RTW00800-RTW00898—Integrated Delivery Technologies/ 1988 Business Plan.
RTW00899-RTW00924—V-Link Program Functional Specification.
RTW00925-RTW00983—NFADA Project Planning Meeting.
RTW00984-RTW00985—Article Banks entering race for quick credit ok; Corres. to M. Singleton.
RTW0986-RTW001023—Comerica Acceptance Corp. ALPS Project.
RTW01024-RTW001027—Indiana Center for Telecommunication.
RTW01028-RTW01039—Certified Collateral Corp. CARX-OTC.
RTW01040-RTW01055—Coinlink Corres. & Agreement.
RTW01056—Written Notes.
RTW01060-RTW01061—Written Notes.
RTW01062-RTW01064—Coin Contacts with written notes.
RTW01065—Empire Bank Phase I.
RTW01067·written notes.
RTW01068-RTW01071—Accounting Statement of Daniel Gordon.
RTW01072-RTW01073—Written notes.
RTW01074-RTW01089—Outline for Empire Bank Meeting.
RTW01090-RTW01092—Agenda Automation of Auto Financing.
RTW01093-RTW01094—Application to Approval/Decline Flow.
DCS000001—Dealer Ace Development Manual.
DCS000002—Dealer Ace Project Participants.
DCS000003—Dealer Ace Project.
DCS000004—Contents.
DCS000005—Project Leaders.
DCS000006—Application Development Committee.
DCS000007—Automated Credit Application.
DCS000008—Implementation Committee.
DCS000009—System Features Committee.
DCS000010—Off-Hours Service Committee.
DCS000011—Scope.
DCS000012—General Business Requirements.
DCS000013—Business Requirements.
DCS000014—Simware Network Overview.
DCS000015—Tab—Field Notes.
DCS000016—Memo re: Dealer A.C.E.—Rollout progress.
DCS00017—General Doc Form—App ID Dup. Check in Batch.
DCS000018—General Doc Form—Discounted Indicator.
DCS000019—General Doc Form—Weekly Hardcopy Report.
DCS000020—General Doc Form—Dealer Number Changes.
DCS000021—General Doc Form—Weekly Hardcopy Report.
DCS000022—General Doc Form—Weekly Hardcopy Report.
DCS000023—General Doc Form—Weekly Hardcopy Report.
DCS000024—General Doc Form—Refinement to the Send Function.
DCS000026—General Doc Form—Preliminary Notes for Tech Team.
DCS000030—General Doc Form—What to do if the Branches want to use A.C.E. on Sunday.
DCS000047—General Doc Form—NADA UVG Available Indicator.
DCS000049—Report.
DCS000076—General Doc Form Auditing for Product changes, Including UVG.
DCS000082—General Doc Form Branch Ace used Vehicle Guide Processing.
DCS000085—General Doc Form Expanded Transaction type change Capability.
DCS000089—General Doc Form Summary of Changes to the Branch System.
DCS000091—General Doc Form Changes to UVG Processing for Vehicles Not Funded.
DCS000098—Used Vehicle Scenarios.
DCS000100—Dealer System Interface for Branch-Entered Apps.
DCS000106—General Doc Form System Test Plan.
DCS000112—General Doc Form Financial Information Screen.
DCS000114—Branch Ace Collateral Screen.
DCS000123—Memo re Summary of Jul. 15, 1994 Core Team Meeting.
DCS000125—General Doc Form Dealer Ace Data Retention.
DCS000128—General Doc Form Current Development Activity Form.
DCS000130—General Doc form Dealer A.C.E. DB2 Table Identification.
DCS000131—General Doc Form Exit to Use Vehicle Guide from the Applicant Screen.
DCS000133—Interface to the Used Vehicle Guide System.
DCS000136—General Doc Form Branch Ace Properties.
DCS000138—General Doc Form New Work Queues in Branc ACE Revised.
DCS000140—Memo re Dealer Ace application Development Priorities.
DCS000148—General Doc Form System Test.
DCS000149—Dealer Ace Test Plan.
DCS000152—More Changes to the Branch System.
DCS000153—General Doc Form CFC Dealer Mainframe Menu.
DCS000155—General Doc Form Changes to Branch Table Maintenace.
DCS000161—General Doc Form New Work Queues in Branch Ace.
DCS000163—General Doc Form Application Statuses—Internal Codes.
DCS000165—General Doc Form Send Comand with Comments.
DCS000171—General Doc Form Dealer to Branch Messages.
DCS000173—General Doc Form Comments on Current Minutes.
DCS000177—General Doc Form Changes to the Dealer Log.
DCS000180—General Doc Form Two Problems to Solve.
DCS000185—Dealer 3270 Access Via Simware.

DCS000187—General Doc Form Batch Requirements for Dealer & Branch A.C.E.
DCS000189—General Doc Form History & Auditing.
DCS000191—Dealer ACE Data Change fields (continued).
DCS000193—General Doc Form History & Auditing.
DCS000199—Applications in the ACE System.
DCS000202—Dealer ACE Application Development Team Meeting Notes.
DCS000203—General Doc Form Product Change Function.
DCS000205—General Doc Form Delete Function.
DCS000207—Dealer ACE Application Development Sub-Committee Meeting Notes.
DCS000208—General Doc Form System Weekend Hours.
DCS000209—General Doc Form Dealer/Branch Interface—Revised.
DCS000213—General Doc Form Dealer/Branch Interface.
DCS000217—General Doc Form Dealer/Branch Interface.
DCS000219—General Doc Form "Preferred Prospect" Recognition.
DCS000220—General Doc Form Application Development Team Status.
DCS000222—Full Service System.
DCS000224—Process Flow Diagrams.
DCS000234—Financial Information (GK Lease).
DCS000236—Financial Information (GK Plus).
DCS000238—Financial Information (Retail).
DCS000240—Applicant Information.
DCS000242—Spouse Information.
DCS000243—Cobuyer Informtion.
DCS000245—Decision Information.
DCS000247—Main Menu.
DCS000258—Dealer A.C.E. System Test Control.
DCS000260—Dealer A.C.E. System Test Control.
DCS000269—Dealer A.C.E. system Test Control.
DCS000277—Dealer A.C.E. System Test Control.
DCS000284—Dealer A.C.E. System Test Control.
DCS000293—Chryster Financial Corporate Deal Direct.
DCS000358—Dear Ace Dealer Information.
DCS000673—Ace Automated Credit Evaluation System.
DCS000681—Dealer Ace—Chrysler Credit's Automated Credit.
DCS000649—Exhibit B—Schedule of Fees and Charges—Electronic Credit Applications.
DT022652—License Agreement between DealerTrack and CarMax.
DT022667—DealerTrack Holding Consolidated Financial Statemetns Dec. 31, 2002 and 2001.
FRD000118—Creditnet Bulletin.
FRD000193—Ford Credit Operators Guide.
FRD000810—Creditnet Status Report.
FRD001104—Creditnet Enrollment Form.
FRD001105—Creditnet Enrollment Form.
FRD001106—Creditnet Enrollment Form.
FRD001107—Creditnet Enrollment Form.
FRD001108—Creditnet Enrollment Form.
FRD001109—Creditnet Enrollment Form.
FRD001110—Creditnet Enrollment Form.
FRD001111—Creditnet Enrollment Form.
FRD001112—Creditnet Enrollment Form.
FRD001113—CreditnetEnrollment Form.
FRD001114—Creditnet Enrollment Form.
FRD001115—Creditnet Enrollment Form.
FRD001116—Acknowledgment.
FRD001117—Creditnet Enrollment Form.
FRD001118—Creditnet Enrollment Form.
FRD001119—Creditnet Enrollment Form.
FRD001120—Creditnet Enrollment Form.
FRD001121—Creditnet Enrollment Form.
FRD001122—Creditnet Enrollment Form.
FRD001123—Creditnet Enrollment Form.
FRD001124—Creditnet Enrollment Form.
FRD001125—Creditnet Enrollment Form.
FRD001126—CreditnetEnrollment Form.
FRD001127—Creditnet Enrollment Form.
FRD001128—Creditnet Enrollment Form.
FRD001129—Creditnet Enrollment Form.
FRD001130—Creditnet Enrollment Form.
FRD001131—Creditnet Enrollment Form.
FRD001132—Creditnet Enrollment Form.
FRD001133—Creditnet Enrollment Form.
FRD001134—Creditnet Enrollment Form.
FRD001135—Creditnet Enrollment Form.
FRD001136—Creditnet Enrollment Form.
FRD001137—Creditnet Enrollment Form.
FRD001138—Creditnet Enrollment Form.
FRD001139—Creditnet Enrollment Form.
FRD001140—Creditnet Enrollment Form.
FRD001141—Creditnet Enrollment Form.
FRD001142—Creditnet Enrollment Form.
FRD001143—Creditnet Enrollment Form.
FRD001144—Creditnet Enrollment Form.
FRD001145—CreditnetEnrollment Form.
FRD001146—Creditnet Enrollment Form.
FRD001147—Creditnet Enrollment Form.
FRD001148—Creditnet Enrollment Form.
FRD001149—Creditnet Enrollment Form.
FRD001150—Creditnet Enrollment Form.
FRD001151—Creditnet Enrollment Form.
FRD001152—Creditnet Enrollment Form.
FRD001153—Creditnet Enrollment Form.
FRD001154—Creditnet Enrollment Form.
FRD001155—Creditnet Enrollment Form.
FRD001156—Creditnet Enrollment Form.
FRD001157—Creditnet Enrollment Form.
FRD001158—Creditnet Enrollment Form.
FRD001159—Creditnet Enrollment Form.
FRD001160—Creditnet Enrollment Form.
FRD001161—Creditnet Enrollment Form.
FRD001162—Creditnet Enrollment Form.
FRD001163—Creditnet Enrollment Form.
FRD001164—Creditnet Enrollment Form.
FRD001165—Creditnet Enrollment Form.
FRD001166—Creditnet Enrollment Form.
FRD001167—Creditnet Enrollment Form.
FRD001168—Creditnet Enrollment Form.
FRD001169—Creditnet Enrollment Form.
FRD001170—Creditnet Enrollment Form.
FRD001171—Creditnet Enrollment Form.
FRD001172—Creditnet Enrollment Form.
FRD001174—Creditnet Enrollment Form.
FRD001175—Creditnet Enrollment Form.
FRD001176—Creditnet Enrollment Form.
FRD001177—Creditnet Enrollment Form.
FRD001178—Creditnet Enrollment Form.
FRD001181—Creditnet Enrollment Form.
FRD001180—CreditnetEnrollment Form.
FRD001182—Creditnet Enrollment Form.
FRD001183—Creditnet Enrollment Form.
FRD001184—Creditnet Enrollment Form.
FRD001186—Creditnet Enrollment Form.
FRD001188—Creditnet Enrollment Form.
FRD001189—Creditnet Enrollment Form.
FRD001190—Creditnet Enrollment Form.
FRD001191—Creditnet Enrollment Form.
FRD001192—Creditnet Enrollment Form.
FRD001193—Creditnet Enrollment Form.
FRD001195—Creditnet Enrollment Form.
FRD001196—Creditnet Enrollment Form.
FRD001197—Creditnet Enrollment Form.
FRD001198—Creditnet Enrollment Form.
FRD001199—Creditnet Enrollment Form.
FRD001200—Creditnet Enrollment Form.
FRD001201—Creditnet Enrollment Form.
FRD001202—Creditnet Enrollment Form.
FRD001203—CreditnetEnrollment Form.
FRD001204—Creditnet Enrollment Form.
FRD001205—Creditnet Enrollment Form.
FRD001206—Creditnet Enrollment Form.
FRD001207—Creditnet Enrollment Form.

FRD001208—Creditnet Enrollment Form.
FRD001209—Creditnet Enrollment Form.
FRD001210—Creditnet Enrollment Form.
FRD001211—Creditnet Enrollment Form.
FRD001212—Creditnet Enrollment Form.
FRD001213—Creditnet Enrollment Form.
FRD001214—Creditnet Enrollment Form.
FRD001215—Creditnet Enrollment Form.
FRD001216—Creditnet Enrollment Form.
FRD001218—Creditnet Enrollment Form.
FRD001219—Creditnet Enrollment Form.
FRD001220—Creditnet Enrollment Form.
FRD001221—Creditnet Enrollment Form.
FRD001222—Creditnet Enrollment Form.
FRD001223—Creditnet Enrollment Form.
FRD001224—Creditnet Enrollment Form.
FRD001226—Creditnet Enrollment Form.
FRD001227—Creditnet Enrollment Form.
FRD001228—Creditnet Enrollment Form.
FRD001229—Creditnet Enrollment Form.
FRD001230—Creditnet Enrollment Form.
FRD001231—Creditnet Enrollment Form.
FRD001232—Creditnet Enrollment Form.
FRD001233—Creditnet Enrollment Form.
FRD001234—Creditnet Enrollment Form.
FRD001235—Creditnet Enrollment Form.
FRD001236—Creditnet Enrollment Form.
FRD001237—Creditnet Enrollment Form.
FRD001238—Creditnet Enrollment Form.
FRD001240—Creditnet Enrollment Form.
FRD001242—Creditnet Enrollment Form.
FRD001243—Creditnet Enrollment Form.
FRD001244—Creditnet Enrollment Form.
FRD001245—Creditnet Enrollment Form.
FRD001246—Creditnet Enrollment Form.
FRD001247—Creditnet Enrollment Form.
FRD001249—Creditnet Enrollment Form.
FRD001250—Creditnet Enrollment Form.
FRD001251—Creditnet Enrollment Form.
FRD001252—Creditnet Enrollment Form.
FRD001253—Creditnet Enrollment Form.
FRD001254—Creditnet Enrollment Form.
FRD001255—Creditnet Enrollment Form.
FRD001256—Creditnet Enrollment Form.
FRD001257—Creditnet Enrollment Form.
FRD001258—Creditnet Enrollment Form.
FRD001259—Creditnet Enrollment Form.
FRD001261—Creditnet Enrollment Form.
FRD001263—Creditnet Enrollment Form.
FRD001264—Creditnet Enrollment Form.
FRD001265—Creditnet Enrollment Form.
FRD001266—Creditnet Enrollment Form.
FRD001267—Creditnet Enrollment Form.
FRD001270—Creditnet Enrollment Form.
FRD001271—Creditnet Enrollment Form.
FRD001272—Creditnet Enrollment Form.
FRD001273—Creditnet Enrollment Form.
FRD001274—Creditnet Enrollment Form.
FRD001275—Creditnet Enrollment Form.
FRD001276—Creditnet Enrollment Form.
FRD001277—Creditnet Enrollment Form.
FRD001278—Creditnet Enrollment Form.
FRD001279—Creditnet Enrollment Form.
FRD001280—Creditnet Enrollment Form.
FRD001281—Creditnet Enrollment Form.
FRD001282—Creditnet Enrollment Form.
FRD001283—Creditnet Enrollment Form.
FRD001284—Creditnet Enrollment Form.
FRD001285—Creditnet Enrollment Form.
FRD001286—Creditnet Enrollment Form.
FRD001287—Creditnet Enrollment Form.
FRD001288—Creditnet Enrollment Form.
FRD001289—Creditnet Enrollment Form.
FRD001290—Creditnet Enrollment Form.
FRD001291—Creditnet Enrollment Form.
FRD001292—Creditnet Enrollment Form.
FRD001293—Creditnet Enrollment Form.
FRD001294—Creditnet Enrollment Form.
FRD001295—Creditnet Enrollment Form.
FRD001296—Creditnet Enrollment Form.
FRD001297—Creditnet Enrollment Form.
FRD001298—Creditnet Enrollment Form.
FRD001299—Creditnet Enrollment Form.
FRD001300—Creditnet Enrollment Form.
FRD001301—Creditnet Enrollment Form.
FRD001302—Creditnet Enrollment Form.
FRD001303—Creditnet Enrollment Form.
FRD001304—Creditnet Enrollment Form.
FRD001305—Creditnet Enrollment Form.
FRD001306—Creditnet Enrollment Form.
FRD001307—Creditnet Enrollment Form.
FRD001308—Creditnet Enrollment Form.
FRD001309—Creditnet Enrollment Form.
FRD001310—Creditnet Enrollment Form.
FRD001311—Creditnet Enrollment Form.
FRD001312—Creditnet Enrollment Form.
FRD001313—Creditnet Enrollment Form.
FRD001314—Creditnet Enrollment Form.
FRD001315—Creditnet Enrollment Form.
FRD001316—Creditnet Enrollment Form.
FRD001317—Creditnet Enrollment Form.
FRD001318—Creditnet Enrollment Form.
FRD001320—Creditnet Enrollment Form.
FRD001321—Creditnet Enrollment Form.
FRD001322—Creditnet Enrollment Form.
FRD001323—Creditnet Enrollment Form.
FRD001324—Creditnet Enrollment Form.
FRD001325—Creditnet Enrollment Form.
FRD001326—Creditnet Enrollment Form.
FRD001327—Creditnet Enrollment Form.
FRD001328—Creditnet Enrollment Form.
FRD001329—Creditnet Enrollment Form.
FRD001330—Creditnet Enrollment Form.
FRD001331—Creditnet Enrollment Form.
FRD001332—Creditnet Enrollment Form.
FRD001333—Creditnet Enrollment Form.
FRD001334—Creditnet Enrollment Form.
FRD001335—Creditnet Enrollment Form.
FRD001336—Creditnet Enrollment Form.
FRD001337—Creditnet Enrollment Form.
FRD001338—Creditnet Enrollment Form.
FRD001339—Creditnet Enrollment Form.
FRD001340—Creditnet Enrollment Form.
FRD001341—Creditnet Enrollment Form.
FRD001342—Creditnet Enrollment Form.
FRD001343—Creditnet Enrollment Form.
FRD001345—Creditnet Enrollment Form.
FRD001346—Creditnet Enrollment Form.
FRD001347—Creditnet Enrollment Form.
FRD001348—Creditnet Enrollment Form.
FRD001349—Creditnet Enrollment Form.
FRD001350—Creditnet Enrollment Form.
FRD001351—Creditnet Enrollment Form.
FRD001352—Creditnet Enrollment Form.
FRD001353—Creditnet Enrollment Form.
FRD001354—Creditnet Enrollment Form.
FRD001355—Creditnet Enrollment Form.
FRD001356—Creditnet Enrollment Form.
FRD001357—Creditnet Enrollment Form.
FRD001358—Creditnet Enrollment Form.
FRD001359—Creditnet Enrollment Form.
FRD001360—Creditnet Enrollment Form.
FRD001361—Creditnet Enrollment Form.
FRD001362—Creditnet Enrollment Form.
FRD001363—Creditnet Enrollment Form.
FRD001365—Creditnet Enrollment Form.

FRD001366—Creditnet Enrollment Form.
FRD001367—Creditnet Enrollment Form.
FRD001368—Creditnet Enrollment Form.
FRD001369—Creditnet Enrollment Form.
FRD001370—Creditnet Enrollment Form.
FRD001371—Creditnet Enrollment Form.
FRD001372—Creditnet Enrollment Form.
FRD001373—Creditnet Enrollment Form.
FRD001374—Creditnet Enrollment Form.
FRD001375—Creditnet Enrollment Form.
FRD001376—Creditnet Enrollment Form.
FRD001377—Creditnet Enrollment Form.
FRD001378—Creditnet Enrollment Form.
FRD001379—Creditnet Enrollment Form.
FRD001380—Creditnet Enrollment Form.
FRD001381—Creditnet Enrollment Form.
FRD001382—Creditnet Enrollment Form.
FRD001383—Creditnet Enrollment Form.
FRD001384—Creditnet Enrollment Form.
FRD001385—Creditnet Enrollment Form.
FRD001386—Creditnet Enrollment Form.
FRD001387—Creditnet Enrollment Form.
FRD001388—Creditnet Enrollment Form.
FRD001389—Creditnet Enrollment Form.
FRD001390—Creditnet Enrollment Form.
FRD001391—Creditnet Enrollment Form.
FRD001392—Creditnet Enrollment Form.
FRD001393—Creditnet Enrollment Form.
FRD001394—Creditnet Enrollment Form.
FRD001395—Creditnet Enrollment Form.
FRD001396—Creditnet Enrollment Form.
FRD001397—Creditnet Enrollment Form.
FRD001398—Creditnet Enrollment Form.
FRD001399—Creditnet Enrollment Form.
FRD001400—Creditnet Enrollment Form.
FRD001401—Creditnet Enrollment Form.
FRD001402—Creditnet Enrollment Form.
FRD001403—Creditnet Enrollment Form.
FRD001404—Creditnet Enrollment Form.
FRD001405—Creditnet Enrollment Form.
FRD001406—Creditnet Enrollment Form.
FRD001407—Creditnet Enrollment Form.
FRD001408—Creditnet Enrollment Form.
FRD001409—Creditnet Enrollment Form.
FRD001410—Creditnet Enrollment Form.
FRD001411—Creditnet Enrollment Form.
FRD001412—Creditnet Enrollment Form.
FRD001413—Creditnet Enrollment Form.
FRD001414—Creditnet Enrollment Form.
FRD001415—Creditnet Enrollment Form.
FRD001416—Creditnet Enrollment Form.
FRD001417—Creditnet Enrollment Form.
FRD001418—Creditnet Enrollment Form.
FRD001419—Creditnet Enrollment Form.
FRD001420—Creditnet Enrollment Form.
FRD001421—Creditnet Enrollment Form.
FRD001422—Creditnet Enrollment Form.
FRD001423—Creditnet Enrollment Form.
FRD001424—Creditnet Enrollment Form.
FRD001425—Creditnet Enrollment Form.
FRD001426—Creditnet Enrollment Form.
FRD001427—Creditnet Enrollment Form.
FRD001428—Creditnet Enrollment Form.
FRD001429—Creditnet Enrollment Form.
FRD001430—Creditnet Enrollment Form.
FRD001431—Creditnet Enrollment Form.
FRD001432—Creditnet Enrollment Form.
FRD001433—Creditnet Enrollment Form.
FRD001434—Creditnet Enrollment Form.
FRD001435—Creditnet Enrollment Form.
FRD001436—Creditnet Enrollment Form.
FRD001437—Creditnet Enrollment Form.
FRD001438—Creditnet Enrollment Form.
FRD001439—Creditnet Enrollment Form.
FRD001440—Creditnet Enrollment Form.
FRD001441—Creditnet Enrollment Form.
FRD001442—Creditnet Enrollment Form.
FRD001443—Creditnet Enrollment Form.
FRD001444—Creditnet Enrollment Form.
FRD001445—Creditnet Enrollment Form.
FRD001446—CreditnetEnrollment Form.
FRD001447—Creditnet Enrollment Form.
FRD001448—Creditnet Enrollment Form.
FRD001449—Creditnet Enrollment Form.
FRD001450—Creditnet Enrollment Form.
FRD001451—Creditnet Enrollment Form.
FRD001452—Creditnet Enrollment Form.
FRD001453—Creditnet Enrollment Form.
FRD001454—Creditnet Enrollment Form.
FRD001455—Creditnet Enrollment Form.
FRD001456—Creditnet Enrollment Form.
FRD001457—Creditnet Enrollment Form.
FRD001458—Creditnet Enrollment Form.
FRD001459—Creditnet Enrollment Form.
FRD001460—CreditnetEnrollment Form.
FRD001461—Creditnet Enrollment Form.
FRD001462—Creditnet Enrollment Form.
FRD001463—Creditnet Enrollment Form.
FRD001464—Creditnet Enrollment Form.
FRD001465—Creditnet Enrollment Form.
FRD001466—Creditnet Enrollment Form.
FRD001467—Creditnet Enrollment Form.
FRD001469—Corres. to Glen Pellock.
FRD001470—Creditnet Enrollment Form.
FRD001471—Creditnet Enrollment Form.
FRD001472—Creditnet Enrollment Form.
FRD001473—Creditnet Enrollment Form.
FRD001474—Creditnet Enrollment Form.
FRD001475—Creditnet Enrollment Form.
FRD001476—Additional Creditnet system for North Florida Lincoln-Mercury.
FRD001477-FRD001478—Creditnet Enrollment Form.
FRD001479—Creditnet Enrollment Form.
FRD001480—Creditnet Enrollment Form.
FRD001481—Creditnet Enrollment Form.
FRD001482—Creditnet Enrollment Form.
FRD001483—Creditnet Enrollment Form.
FRD001484—Creditnet Enrollment Form.
FRD001485—Creditnet Enrollment Form.
FRD001486—Creditnet Enrollment Form.
FRD001487—Creditnet Enrollment Form.
FRD001488—Creditnet Enrollment Form.
FRD001489—Creditnet Enrollment Form.
FRD001490—Creditnet Enrollment Form.
FRD001491—Creditnet Enrollment Form.
FRD001492—Creditnet Enrollment Form.
FRD001493—Creditnet Enrollment Form.
FRD001494—Creditnet Enrollment Form.
FRD001495—Creditnet Enrollment Form.
FRD001496—Creditnet Enrollment Form.
FRD001497—Creditnet Enrollment Form.
FRD001498-FRD001499—Creditnet Enrollment Form.
FRD001500—Creditnet Enrollment Form.
FRD001501—Creditnet Enrollment Form.
FRD001502-FRD001503—Creditnet Enrollment Form.
FRD001504—Creditnet Enrollment Form.
FRD001505—Creditnet Enrollment Form.
FRD001506—Creditnet Enrollment Form.
FRD001507—Creditnet Enrollment Form.
FRD001508—Creditnet Enrollment Form.
FRD001509—Creditnet Enrollment Form.
FRD001510-FRD001511—Creditnet Enrollment Form.
FRD001512—Creditnet Enrollment Form.
FRD001513—Creditnet Enrollment Form.
FRD001514—Creditnet Enrollment Form.
FRD001515—Creditnet Enrollment Form.

FRD001516—Creditnet Enrollment Form.
FRD001517—Creditnet Enrollment Form.
FRD001518—Creditnet Enrollment Form.
FRD001519—Creditnet Enrollment Form.
FRD001520—Creditnet Enrollment Form.
FRD001521—Creditnet Enrollment Form.
FRD001522—Creditnet Enrollment Form.
FRD001523-FRD001524—Creditnet Enrollment Form.
FRD001525—Creditnet Enrollment Form.
FRD001526—Fax Regarding Stand Alone Terminal.
FRD001527—Letter requesting Approval.
FRD001528—Creditnet Enrollment Form.
FRD001529—Creditnet Enrollment Form.
FRD001530—Creditnet Enrollment Form.
FRD001531—Memo regarding Stand Alone Equipment.
FRD001532-FRD001533—Creditnet Enrollment Form.
FRD001534-FRD00'1535—Creditnet Enrollment Form.
FRD001536—Creditnet Enrollment Form.
FRD001537-FRD001538—Request for replacement of stand alone terminal.
FRD001539—Creditnet Enrollment Form.
FRD001540—Creditnet Enrollment Form.
FRD001541—Creditnet Enrollment Form.
FRD001542—Creditnet Enrollment Form.
FRD001543—Creditnet Enrollment Form.
FRD001544—Creditnet Enrollment Form.
FRD001545—Creditnet Enrollment Form.
FRD001546—Creditnet Enrollment Form.
FRD001547-FRD001549—Creditnet Enrollment Form.
FRD001550—Creditnet Enrollment Form.
FRD001551—Creditnet Enrollment Form.
FRD001552—Creditnet Enrollment Form.
FRD001553—Creditnet Enrollment Form.
FRD001554—Creditnet Enrollment Form.
FRD001546-FRD001557—Creditnet Enrollment Form.
FRD001558—Creditnet Enrollment Form.
FRD001559—Creditnet Enrollment Form.
FRD001560—Creditnet Enrollment Form.
FRD001561—Creditnet Enrollment Form.
FRD001562—Souteastern Region 12/7.
FRD001563—Corres. From Ford Motor Credit Co. to Mr. A. Wagner.
FRD001564—Creditnet Enrollment Form.
FRD001565—Creditnet Enrollment Form.
FRD001566—Dealer info re: Harold Skinner.
FRD001567—Creditnet Enrollment Form.
FRD001568—Two Way Memo to Credit-Net.
FRD001569—Creditnet Enrollment Form.
FRD001570—Creditnet Enrollment Form.
FRD001571—Creditnet Enrollment Form.
FRD001572—Creditnet Enrollment Form.
FRD001573—Creditnet Enrollment Form.
FRD001574—Creditnet Enrollment Form.
FRD001575—Corres. From Ford Motor Credit Co. to L. Adamus.
FRD001576—Creditnet Enrollment Form.
FRD001577—Corres. From Ford Motor Credit Co. to Linda.
FRD001578—Creditnet Enrollment Form.
FRD001579—Creditnet Enrollment Form.
FRD001580—Creditnet Enrollment Form.
FRD001581—Creditnet Enrollment Form.
FRD001582—Corres. from Ford Motor Credit to George.
FRD001583—Creditnet Enrollment Form.
FRD001584—Creditnet Enrollment Form.
FRD001585—Corres from Ford Motor Credit to Mr. Fitzgerald.
FRD001586—Creditnet Enrollment Form.
FRD001587—Corres. from Ford Motor Credit to Mr. Kozel.
FRD001588—Creditnet Enrollment Form.
FRD001589—Corres. from Ford Motor Credit to Mr. Kozel.
FRD001590—Creditnet Enrollment Form.
FRD001591—Creditnet Enrollment Form.
FRD001592—Creditnet Enrollment Form.
FRD001593—Corres. From Ford Motor Credit Co. to Mr. A. Wagner.
FRD001594—Creditnet Enrollment Form.
FRD001595—Creditnet Enrollment Form.
FRD001596—Creditnet Enrollment Form.
FRD001597—Corres. From Ford Motor Credit Co. to Mr. A. Wagner.
FRD001598—Creditnet Enrollment Form.
FRD001599—Creditnet Enrollment Form.
FRD001600—Creditnet Enrollment Form.
FRD001601—Corres. from Ford Motor Credit to A. Wagner.
FRD001602—Creditnet Enrollment Form.
FRD001603—Creditnet Enrollment Form.
FRD001604—Creditnet Enrollment Form.
FRD001605—Creditnet Enrollment Form.
FRD001606—Corres. from Ford Motor Credit to A. Wagner.
FRD001607—Corres. from Ford Motor Credit to A. Wagner.
FRD001608—Creditnet Enrollment Form.
FRD001609—Creditnet Enrollment Form.
FRD001610—Memo to L. Adamus.
FRD001611—Memo to L. Adamus.
FRD001612—Creditnet Enrollment Form.
FRD001613—Fax cover to L. Adamus.
FRD001614—Creditnet Enrollment Form.
FRD001615—Creditnet Enrollment Form.
FRD001616—Creditnet Enrollment Form.
FRD001617—Creditnet Enrollment Form.
FRD001618—Creditnet Enrollment Form.
FRD001619—Creditnet Enrollment Form.
FRD001620—Creditnet Enrollment Form.
FRD001621—Creditnet Enrollment Form.
FRD001622—Creditnet Enrollment Form.
FRD001623—Creditnet Enrollment Form.
FRD001624—Creditnet Enrollment Form.
FRD001625—Two Way Memo to M. Kozel.
FRD001626—Creditnet Enrollment Form.
FRD001627—Creditnet Enrollment Form.
FRD001628—Dealer info. Re: H. Hopkins.
FRD001629—Creditnet Enrollment Form.
FRD001630—Creditnet Enrollment Form.
FRD001631—Corres. from Ford Motor Credit to Mr. Kozel.
FRD001632—Creditnet Enrollment Form.
FRD001633—Creditnet Enrollment Form.
FRD001634—Creditnet Enrollment Form.
FRD001635—Creditnet Enrollment Form.
FRD001636—Creditnet Enrollment Form.
FRD001637—Creditnet Enrollment Form.
FRD001638—Creditnet Enrollment Form.
FRD001639—Two Way Memo to M. Kozel.
FRD001640—Creditnet Enrollment Form.
FRD001641—Corres. From Ford Motor Credit Co. to L. Adamus.
FRD001642—Creditnet Enrollment Form.
FRD001643—Corres. From Ford Motor Credit Co. to L. Adamus.
FRD001644—Creditnet Enrollment Form.
FRD001645—Two Way Memo to M. Kozel.
FRD001646—Creditnet Enrollment Form.
FRD001647—Creditnet Enrollment Form.
FRD001648—Creditnet Enrollment Form.
FRD001649—Creditnet Enrollment Form.
FRD001650—Written notes from Jul. 12, 1993.
FRD001651—Memo to J. Wardwell.
FRD001652—Creditnet Enrollment Form.
FRD001653—Two Way Memo to J. Chadwick.
FRD001654—Creditnet Enrollment Form.
FRD001655—Creditnet Enrollment Form.
FRD001656—Creditnet Enrollment Form.
FRD001657—Creditnet Enrollment Form.
FRD001658—Two Way Memo to L. Adamus.
FRD001659—Creditnet Enrollment Form.
FRD001660—Creditnet Enrollment Form.
FRD001661—Creditnet Enrollment Form.
FRD001662—Creditnet Enrollment Form.
FRD001663—Creditnet Enrollment Form.
FRD001664—Creditnet Enrollment Form.
FRD001665—Corres. from Ford Motor Credit Co. to A. Wagner.

FRD001666—Creditnet Enrollment Form.
FRD001667—Creditnet Enrollment Form.
FRD001668—Creditnet Enrollment Form.
FRD001669—Creditnet Enrollment Form.
FRD001670—Creditnet Enrollment Form.
FRD001671—Creditnet Enrollment Form.
FRD001672—Creditnet Enrollment Form.
FRD001673—Creditnet Enrollment Form.
FRD001674—Creditnet Enrollment Form.
FRD001675—CreditnetEnrollment Form.
FRD001676—Creditnet Enrollment Form.
FRD001677—Creditnet Enrollment Form.
FRD001678—Creditnet Enrollment Form.
FRD001679—Creditnet Enrollment Form.
FRD001680—Creditnet Enrollment Form.
FRD001681—Creditnet Enrollment Form.
FRD001682—Creditnet Enrollment Form.
FRD001683—Creditnet Enrollment Form.
FRD001684—Creditnet Enrollment Form.
FRD001685—Creditnet Enrollment Form.
FRD001686—Creditnet Enrollment Form.
FRD001687—Creditnet Enrollment Form.
FRD001688—Creditnet Enrollment Form.
FRD001689—CreditnetEnrollment Form.
FRD001690—Creditnet Enrollment Form.
FRD001691—Creditnet Enrollment Form.
FRD001692—Dealer Info. Re: Cisco Ford Inc.
FRD001693—Creditnet Enrollment Form.
FRD001694—Creditnet Enrollment Form.
FRD001695—Creditnet Enrollment Form.
FRD001696—Creditnet Enrollment Form.
FRD001697—Creditnet Enrollment Form.
FRD001698—Creditnet Enrollment Form.
FRD001699—Creditnet Enrollment Form.
FRD001700—Memo from Ford Motor Credit Co. to A. Wagner.
FRD001701—Creditnet Enrollment Form.
FRD001702—Two Way Memo to A. Wagner.
FRD001703—Creditnet Enrollment Form.
FRD001704—Creditnet Enrollment Form.
FRD001705—Two Way Memo to A. Wagner.
FRD001706—Creditnet Enrollment Form.
FRD001707—Creditnet Enrollment Form.
FRD001708—Creditnet Enrollment Form.
FRD001709—Creditnet Enrollment Form.
FRD001710—Creditnet Enrollment Form.
FRD001711—Creditnet Enrollment Form.
FRD001712—Creditnet Enrollment Form.
FRD001713—Creditnet Enrollment Form.
FRD001714—Creditnet Enrollment Form.
FRD001715—Creditnet Enrollment Form.
FRD001716—Creditnet Enrollment Form.
FRD001717—Creditnet Enrollment Form.
FRD001718—Creditnet Enrollment Form.
FRD001719—Creditnet Enrollment Form.
FRD001720—Creditnet Enrollment Form.
FRD001721—Fax Cover Sheet to L. Adamus.
FRD001722—Memo to A. Wagner.
FRD001723—Creditnet Enrollment Form.
FRD001724—Memo to Dearman Ford.
FRD001725—Creditnet Enrollment Form.
FRD001726—Two Way Memo to L. Adamus.
FRD001727—Creditnet Enrollment Form.
FRD001728—Creditnet Enrollment Form.
FRD001729—Dealer Buyout, Prior William Mizell.
FRD001730—Creditnet Enrollment Form.
FRD001731—Creditnet Enrollment Form.
FRD001732—Creditnet Enrollment Form.
FRD001733—Creditnet Enrollment Form.
FRD001734—Creditnet Enrollment Form.
FRD001735—Memo From Ford Motor Credit Co. to L. Adamus.
FRD001736—Creditnet Enrollment Form.
FRD001737—Creditnet Enrollment Form.
FRD001738—Creditnet Enrollment Form.
FRD001739—Creditnet Enrollment Form.
FRD001740—Memo from Ford Motor Credit Co. to M. Kozel.
FRD001741—Creditnet Enrollment Form.
FRD001742—Creditnet Enrollment Form.
FRD001743—Creditnet Enrollment Form.
FRD001744—Creditnet Enrollment Form.
FRD001745—Hand written notes.
FRD001746—Creditnet Enrollment Form.
FRD001747—Creditnet Enrollment Form.
FRD001748—Creditnet Enrollment Form.
FRD001749—Creditnet Enrollment Form.
FRD001750—Creditnet Enrollment Form.
FRD001751—Creditnet Enrollment Form.
FRD001752—Hand written notes.
FRD001753—Creditnet Enrollment Form.
FRD001754—Creditnet Enrollment Form.
FRD001755—Creditnet Enrollment Form.
FRD001756—Creditnet Enrollment Form.
FRD001757—Hand written notes.
FRD001758—Creditnet Enrollment Form.
FRD001759—Creditnet Enrollment Form.
FRD001760—Hand written notes.
FRD001761—Creditnet Enrollment Form.
FRD001762—Creditnet Enrollment Form.
FRd001763—Hand written notes.
FRD001764—Creditnet Enrollment Form.
FRD001765—Creditnet Enrollment Form.
FRD001766—Hand written notes.
FRD001767—Creditnet Enrollment Form.
FRD001768—Creditnet Enrollment Form.
FRD001769—Creditnet Enrollment Form.
FRD001770—Creditnet Enrollment Form.
FRD001771—Creditnet Enrollment Form.
FRD001772—Creditnet Enrollment Form.
FRD001773—Creditnet Enrollment Form.
FRD001774—Hand written note.
FRD001775—Hand written letter to Mr. Chadwick.
FRD001776—Creditnet Enrollment Form.
FRD001777—Creditnet Enrollment Form.
FRD001778—Corres from Ford Motor Credit Co. to Mr. Chadwick.
FRD001779—Creditnet Enrollment Form.
FRD001780—Creditnet Enrollment Form.
FRD001781—Creditnet Enrollment Form.
FRD001782—Creditnet Enrollment Form.
FRD001783—Creditnet Enrollment Form.
FRD001784—Creditnet Enrollment Form.
FRD001785—Creditnet Enrollment Form.
FRD001786—Creditnet Enrollment Form.
FRD001787—Hand written notes from S. Charles.
FRD001788—Document cover sheet.
FRD001789—Creditnet Enrollment Form.
FRD001790—Hand written notes from S. Charles.
FRD001791—Creditnet Enrollment Form.
FRD001792—Creditnet Enrollment Form.
FRD001793—Creditnet Enrollment Form.
FRD001794—Creditnet Enrollment Form.
FRD001795—Creditnet Enrollment Form.
FRD001796—Creditnet Enrollment Form.
FRD001797—Creditnet Enrollment Form.
FRD001798—Creditnet Enrollment Form.
FRD001799—Creditnet Enrollment Form.
FRD001800—Creditnet Enrollment Form.
FRD001801—Creditnet Enrollment Form.
FRD001802—Creditnet Enrollment Form.
FRD001803—Creditnet Enrollment Form.
FRD001804—Creditnet Enrollment Form.
FRD001805—Creditnet Enrollment Form.
FRD001806—Creditnet Enrollment Form.
FRD001807—Creditnet Enrollment Form.
FRD001808—Two way memo to A. Wagner.
FRD001809—Hand written notes from L. Woodward.
FRD001810—Creditnet Enrollment Form.
FRD001811—Creditnet Enrollment Form.

FRD001812—Creditnet Enrollment Form.
FRD001813—Creditnet Enrollment Form.
FRD0018144—Creditnet Enrollment Form.
FRD001815—Creditnet Enrollment Form.
FRD001816—Creditnet Enrollment Form.
FRD001817—Creditnet Enrollment Form.
FRD001818—Creditnet Enrollment Form.
FRD001819—Creditnet Enrollment Form.
FRD001820—Creditnet Enrollment Form.
FRD001821—Memo to Mr. Wagner.
FRD001822—Creditnet Enrollment Form.
FRD001823—Memo from COIN Dealership.
FRD001824—Creditnet Enrollment Form.
FRD001825—Memo to J. Chadwick.
FRD001826—Creditnet Enrollment Form.
FRD001827—Creditnet Enrollment Form.
FRD001828—Memo to G. Krucek.
FRD001829—Creditnet Enrollment Form.
FRD001830—Creditnet Enrollment Form.
FRD001831—Creditnet Enrollment Form.
FRD001832—Creditnet Enrollment Form.
FRD001833—Creditnet Enrollment Form.
FRD001834—Creditnet Enrollment Form.
FRD001835—Creditnet Enrollment Form.
FRD001836—Creditnet Enrollment Form.
FRD001837—Creditnet Enrollment Form.
FRD001838—Creditnet Enrollment Form.
FRD001839—Memo to L. Adamus.
FRD001840—Creditnet Enrollment Form.
FRD001841—Creditnet Enrollment Form.
FRD001842—Total Active Dealers by Region.
FRD001843—Creditnet Enrollment Form.
FRD001844—Creditnet Enrollment Form.
FRD001845—Creditnet Enrollment Form.
FRD001846—Creditnet Enrollment Form.
FRD001847—Creditnet Enrollment Form.
FRD001848—Fax Cover from COIN Dealership.
FRD001849—Creditnet Enrollment Form.
FRD001850—Creditnet Enrollment Form.
FRD001851—Creditnet Enrollment Form.
FRD001852—Creditnet Enrollment Form.
FRD001853—Creditnet Enrollment Form.
FRD001854—Creditnet Enrollment Form.
FRD001855—Creditnet Enrollment Form.
FRD001856—Creditnet Enrollment Form.
FRD001857—Creditnet Enrollment Form.
FRD001858—Creditnet Enrollment Form.
FRD001859—Creditnet Enrollment Form.
FRD001860—Memo to G. Kruczek.
FRD001861—Creditnet Enrollment Form.
FRD001862—Creditnet Enrollment Form.
FRD001863—Memo to G. Kruczek.
FRD001864—Creditnet Enrollment Form.
FRD001865—Jan. 8, 1992 fax transmission cover sheet to Linda from R. Moore.
FRD001866—Creditnet Enrollment Form.
FRD001867-FRD001869—Creditnet Enrollment Form—Town & Country Ford.
FRD001870-FRD001871—Creditnet Enrollment Form—Bill Hood Ford.
FRD001872-FRD001873—Creditnet Enrollment Form—Danny Belyeu Ford-Lincoln-Mercury.
FRD001874—Creditnet Enrollment Form—Sunrise Olds-Toyota Inc.
FRD001875-FRD01876—Creditnet Enrollment Form—Griffin Ford Lincoln Mercury Inc.
FRD001877-FRD001878—Creditnet Enrollment Form—Hayden Royan Inc. DBA Flamingo Ford.
FRD001879—Creditnet Enrollment Form—Highlife Ford Inc. DBA Sunshine Ford.
FRD001880—Creditnet Enrollment Form—Baugh Ford-Mercury Inc.
FRD001881—Creditnet Enrollment Form—Havana Ford, Inc.
FRD001882—Creditnet Enrollment Form—Gatorland Motor Company d/b/a Gatorland Toyota.
FRD001883-FRD001884—Creditnet Enrollment Form -Gatorland Motor Company d/b/a Gatorland Toyota.
FRD001885—Creditnet Enrollment Form—Maroone Auto Plaza.
FRD001886-FRD001887—Creditnet Enrollment Form—Deland Toyota.
FRD001888-FRD001891—Creditnet Enrollment Form—Hollywood Ford.
FRD001892—Creditnet Enrollment Form -VIP Lincoln Mercury.
FRD001893—Creditnet Enrollment Form—Quitman Motor Co. Inc.
FRD001894—Creditnet Enrollment Form.
FRD001895—Creditnet Enrollment Form.
FRD001896-FRD001897—Creditnet Enrollment Form—Grubbs Ford Lincoln Mercury Inc.
FRD001898—Creditnet Enrollment Form -Palatka Ford Mercury Inc.
FRD001899—Creditnet Enrollment Form—Faircloth Ford, Inc.
FRD001900—Creditnet Enrollment Form—Tropical Ford Inc.
FRD001901—Creditnet Enrollment Form—Cliff Motor Co. Inc.
FRD001902—Creditnet Enrollment Form—Cazenave Motor Co., Inc.
FRD001903—Creditnet Enrollment Form—Wayne Ford Inc.
FRD001904—Creditnet Enrollment Form—Harold Skinner Ford-Merc Inc.
FRD001905—Creditnet Enrollment Form.
FRD001906—Creditnet Enrollment Form.
FRD001907—Creditnet Enrollment Form.
FRD001908-FRD001911.
FRD001912—Creditnet Enrollment Form.
FRD001913—Creditnet Enrollment Form.
FRD001914—Creditnet Enrollment Form.
FRD001915—Creditnet Enrollment Form.
FRD001916—Creditnet Enrollment Form.
FRD001917-FRD001918—Creditnet Enrollment Form.
FRD001919—Creditnet Enrollment Form.
FRD001920—Creditnet Enrollment Form.
FRD001921—Creditnet Enrollment Form.
FRD001922-FRD001923—Creditnet Enrollment Form.
FRD001924—Creditnet Enrollment Form.
FRD001925—Creditnet Enrollment Form.
FRD001926—Creditnet Enrollment Form.
FRD001927—Creditnet Enrollment Form.
FRD001928—Creditnet Enrollment Form.
FRD001929—Creditnet Enrollment Form.
FRD001930—Creditnet Enrollment Form.
FRD001931-FRD001935—Creditnet Enrollment Form.
FRD001936—Creditnet Enrollment Form.
FRD001937—Creditnet Enrollment Form.
FRD001939—Creditnet Enrollment Form.
FRD001941—Creditnet Enrollment Form.
FRD001942—Creditnet Enrollment Form.
FRD001943—Creditnet Enrollment Form.
FRD001944—Creditnet Enrollment Form.
FRD001945—Creditnet Enrollment Form.
FRD001947—Creditnet Enrollment Form.
FRD001948—Creditnet Enrollment Form.
FRD001949—Creditnet Enrollment Form.
FRD001951—Creditnet Enrollment Form.
FRD001953—Creditnet Enrollment Form.
FRD001954—Creditnet Enrollment Form.
FRD001955—Creditnet Enrollment Form.
FRD001956—Creditnet Enrollment Form.
FRD001958—Creditnet Enrollment Form.
FRD001960—Creditnet Enrollment Form.
FRD001964—Creditnet Enrollment Form.
FRD001965—Creditnet Enrollment Form.
FRD001967—Creditnet Enrollment Form.
FRD001968—Creditnet Enrollment Form.
FRD001969—Creditnet Enrollment Form.
FRD001970—Creditnet Enrollment Form.
FRD001971—Creditnet Enrollment Form.

FRD001972—Creditnet Enrollment Form.
FRD001973—Creditnet Enrollment Form.
FRD001974—Creditnet Enrollment Form.
FRD001975—Creditnet Enrollment Form.
FRD001976—Creditnet Enrollment Form—Bill Elliott Ford Merc.
FRD001977—Creditnet Enrollment Form—J.Williams Nissan.
FRD001978—Creditnet Enrollment Form—Jim Skinner Honda.
FRD001979—Creditnet Enrollment Form—Interstate Ford Inc.
FRD001980—Creditnet Enrollment Form—Sylvania Ford Mercury, Inc.
FRD001981—Creditnet Enrollment Form—Bev Smith Ford.
FRD001982—Creditnet Enrollment Form—Bev Smith Ford.
FRD001984—Creditnet Enrollment Form—Stadcom Lincoln Mercury.
FRD001986—Creditnet Enrollment Form—Frontier Ford L/M.
FRD001988—Creditnet Enrollment Form—Brumfield Motors Inc.
FRD001989—Creditnet Enrollment Form—Woody Anderson Ford.
FRD001990—Creditnet Enrollment Form—Hollywood Lincoln Mercury.
FRD001992—Creditnet Enrollment Form·Fort Myers Lincoln Mercury.
FRD001993—Creditnet Enrollment Form—Bondys Ford.
FRD001994—Creditnet Enrollment Form—Potamkin Toyota.
FRD001996—Creditnet Enrollment Form—Kirby Ford.
FRD001997—Creditnet Enrollment Form—Graham Chrysler Plymouth, Inc.
FRD001998—Two Way Memo re: T&J Ford, Inc.
FRD001999—Creditnet Enrollment Form—Jacky Jones Ford.
FRD002001—Creditnet Enrollment Form—Wayne Akers Ford Inc.
FRD002002—Creditnet Enrollment Form—Jim Quinlan Chevrolet.
FRD002003—Creditnet Enrollment Form—Shetler-Corley Ford, Inc.
FRD002005—Creditnet Enrollment Form—Bartow Ford Company.
FRD002006—Jul. 27, 1992 Interoffice Memo re: Bartow Ford Co.
FRD0020070—Creditnet Enrollment Form—Terry Ford.
FRD002008—Creditnet Enrollment Form—All Star Dodge-Isuzu.
FRD002010—Creditnet Enrollment Form—Paul James Ford.
FRD002011—Creditnet Enrollment Form—Gateway Motor Inc.
FRD002012—Creditnet Enrollment Form—Beaty Ford, Inc.
FRD002013—Creditnet Enrollment Form—Lakes Lincoln-Mercury, Inc.
FRD002014—Creditnet Enrollment Form—Jul. 8, 1993 memo to AJ Wagner re: Lakes Lincoln Mercury.
FRD002015—Creditnet Enrollment Form -Scarbrough Motors.
FRD002016—Creditnet Enrollment Form—Palmetto Ford.
FRD002018—Creditnet Enrollment Form—Capital Lincoln-Mercury.
FRD002020—Creditnet Enrollment Form—Dennis Fronrath Chevrolet, Inc.
FRD002021—Creditnet Enrollment Form—Sam Galloway Ford.
FRD002022—Creditnet Enrollment Form—Supreme Olds-GMC, Chrysler Ply.
FRD002023—Creditnet Enrollment Form—North Palm L/M.
FRD002025—Creditnet Enrollment Form—North Palm Lincoln Mercury.
FRD002026—Creditnet Enrollment Form—Jacky Jones Ford of Blue Ridge.
FRD002027—Creditnet Enrollment Form—Cain Ford Lincoln Mercury.
FRD002028—Creditnet Enrollment Form—Warren Wooten Ford.
FRD002029—Creditnet Enrollment Form—Williams Automotive Inc. DBA Williams Mazda.
FRD002030—Creditnet Enrollment Form—Head Ford Mercury Lincoln Inc.
FRD002031—Creditnet Enrollment Form—Johnson Ford Sales Inc.
FRD002032—Creditnet Enrollment Form—Maroone Dodge, Inc.
FRD002033—Creditnet Enrollment Form—Jim Blackman.
FRD002034—Creditnet Enrollment Form—Dub Herring Ford Inc.
FRD002035—Creditnet Enrollment Form—Dub Herring Ford Inc.
FRD002036—Creditnet Enrollment Form—Lakes Lincoln-Mercury, Inc.
FRD002037—Creditnet Enrollment Form—Hab Ford.
FRD002038—Creditnet Enrollment Form—Black-Jack Inc. DBA Gary Smith Honda.
FRD002039—Creditnet Enrollment Form—Stuard Ford Lincoln Mercury Partners.
FRD002040—Creditnet Enrollment Form—Tom W. Carter Lincoln-Mercury, Inc.
FRD002041—Creditnet Enrollment Form—M.L. Husbands Ford Inc.
FRD002042—Creditnet Enrollment Form—Searritt Motors.
FRD002043—Creditnet Enrollment Form—Newport Lincoln-Mercury.
FRD002044—Creditnet Enrollment Form—Marshall Bros. Lincoln Mercury.
FRD002047—Creditnet Enrollment Form—Hardy Chev-Geo.
FRD002048—Creditnet Enrollment Form—Butler Ford Mercury, Inc.
FRD002049—Creditnet Enrollment Form—Troy Ford Sales Inc.
FRD002051—Creditnet Enrollment Form—Shetler Lincoln Mercury Ltd.
FRD002053—Creditnet Enrollment Form—Kirk Auto Co.
FRD002054—Creditnet Enrollment Form—Tampa Honda Land.
FRD002055—Creditnet Enrollment Form—Resort Ford, Inc.
FRD002056—Creditnet Enrollment Form—Far of AL DBA Auburn Mazda.
FRD002057—Creditnet Enrollment Form—Haralson Ford Company.
FRD002058—Creditnet Enrollment Form—Alex Karras Lin-Mer.
FRD002059—Blank Sheet.
FRD002060—Creditnet Enrollment Form—Sapp Ford Co.
FRD002061—Creditnet Enrollment Form—McGarily Ford Inc.
FRD002062—Creditnet Enrollment Form -Gurdon Ford Inc.
FRD002063—Creditnet Enrollment Form—Noxubee Ford, Inc.
FRD002064—Creditnet Enrollment Form—Duval Acura At Regency.
FRD002065—Creditnet Enrollment Form—Freeway Ford, Inc.
FRD002066—Creditnet Enrollment Form—Germano Toyota.
FRD002067—Creditnet Enrollment Form—Gary Fronrath Chevrolet.
FRD002068—Creditnet Enrollment Form—Don Shetler Ford, Inc.
FRD002070—Creditnet Enrollment Form—Menten Motors, Inc. dba Chrysler Plymouth and Jeep Eagle.
FRD002071—Creditnet Enrollment Form—Gibbs Ford Mercury, Inc.
FRD002072—Creditnet Enrollment Form—Efird Ford Inc.
FRD002073—Creditnet Enrollment Form—Wansley Motor Company, Inc.
FRD002074—Creditnet Enrollment Form—Kelly Ford, Inc.
FRD002075—Creditnet Enrollment Form—Bob Wade Ford Inc.
FRD002076—Creditnet Enrollment Form—Superior Ford.
FRD002078—Creditnet Enrollment Form—Bordelon Motors, Inc.
FRD002080—Creditnet Enrollment Form—Legacy Ford-Mercury, Inc.
FRD002081—Creditnet Enrollment Form—Stadium Lincoln Mercury.
FRD002082—Creditnet Enrollment Form—Delray Lincoln Mercury.
FRD002085—Creditnet Enrollment Form—Jim Quinlan Ford.
FRD002086—Creditnet Enrollment Form—Vickery-Chevrolet-Olds Co.
FRD002087—Creditnet Enrollment Form—Luke Bolton Ford.
FRD002088—Creditnet Enrollment Form—Premiuer Ford Lincoln-Mercury.
FRD002090—Creditnet Enrollment Form—Ward S. Taylor.
FRD002091—Credinet Enrollment Form—D.C. Welch Ford Lincoln Mercury Inc.
FRD002093—Creditnet Enrollment Form—Montezuma Motor Co.
FRD002096—Creditnet Enrollment Form—Superior Ford.
FRD002098—Creditnet Enrollment Form—McGarily Ford Inc.
FRD002100—Creditnet Enrollment Form—Resort Motors.
FRD002101—Creditnet Enrollment Form—Murphy-Graham, Inc.
FRD002102—Creditnet Enrollment Form—North Point Mazda.
FRD002105—Creditnet Enrollment Form—Tim Kratzer.
FRD002106—Creditnet Enrollment Form.

FRD002107—Creditnet Enrollment Form—Kelly Lincoln Mercury.
FRD002108—Creditnet Enrollment Form—Kelly Lincoln Mercury.
FRD002109—Creditnet Enrollment Form—Gateway Ford Mercury Inc.
FRD002110—Creditnet Enrollment Form—Paul West Mitsubishi.
FRD002111—Creditnet Enrollment Form—Duval Honda.
RTC000001—Coinlink.
RTC000002—Coinlink Flowchart and description.
RTC000019—Sheet indicating Doc. Nos. were not used RTC 19-28.
RTC000029—Coinlink/Dealerships/Finance Sources features.
RTC000032—Handwritten Notes To Be Resolved.
RTC000038—Oct. 20, 1987 Memo to Sam Smail from Valerine Cline re: Coinlink equipment loan acknowledgement.
RTC000040—Site Prep/Pilot Implementation.
RTC000042—Coinlink Pilot Implementation.
RTC000044—System Administrator's Installation Guide.
RTC000047—Electrical Contractors Installation Guide.
RTC000050—CoAmerica file folder label.
RTC000051—Comerica@coin May 7, 1987 notes.
RTC000056—Lender Market Research.
RTC000059—Coinlink Lender Survey.
RTC000071—Coinlink Network Inc. Technical Specifications Manual—Overview.
RTC000120—Metro-teller Indirect Application Master Data Definition.
RTC000126—Coinlink Network Inc. Technical Specifications Manual Message formats.
RTC000188—Presentations file folder label.
RTC000189—Notes—goals of presentation.
RTC000197—Notes—VP commercial loans.
RTC000204—Network Presentation Shot Sheet Feb. 10, 1987.
RTC000205—The Network/Empire Bank Dec. 9, 1986.
RTC000212—Narrative of Empire Bank.
RTC000213—Mar. 9, 1988 Coinlink Manufacturing/Operations Part VI.
RTC000222—Overview Business Mission.
RTC000229—Jun. 23, 1988 memo re: CBA conference Sep. 25-28, 1988.
RTC000230—Program At A Glance.
RTC000232—Project Management file folder label.
RTC000233—Coinlink Project—May 1, 1989.
RTC000255—Feb. 17, 1989 memo to Fran Kooden from Valerie Cline re: status codes from lenders.
RTC000257—Features of Coinlink.
RTC000261—Trainer's training Friday, Jan. 22.
RTC000265—Bank Network News Article—Metroteller: Shifting Gears to Loan Networking.
RTC000267—Feb. 16, 1988 article in The Atlanta Constitution—Electronic network links car dealers, lenders.
RTC000268—Dec. 12, 1986 Notes.
RTC000279—Coinlink Status Log.
RTC000284—CB&T Notes Nov. 9, 1988.
RTC000290—Coinlink Letter dated Jun. 28, 1988 to Bob Divine.
RTC000292—Coinlink Feature/Benefit Analysis Dec. 7, 1987.
RTC000304—Coin news article—Coinlink to change way auto loans are approved.
RTC000307—Coin news article—Application Manager.
RTC000309—Coin business card for Diane Bates.
RTC000310—Coinlink Functional Specification Feb. 1988.
RTC000321—Gateway Terminal Functional Specifications Jun. 17, 1988.
RTC000324—Dealer Systems.
RTC000353—Jun. 29, 1988 Memo to John Hiemstra & Jim Javors re: ILS/Coinlink Gateway Terminal.
RTC000357—Coinlink Flowchart/features/pictures.
RTC000458—Apr. 20, 1988 memo to Richard Calmes from Jim Kiernicki re: Coinlink leads.
RTC000460—Coinlink Functional Specification.
RTC000473—Mar. 21, 1988 Letter to Metroteller Systems Inc. from Coin.
RTC000476—Software info/Dealer flow charts.
RTC000618—Dealer Market [Coinlink] Notes.
RTC000628—Notes 2/12—Empire-Metro Teller.
RTC00639—Product Development Needs.
RTC000643—Notes Mar. 28, 1988—Coinlink Auto/Banking.
RTC000647—Agreement Aug. 28, 1987.
RTC000655—Coinlink network functions—overview.
RTC000657—Coinlink Feature/Benefit Analysis updated Dec. 7, 1987.
RTC000670—Jul. 13, 1987 Comerica letter to Mark Singleton, Coin.
RTC000673—May 22, 1987 Comerica letter to Mark Singleton attaching confidentiality agreement.
RTC000680—Business cards.
RTC000682—Jul. 1986 Public Network Rate Schedule.
RTC000696—Oct. 7, 1988 letter to Thomas E. Kress.
RTC000699—NFADA Dealership Pilot Agreement Outline.
RTC000702—Data Communications Service Agreement.
RTC00717—Dec. 22, 1986 Agreement.
RTC000803—Magazine articles.
RTC000814—Bank Network News Feb. 10, 1988 article.
RTC000816—Automotive News Feb. 8, 1988 article.
RTC000817—The Coin Story.
RTC000819—Various articles.
RTC000829—The Coin Proposal.
RTC000857—Son of Chrysler Pres. File folder label.
RTC000860—Coinlink Gateway Terminal Specifications Jul. 7, 1988.
RTC000884—Network World Articles Mar. 6, 1989.
RTC000889—Dealership Open Systems Coalition May 1993.
RTC000935—Coinlink Flow Charts, articles.
RTC000950—Black box file folder label.
RTC000951—V link project 8/28.
RTC000955—Coinlink file folder label.
RTC000956—Menus for Coinlink dated Jul. 1, 1987.
RTC000960—Sep. 17, 1987 letter to J. Harold Middleton from Coin.
RTC000962—Directions to Fulton Federal dated Sep. 15, 1987.
RTC000963—Sep. 2, 1987 Existing itmes on to do list.
RTC000965—Jul. 7, 1987 Status Report on Coinlink.
RTC000975—Jul. 2, 1987 Notes.
RTC000976—Jun. 26, 1987 Notes.
RTC000977—Jun. 24, 1987 Beta Test Sites for Coinlink.
RTC000980—Project Mangement file folder label.
RTC000981—Tentative agenda for next NFADA meeting.
RTC000983—Feb. 17, 1989 memo re: lease application fields.
RTC000985—Feb. 17, 1989 memo re: status codes from lenders.
RTC000987—Feb. 17, 1989 memo re: lease application fields.
RTC000991—Note Feb. 17, 1989.
RTC000992—Mar. 6, 1989 Memo re: Dealer Visits, Mar. 1-3.
RTC000994—Dec. 15, .sub.—Notes.
RTC000995—Chart.
RTC000996—Coinlink Project Status Report Mar. 28, 1988.
RTC001002—Notes.
RTC001008—Meetings in Buffalo—tentative itinerary for New York trip as of Nov. 1, 1988.
RTC001009—Coinlink Project Status Report Mar. 28, 1988.
RTC001015—Coinlink Project Management Plan, dated Feb. 1988.
RTC001023—Deadlines for Coinlink, dated Sep. 3, 1987.
RTC001025—Subfile folder entitled "Status Log".
RTC001026—Status Log.
RTC001027—Subfile folder entitled "Tech Specs & Tech Issues".
RTC001028—Draft letter dated Feb. 2, 1989 to Susan from Valerie.
RTC001029—Subfile folder entitled "Host Systems Coinlink Functionals Specs."
RTC001030—Coinlink Functional Descriptions.
RTC001032—Subfile folder entitled "For The COIN Dealership".
RTC001033—Advertisement For the COIN Dealership.
RTC001034—Advertisement For the COIN Dealership.
RTC001035—Subfile folder entitled "Description".
RTC001036—Advertisement For the Lender.
RTC001037—Subfile folder entitled "COINLink Diagram".
RTC001038—COINLink Automated Credit Approval.
RTC001039—COINLink Dealers.
RTC001040—Chart.
RTC001044—COINLink Worst Case Scenario Chart.
RTC001056—COINLink Best Case Scenario Chart.
RTC001056—Notes.

RTC001062—Notes.
RTC001065—Notes—Primary Market Entry.
RTC001066—Notes.
RTC001067—Notes.
RTC001068—Miscellaneous.
RTC001087—Chart—Coin Customers.
RTC001089—Chart.
RTC001090—Chart.
RTC001091—Chart.
RTC001104—Chart—GM Dealers.
RTC001110—Chart—Ford Dealers.
RTC00114—Chart—MW—Dealers.
RTC001118—Chart—MW/GM Dealers.
RTC001120—Chart—MW/Ford Dealers.
RTC001121—Chart—MW Dealers.
RTC001122—Chart—Total SE—Dealers.
RTC001125—Chart—SE—Coin Dealers.
RTC001126—Chart—SE—COINLink Dealers.
RTC001127—Chart—SE—GM Dealers.
RTC001129—Chart—SE—Ford Dealers.
RTC001130—Chart—SE—C/P Dealers; SE—Toyota Dealers.
RTC001131—Chart—SE Dealers.
RTC001132—Chart—Northeast Region—Dealers.
RTC001135—Chart—NE—Coin Dealers.
RTC001136—Chart—NE—COINLink Dealers.
RTC001137—Chart—NE—GM—Dealers.
RTC001138—Chart—NE—Ford Dealers.
RTC001139—Chart—N.E.—Dealers.
RTC001140—Chart—NE Dealers.
RTC001141—Subfile folder entitled "Dealer Market Research".
RTC001142—COINLink Lease Line Connections.
RTC001144—To Valerie Cline from Paul Woodworth re: COINLink Presentation.
RTC001154—Site Specific Information.
RTC001155—Site Specific Information.
RTC001156—Miscellaneous.
RTC001157—Addendum to Site Prep Form.
RTC001158—Checklists.
RTC001159—Serial Number List.
RTC001160—COINLink Automated Credit Approval System Training Confirmation Agreement.
RTC001161—Credinet Enrollment.
RTC001162—Terminal Installation Check List.
RTC001166—COIN Financial Systems, Inc. Pre-Installation Check List.
RTC001167—COIN Financial Systems, Inc. Site Preparation Check List.
RTC001168—Training Schedule.
RTC001169—Subfile folder entitled "COINLink Business Plans".
RTC001170—COINLink Preliminary Marketing Plan.
RTC001171—Miscellaneous.
RTC001185—COINLink Network Inc. Technical Specifications Manual—Overview.
RTC001297—Subfile folder entitled "C.B. & T."
RTC001298-RTC001303—C.B. &T. notes.
RTC001304—Fax cover sheet to B. Divine.
RTC001305-RTC001306 Corres. from COINLink to Mr. Divine.
RTC001307-RTC001308—Corres. from COINLink to Mr. Divine.
RTC001309-RTC001315—COINLink Master Agreement for Service.
RTC001316-RTC001317—Fax to B. Divine at CB&T.
RTC1318-RTC1319—Corres. from COINLink to Mr. Divine.
RTC001320—Corres. from COINLink to Mr. Divine.
RTC001321—Corres. from CB&T to P. Wills.
RTC001322-RTC001328—Proposed record layout for CBT.
RTC001329-RTC001332—System Diagram.
RTC001333—Applications.
RTC001334-RTC001339—Corres. & Occupation codes.
RTC001340-RTC0013357—Occupation codes.
RTC001358-RTC001359—Buyer & Purchase Information.
RTC001360-RTC001363—Status Log.
RTC001364-RTC001366—Contacts & Price List.
RTC001367-RTC001369—Corres. to T. Kress.
RTC001370-RTC001371—NFDA Dealership Pilot Agreement Outline.
RTC001372-RTC001374—Fax regarding revisions to S. Sterman from V. Cline.
RTC001375-RTC001377—Corres. regarding COINLink.
RTC001378-RTC001382—Corres. regarding COINLink.
RTC001383—Data Communications Service Agreement.
RTC001384—Master Agreement for COINLink Service.
RTC001385-RTC001394—Terms & Conditions.
RTC001395-RTC001396—COINLink Services Price List.
RTC001397—Discount Schedule.
RTC001398—Charter Members Discount Schedule.
RTC001399-RTC001408—Corres. regarding COINLink.
RTC001403-RTC001412—Corres. enclosing Agreement to M. Singleton from J. Wolfson.
RTC001413-RTC001431—COINLink Overheads.
RTC1431-RTC 001446—COINLink Interfaces.
RTC001447-RTC001454Comerica.
RTC001455-RTC001460—Corres. Enclosing Confidentiality Agreement.
RTC001461-RTC001462—COINLink Diagrams.
RTC001463-RTC1466—Frost & Sullivan Information Security Questionnaire.
RTC001467—Memo to S. Langdon.
RTC001468-RTC001473—Directions to Comerica Acceptance Corp. from Metro Airport, MI.
RTC001474-RTC001477—Written notes on Detroit Meeting Jun. 16, 1987.
RTC001478-RTC001479—Comerica's Agenda Jun. 16, 1987.
RTC001408-RTC1488—COINLink Diagrams.
RTC001408—Phone message.
RTC001490—Comeria's Agenda.
RTC001491-RTC001493—Written notes re: Comerica.
RTC001493—Comerica contacts.
RTC001494-RTC001529—Comerica Acceptance Corp.
RTC001530—Comerica Acceptance Corp. ALPS Project Phase 1—Loan Origination System.
RTC001531—Written notes to S. Laydon.
RTC001532-RTC001535—Comerica Communique, Apr. 1987.
RTC001536—Empire.
RTC001537—Contacts of Empire of America.
RTC001538-RTC001539—Article from The Wall Street Journal.
RTC001540—GTE Telenet Telemail Rade Schedule.
RTC001541—Written notes re: Basic Transactions for Typical Deal.
RTC001542—Written notes re: Coinsystem or Dedicated Stand Alone.
RTC001555-RTC001567—Public Network Rate Schedule.
RTC001568—Metroteller Interchange Locations.
RTC001569-RTC001582—Metroteller Update.
RTC001583-RTC001584—List of Fields.
RTC001585-RTC001587—Status Codes from Lenders.
RTC001588-RTC001590—Technical Update.
RTC001591—Update on Status of COINLink Project.
RTC001592-RTC001598—Revised Summary of Changes and Time Estimates.
RTC001599-RTC001630—COINLink Summary of Changes and Time Estimates.
RTC001631-RTC001634—COINLink Survey.
RTC001635-RTC001638—COINLink Lender Survey.
RTC0010639-RTC001642—COINLink Lender Survey.
RTC001643-RTC001646—COINLink Lender Survey.
RTC001647-RTC001650—COINLink Lender Survey.
RTC001651-RTC001654—COINLink Lender Survey.
RTC001655-RTC001658—COINLink Lender Survey.
RTC001659-RTC001662—COINLink Lender Survey.
RTC001663-RTC001666—COINLink Lender Survey.
RTC001667-RTC001670—COINLink Lender Survey.
RTC001671-RTC001001674—COINLink Lender Survey.
RTC001675-RTC001678—COINLink Lender Survey.
RTC001679-RTC001682—COINLink Lender Survey.
RTC001683-RTC001686—COINLink Lender Survey.
RTC001687-RTC001690—COINLink Lender Survey.
RTC001691-RTC001694—COINLink Lender Survey.

RTC001695-RTC001698—COINLink Lender Survey.
RTC001699-RTC001702—COINLink Lender Survey.
RTC001703-RTC001706—COINLink Lender Survey.
RTC001707-RTC001710—COINLink Lender Survey.
RTC001711-RTC001714—COINLink Lender Survey.
RTC001715-RTC0718—COINLink Lender Survey.
RTC001719-RTC001722—COINLink Lender Survey.
RTC001723-RTC001726—COINLink Lender Survey.
RTC001727-RTC001730—COINLink Lender Survey.
RTC001731-RTC001734—COINLink Lender Survey.
RTC001735-RTC001738—COINLink Lender Survey.
RTC001739-RTC001742—COINLink Lender Survey.
RTC001743-RTC001744—COINLink Lender Survey.
RTC001746-RTC001749—COINLink Survey.
RTC001750-RTC001753—COINLink Lender Survey.
RTC001754-RTC001757—COINLink Lender Survey.
RTC001758-RTC001761—COINLink Lender Survey.
RTC001762-RTC001765—COINLink Lender Survey.
RTC001766-RTC001769—COINLink Lender Survey.
RTC001770-RTC001773—COINLink Lender Survey.
RTC001774-RTC001777—COINLink Lender Survey.
RTC001778-RTC001781—COINLink Lender Survey.
RTC001782-RTC001785—COINLink Lender Survey.
RTC001786-RTC001789—COINLink Lender Survey.
RTC001790-RTC001793—COINLink Lender Survey.
RTC001794-RTC001797—COINLink Lender Survey.
RTC001798-RTC001801—COINLink Lender Survey.
RTC001802-RTC001805—COINLink Lender Survey.
RTC001806-RTC1809—COINLink Lender Survey.
RTC001810-RTC001813—COINLink Lender Survey.
RTC001814-RTC001817—COINLink Lender Survey.
RTC001818-RTC001821—COINLink Lender Survey.
RTC001822-RTC001825—COINLink Lender Survey.
RTC001826-RTC001829—COINLink Lender Survey.
RTC001830-RTC001833—COINLink Lender Survey.
RTC001834-RTC001837—COINLink Lender Survey.
RTC001838-RTC001841—COINLink Lender Survey.
RTC001842—Conflict.
RTC001843-RTC001854—Georgia DMV/Microscience.
RTC001855-RTC001880—COIN pictures.
RTC001881-RTC001883—CBI Update.
RTC001884-RTC001887—COINLink Budget.
RTC001888-RTC001891—New Name for COINLink.
RTC001892-RTC001899—Business & Product Plannin and Development team Plan for NADA 1988.
RTC001900-RTC001929—COINLink Plan Spreadsheets.
RTC001930—CBA Annual Show/San Diego.
RTC001931—CBA Auto Finance Show/Tampa.
RTC001932-RTC001964—1989 NADA Budgets.
RTC001965-RTC001970—COIN Data.
RTC001971-RTC002004—Marks Notes.
RTC002005-RTC002007—COIN Bldg. 500.
RTC002008—Oakleaf Convergent.
RTC002009-RTC2015—Coin Memo to J. Maloney.
RTC002016—Written notes.
RTC002017—Son of Chrysler Pres.
RTC002018-RTC002021—Agreement Between Chrysler Credit Corp. & Coin Financial.
RTC002022—Certified Collateral Corp.
RTC002023—Corres. from R. Calmes to H. Tullman.
RTC002024-RTC002031—COINLink System Function Outline.
RTC002032—Corres. from R. Calmes to H. Tullman.
RTC002033-RTC002036—Corres. to J. Hiemstra from K. Wynn.
RTC002037-RTC002063—Metroteller Project Plannin Meeting.
RTC002064-RTC002094—Metroteller History.
RTC002095-RTC002104 Policy Memos.
RTC002105-RTC002114—NFADA.
RTC002115—Fax cover sheet.
RTC002116-RTC002122—Written notes.
RTC002123-RTC002132—NFADA Dealer Survey.
RTC002133-RTC002135—Corres. to R. Welte from J. Wolfson.
RTC002136—Agenda for NFDA Slide Show Planning Meeting.
RTC002137-RTC002138—NFADA Presentation.
RTC002139-RTC002142—NFADA Committee Meeting Agenda.
RTC002143-RTC002146—Discussion Outline.
RTC002147-RTC002155—NFADA Project Planning Session.
RTC002156-RTC002153—NFADA Planning Discussion Outline.
RTC002159—Memo to D. Gordon, M. Singleton, J. Hiemstra.
RTC002160—Fax Cover Sheet.
RTC002161—Memo to S. Sterman from V. Cline.
RTC002162-RTC002164—Memo to Board of Directors from D. Welte.
RTC002165—Marine Midland.
RTC002166—Status.
RTC002167-RTC002170—Corres. to T. Kress from S. Sterman.
RTC002171—Gateway Coinlink.
RTC002172-RTC002178—Corres. to J. Schreiber re: PCR.
RTC002179-RTC002181—Written notes.
RTC002182—Memo re: Gateway Terminal Equipment Requeirments.
RTC002183-RTC002184—Memo re: PC Rental Survey.
RTC002185-RTC002195—Gateway Terminal Functional Specifications.
RTC002196—Lender Gateway Device.
RTC002197-RTC002205—CoinLink Lender Gateway Terminal Functional Specifications.
RTC002206-RTC002223—Product Repackaging Overheads.
RTC002224-RTC002239—Trainer's Training.
The United States District Coourt for the Eastern District of New York; Initial Expert Report of David Klausner for Defendant routeone LLC Concerning U.S. Patent Nos. 5,878,403 and 6,587,841.
File Wrapper for 5,8778,403.
File Wrapper for 6,587,841.
Cassette Tape 1998 Auto Finance Conference.
The United States District Court for the Central District of California; Defendants' Answer to Amended Complaint for Patent Infringement and Counterclaims Concerning U.S. Patent No. 7,181,427.
"CMSI and HNC, Inc. Provide Credit Processing System" Bank Marketing, Aug. 1993, p. 45, 1 page.
"Department Store Reconfigures Credit Decision Process" Credit Risk Management Report, vol. 2, No. 20, Sep. 28, 1992, 2 pages.
Clark, "Royal Bank to Emphasize Indirect Auto Lending" American Banker, vol. 163, No. 185, Sep. 28, 1998, p. 17, 2 pages.
Michaelson, "Outsource Financial Chooses CMSI" National Mortgage News, vol. 22, No. 39, Jun. 22, 1998, p. 39, 2 pages.
Moyer, "Due Soon from Wells Fargo: 10-Minute Car Loans" American Banker, vol. 161, No. 126, Jul. 2, 1996, p. 16, 2 pages.
Office Action issued in related U.S. Patent No. 5,878,403, mailed Mar. 31, 1998, 12 pages.
Notice of Allowance issued in related U.S. Patent No. 5,878,403, mailed Jun. 23, 1998, 5 pages.
Office Action issued in related U.S. Patent No. 6,587,841, mailed Sep. 27, 2001, 8 pages.
Notice of Allowance issued in related U.S. Patent No. 6,587,841, mailed Feb. 12, 2003, 12 pages.
Office Action issued in related U.S. Appl. No. 10/441,534, mailed Jun. 6, 2007, 9 pages.
Office Action issued in related U.S. Appl. No. 10/649,397, mailed Jan. 10, 2008, 5 pages.
Office Action issued in related U.S. Appl. No. 10/650,596, mailed Dec. 19, 2007, 10 pages.
Office Action issued in related U.S. Appl. No. 10/702,568, mailed Oct. 3, 2007, 13 pages.
Office Action issued in related U.S. Patent No. 7,181,427, mailed Jan. 19, 2000, 14 pages.
Final Office Action issued in related U.S. Patent No. 7,181,427, mailed Dec. 20, 2000, 12 pages.
Office Action issued in related U.S. Patent No. 7,181,427, mailed Jun. 6, 2001, 10 pages.
Office Action issued in related U.S. Patent No. 7,181,427, mailed Dec. 21, 2001, 12 pages.
Office Action issued in related U.S. Patent No. 7,181,427, mailed Sep. 25, 2002, 9 pages.
Office Action issued in related U.S. Patent No. 7,181,427, mailed Mar. 19, 2003, 12 pages.

Final Office Action issued in related U.S. Patent No. 7,181,427, mailed Feb. 1, 2005, 8 pages.
Office Action issued in related U.S. Patent No. 7,181,427, mailed Aug. 1, 2005, 6 pages.
Notice of Allowance issued in related U.S. Patent No. 7,181,427, mailed Nov. 15, 2006, 7 pages.
Office Action issued in related U.S. Appl. No. 09/247,222, mailed Jan. 28, 2000, 10 pages.
Office Action issued in related U.S. Appl. No. 09/247,222, mailed Apr. 21, 2000, 10 pages.
Notice of Allowance issued in related U.S. Appl. No. 09/247,222, mailed Aug. 2, 2000, 6 pages.
Office Action issued in related U.S. Appl. No. 09/247,222, mailed Sep. 8, 2006, 7 pages.
Final Office Action issued in related U.S. Appl. No. 09/247,222, mailed Jun. 5, 2007, 8 pages.
Office Action issued in related U.S. Appl. No. 09/247,222, mailed Feb. 25, 2008, 9 pages.
Office Action issued in related U.S. Patent No. 6,208,979, mailed Apr. 18, 2000, 13 pages.
Notice of Allowance issued in related U.S. Patent No. 6,208,979, mailed Aug. 14, 2000, 7 pages.
Office Action issued in related U.S. Appl. No. 10/559,066, mailed Jul. 2, 2007, 8 pages.
Final Office Action issued in related U.S. Appl. No. 10/702,568, mailed May 28, 2007, 10 pages.
Final Office Action issued in related U.S. Appl. No. 10/650,596, mailed Jul. 25, 2008, 11 pages.
Office Action issued in related U.S. Appl. No. 11/648,943, mailed Dec. 23, 2008, 15 pages.
Office Action issued in related U.S. Appl. No. 10/559,066, mailed Jan. 27, 2009, 11 pages.
Examination Report issued in related European Application No. 99958841.1, mailed Nov. 20, 2006, 5 pages.
International Preliminary Report on Patentability, Chapter II, for corresponding PCT Application No. PCT/US2004/025866, completed Jun. 27, 2005, 16 pages.
International Search Report for corresponding PCT Application No. PCT/US2004/025866, mailed Feb. 18, 2005, 1 page.
Written Opinion for corresponding PCT Application No. PCT/US2004/025866, mailed Feb. 18, 2005, 3 pages.
Digital Handshake Registry Process, White Paper, ILumin Corporation, 2002, 6 pages.
Digital Handshake Secure Transaction Execution E-Sign and UETA Compliance, iLumin Corporation, 2001, 11 pages.
Digital Vault Authority, Technical White Paper, ILumin Corporation, 2001, 10 pages.
iLumin DHS Proposal, presented and prepared by Bob McGuinness of iLumin to DealerTrack on Oct. 1, 2001, 7 pages.
Office Action issued in related U.S. Appl. No. 10/649,397, mailed Feb. 27, 2009, 10 pages.
Office Action issued in related U.S. Appl. No. 10/441,534, mailed May 13, 2009, 9 pages.
Final Office Action issued in related U.S. Appl. No. 10/650,596, mailed Jul. 8, 2009, 13 pages.
Order Ruling on Claim Construction Arguments, United States District Court for the Central District of California, *DealerTrack, Inc.* v. *David L. Huber, Finance Express, LLC, and John Doe Dealers*; and *DealerTrack, Inc.* v. *RouteOne LLC, David L. Huber, and Finance Express, LLC*, Case No. CV 06-2335 AG (FMOx), Sep. 27, 2008, 31 pages.
Order Granting Motion for Summary Judgment for Invalidity of '427 Patent, United States District Court for the Central District of California, *DealerTrack, Inc.* v. *David L. Huber, Finance Express, LLC, and John Doe Dealers*, Case No. CV 06-2335 AG (FMOx), Jul. 7, 2009, 7 pages.
Final Office Action issued in related U.S. Appl. No. 10/649,397, mailed Oct. 30, 2009, 6 pages.
Final Office Action issued in U.S. Appl. No. 10/650,596, mailed Apr. 15, 2010, 10 pages.
Final Office Action issued in related U.S. Appl. No. 10/559,066, mailed Nov. 12, 2009, 8 pages.

* cited by examiner

CREDIT CONNECTION®

VERSION 1.0 -- DEALERS CREDIT PROCESSING SYSTEM
COPYRIGHT 1994 CREDIT MANAGEMENT SOLUTIONS, INC.

ENTER USERID: _____ ENTER PASSWORD:

ENTER YOUR USERID OR TYPE EXIT TO EXIT CREDIT CONNECTION®

*FIG. 3A1*

REFERENCE NO 2220    NEW BUSINESS APP (NEW FIRST GUARANTOR, NEW SECOND GUARANTOR)    PENDING

─────────────────────────── BUSINESS INFORMATION ───────────────────────────

BUSINESS NAME : _____
ADDRESS       : _____   TYPE: _
CITY          : _____   COUNTRY: ____   STATE: __   ZIP: ____   HOW LONG?: _ _
TAX ID        : _____   PHONE: ( ) _ - ____

─────────────────────────── BUSINESS MISC ───────────────────────────

NATURE OF BUSINESS      : _____
NET PROFIT              : $0.00         NET WORTH: $0.00
DUN & BRADSTREET NO.    : _____
AFFILIATE/SUBSIDIARY    : _____

─────────────────────────── BUSINESS OFFICERS ───────────────────────────

OFFICER NAME: _____   TITLE: _____   PERCENT OWNER: 0.00   SIGNING OFFICER?: NO
OFFICER NAME: _____   TITLE: _____   PERCENT OWNER: 0.00   SIGNING OFFICER?: NO
OFFICER NAME: _____   TITLE: _____   PERCENT OWNER: 0.00   SIGNING OFFICER?: NO

CREDIT CONNECTION®                          0   ($0.00)                         2:19 PM
ENTER THE BUSINESS'S NAME.

*FIG. 3B(1)*

REFERENCE NO 2220    THE BUSINESS (NEW FIRST GUARANTOR, NEW SECOND GUARANTOR)    PENDING

———APPLICANT NAME AND ADDRESS———
FIRST NAME:          M.I. :       LAST:           SUFFIX:
SS NO    :    -   -     DOB: __/__/__    PHONE: (   ) -      MARITAL : _    DEPEN.: 0
ADDRESS  :
CITY     :           COUNTY:           STATE: __    ZIP:        HOW LONG : 0 0
RES TYPE :           LANDLORD:                     RENT: $0

———APPLICANT PREVIOUS ADDRESS———
PREV ADDR :
CITY      :          COUNTY:           STATE: __    ZIP:        HOW LONG : 0 0

———APPLICANT'S RELATIVE———
RELATIVE  :
ADDRESS   :
CITY      :          STATE:           ZIP:
PHONE     :          RELATIONSHIP:

CREDIT CONNECTION®                   0    ($0.00)                    2:19 PM
ENTER THE APPLICANT'S FIRST NAME.

*FIG. 3C*

REFERENCE NO 2220　　　THE BUSINESS (JONES BOB J, NEW SECOND GUARANTOR)　　　PENDING

——————————————————APPLICANT EMPLOYMENT——————————————————
EMPL TYPE: Q OTHER
EMPLOYER:
ADDRESS:
CITY　　　　　　　STATE: _　　ZIP:　　　　HOW LONG: 0　0　MILITARY?: _
PHONE　:　(　)　　　OCCUPATION:　　　　　　　　GROSS SALARY: $0　　　BASIS: M MONTH

——————————————————APPLICANT PREVIOUS EMPLOYMENT——————————————————
PREV EMPL:
ADDRESS:
CITY　　　　　　　STATE:　　ZIP:　　　　HOW LONG: 0　0
PHONE:

——————————————————APPLICANT EMPLOYMENT MISC——————————————————
OTHER INCOME SOURCE:　　　　　　　　GROSS MTHLY AMT: $0

CREDIT CONNECTION®　　　　　　　　　0　($0.00)　　　　　　　　2:19 PM
ENTER (S)ELF EMPLOYED OR (O)THER

FIG. 3D

```
                    ─────AUTO COLLATERAL INFORMATION─────
CASH PRICE                          :$             FINANCE CHARGE              :$    0.00
BALLOON PMT                         :$             PAYABLE IN:    0            MO. INSTALLMENTS OF :$  0.00
DOWN PMT: CASH  :$        0.00      APR.      : 0.0000          MILAGE   : 0
         REBATE :$        0.00      NCIC      :$        0.00    VIN _____
         NET TRADE:$      0.00
TRD ALLOW: $    0.00  OWED: $   0.00                TYPE: __ YR: 0 MAKE: _____ MODEL: _____
UNPAID BALANCE                      :$       0.00                                BODY STYLE: ____
OTH CHARGES: $  0.00 $  0.00        :$       0.00   TRADE IN VIN: _____ YR: 0
AMOUNT FINANCED                     :$       0.00   MAKE: _____ MODEL: _____ BODY STYLE: ___

AUTO TRANS   : N      FOUR WD         : N          POWER SEATS  : N    SUN ROOF        : N
TRANS SPEED  : -      POWER BRAKES    : N          AIR COND     : N    VINYL ROOF      : N
                      POWER STEER     : N          FM STEREO    : N    CRUISE CONTROL  : N
                      POWER WINDOWS   : N          TAPE DECK    : N    SPORTS WHEELS   : N

CREDIT CONNECTION®                          0    ($0.00)                        11:09 AM
ENTER THE CASH PRICE, INCLUDING TAX, TITLE, REG. FEES.
```

FIG. 3E

REFERENCE NO 2220　　　THE BUSINESS (JONES BOB J, NEW SECOND GUARANTOR)　　　PENDING
─────────────────────────────── BANK ACCOUNT INFORMATION ───────────────────────────────
CHECKING#:　　　BANK:　　　SAVINGS#:　　　BANK:

─────────────────────────── CREDITOR INFORMATION ───────────────────────────
NAME OF CREDITOR　　　ADDRESS　　　ACCOUNT NO　　　MONTHLY PAYMENTS
　　　　　　　　　　　　　　　　　　　　　　　　　　$0
　　　　　　　　　　　　　　　　　　　　　　　　　　$0
　　　　　　　　　　　　　　　　　　　　　　　　　　$0

─────────────────────────── CREDIT INFORMATION ───────────────────────────
　　　　　　　　　　LAST CAR FINANCED　　　DRIVER'S LICENSE NO :
REPOSSESSION?　　: NO　　YEAR　　: 00　　STATE　　:
DATE　　　　　　 : ...　　MAKE　　: .....
BANKRUPTCY　　　 : NO　　MODEL　　　　　　　INS COMP　　:　　　COLL  : N
ENDORSER/GUARANTOR? : NO　　CREDITOR : .....　　POLICY#　　 :　　　LIAB  : N
JUDGEMENT?　　　 : NO　　BALANCE  : $0　　　EXP. DT　　 :　　　COMP  : N
　　　　　　　　　　　　DATE PAID : .....　　　　　　　　　　　　OTHER : N
　　　　　　　　　　　　TRADE IN? : NO

CREDIT CONNECTION®　　　　　　　0　　($0.00)　　　　　　　2:19 PM

*FIG. 3F*

```
REFERENCE NO 2220          THE BUSINESS (JONES BOB J, NEW SECOND GUARANTOR)           PENDING
                           ┌─────────────CO-APPLICANT NAME AND ADDRESS─────────────┐
FIRST NAME: _____           M.I. : _    LAST: _____           SUFFIX: ___
SS NO     : _ _ _             DOB  : _/_/_  PHONE: (___)___-____  RELATIONSHIP TO APPL: __
ADDRESS   : 1   MAIN          ST
CITY      : COLUMBIA          COUNTY: HOWARD       STATE: MD      ZIP: 21222   HOW LONG : 9 2
RES TYPE  : Q RENT/LEASE      LANDLORD: MORTAGE COMPANY            RENT: $1,600
                           ┌─────────────CO-APPLICANT PREVIOUS ADDRESS─────────────┐
PREV ADDR : 
CITY      :                   COUNTY:               STATE:         ZIP:         HOW LONG : 0 0

2:19 PM
CREDIT CONNECTION®                                          0      ($0.00)
ENTER THE CO-APPLICANT'S MORTGAGE HOLDER / LANDLORD.
```

*FIG. 3G*

REFERENCE NO 2220　　　THE BUSINESS (JONES BOB J, JONES MARY M)　　　PENDING

───── CO-APPLICANT EMPLOYMENT ─────

EMPL TYPE: O OTHERS
EMPLOYER:
ADDRESS:
CITY　　　　　　　　STATE: ___　ZIP: _____　HOW LONG: 0 0　MILITARY?: _
PHONE: ( ___ ) ___ - ____　OCCUPATION: _____　　GROSS SALARY: $0　　BASIS: M MONTH

───── CO-APPLICANT PREVIOUS EMPLOYMENT ─────

PREV EMPL:
ADDRESS:
CITY　　　　　　　　STATE:　　　ZIP:　　　　　HOW LONG: 0  0
PHONE:

───── CO-APPLICANT EMPLOYMENT MISC ─────

OTHER INCOME SOURCE:　　　　　　　　GROSS MTHLY AMT: $0

CREDIT CONNECTION®　　　　　　　　　0　　($0.00)　　　　　　　2:19 PM
ENTER (S)ELF EMPLOYED, (O)THER

*FIG. 3H*

REFERENCE NO 2220     THE BUSINESS (JONES BOB J, JONES MARY M)     PENDING

———————————CO-APPLICANT BANK ACCOUNT INFORMATION———————————
CHECKING#:         BANK:          SAVINGS#:          BANK:

———————————CO-APPLICANT CREDITORS INFORMATION———————————
NAME OF CREDITOR    ADDRESS       ACCOUNT NO         MONTHLY PAYMENTS
                                                     $0
                                                     $0
                                                     $0

———————————CO-APPLICANT CREDIT INFORMATION———————————
REPOSESSION?    : NO    DRIVER'S LICENSE NO : :
DATE                    STATE
BANKRUPTCY      : NO
ENDORSER/GUARANTOR? : NO
JUDGEMENT?      : NO 0    ($0.00)

CREDIT CONNECTION®                                   2:19 PM

FIG. 31

REFERENCE NO 2220   THE BUSINESS (JONES BOB J, JONES MARY M)   PENDING

VIN : ──────────── VEHICLE IDENTIFICATION NUMBER ────────────

──────────── AUTO COLLATERAL INFORMATION ────────────

MILEAGE   : 0

TYPE      :         AUTO TRANS    : N    POWER WINDOWS : N    SUN ROOF       : N
YR        : 0       TRANS SPEED   :      POWER SEATS   : N    VINYL ROOF     : N
MAKE      :         FOUR WD       : N    AIR COND      : N    CRUISE CONTROL : N
MODEL     :         POWER BRAKES  : N    FM STEREO     : N    SPORTS WHEELS  : N
BODY STYLE:         POWER STEER   : N    TAPE DECK     : N

──────────── AUTO TRADE-IN INFORMATION ────────────

YR        : 0
MAKE      :
MODEL     :
BODY STYLE:

CREDIT CONNECTION®                           0    ($0.00)                    2:19 PM
ENTER THE V.I.N. FOR THE AUTOMOBILE.

*FIG. 3J*

REFERENCE NO 2220          THE BUSINESS (JONES BOB J, JONES MARY M)          PENDING
─────────────────────────────── FINANCE INFORMATION ───────────────────────────────

CASH PRICE            : $      0.00      BALLOON PMT          : $        0.00
SALES TAX             : $      0.00
DMV                   : $      0.00      EST APR              :   0.0000
TOTAL DELIVERED       : $      0.00      EST TERM             :   0
                                         EST MONTHLY PAYMENT: $        0.00
CASH                  : $      0.00
REBATE                : $      0.00      INVOICE COST         : $        0.00
TRD ALLOW    : $ 0.00
OWED         : $ 0.00
NET TRADE             : $      0.00      MSRP                 : $        0.00
TOTAL DOWN PAYMENT    : $      0.00

UNPAID BALANCE        : $      0.00

OTHER CHARGES, FEES: $ 0.00
AMOUNT FINANCED       : $      0.00

CREDIT CONNECTION®                                    0      ($0.00)          2:19 PM
ENTER THE CASH PRICE, INCLUDING TAX, TITLE, REG. FEES.

*FIG. 3K*

REFERENCE NO 2231   NEW BUSINESS APP (NEW FIRST GUARANTOR, NEW SECOND GUARANTOR)   PENDING

QUICK BUSINESS INFORMATION
BUSINESS NAME: _____   TYPE: ___
ADDRESS _____
CITY _____   COUNTY: _____   STATE: ___   ZIP: _____
TAX ID _____

QUICK APPLICANT NAME AND ADDRESS
FIRST NAME: _____   M.I.: ___   LAST: _____   SUFFIX: ___
SS NO _____   DOB: _____
ADDRESS _____
CITY _____   COUNTY: _____   STATE: ___   ZIP: _____

QUICK CO-APPLICANT NAME AND ADDRESS
FIRST NAME: _____   M.I.: ___   LAST: _____   SUFFIX: ___
SS NO _____   DOB: _____
ADDRESS _____
CITY _____   COUNTY: _____   STATE: ___   ZIP: _____

CREDIT CONNECTION®                                0   ($0.00)                        2:55 PM
ENTER THE BUSINESS'S NAME.

*FIG. 3N*

CREDIT CONNECTION®  2:57 PM

PENDING DECISION QUEUE

| REMARKS | REF NO | APP/BUSINESS | CO-APP/GUARANTOR | BANK DECISION | BANK DECISION | BANK DECISION | INITIATED |
|---|---|---|---|---|---|---|---|
| | 2232 | RECH | | | | | 09/01 14:56 |
| CALLING CBI | 2233 | BREAD PLACE | BRUNO FRANK | | | | 09/01 14:57 |
| CALLING CBI | 2234 | FINK TED | | | | | 09/01 14:58 |

<PAGE>

THIS IS THE LAST PAGE.

[F1] ENTER REF NO  [F2] ENTER NAME  [F3] MODIFY CONSTRAINTS

CONSTRAINTS
WEEKS : ALL

*FIG. 30*

REFERENCE NO 1404   ANDREWS LEE (ANDREWS REBECCA I SR)   NABK (DECLINE)

```
┌─────────────── PENDING DECISION MENU ───────────────┐
│ A.  DISPLAY APPLICATION              B.  DISPLAY CREDIT BUREAU        │
│ D.  LENDER DECISIONS                 C.  CREDIT BUREAU SUMMARY        │
│ L.  ADD CO-APPLICANT                 P.  DISPLAY PUBLIC RECORDS       │
│ M.  MODIFY APPLICATION INFORMATION   R.  REQUEST ADDITIONAL BUREAUS   │
│ O.  APPLICATION OVERVIEW             T.  DISPLAY TRADES               │
│ S.  SEND APPLICATION TO LENDERS      X.  REDIRECT APPLICATION AND EXIT│
└─────────────────────────────────────────────────────┘
```

0   ($13,300.00)   9:48 AM

CREDIT CONNECTION®
CHOOSE A MENU ITEM USING THE ARROW KEYS OR A NUMBER.

*FIG. 3P*

REFERENCE NO 1404　　　　　ANDREWS LEE (ANDREWS REBECCA I SR)　　　　　NABK (DECLINE)

LENDER DECISIONS

| LENDER | CONTACT | PHONE | APP NO | APPROVAL AMT | TERM | RATE | DECISION | COMMENT |
|---|---|---|---|---|---|---|---|---|
| NATIONS BANK | TERESA HINSON | (919) 742-7384 | 20308 | | | | DECLINE | |
| US BANCORP | TOM BOND | (503) 547-2345 | | | | | DECLINE | |

DETAILS

DECISION : DECLINE
COMMENT:
SEND DATE: 08/18 15:47　RECEIVE DT: 08/18 15:47　TURNAROUND IN MINUTES: 1
　　　　　　　　　　　　TURN DOWN REASONS
　DELINQUENT ACCOUNTS OR A LOW NUMBER OF SATISFACTORY ACCOUNTS
　TYPE OF (OR LACK OF) CREDIT CARDS
　OLDER AGE OF ITEM PROPOSED FOR FINANCING
　DELINQUENT ACCOUNTS OR A LOW NUMBER OF SATISFACTORY ACCOUNTS
ENTERED BY :

[F1]  BOOK THE DEAL WITH THIS LENDER   [F2]  ENTER DECISION MANUALLY
　　　　　　　　0　　　　　($13,300.00)

CREDIT CONNECTION®　　　　　　　　　　　　　　　　　　　　　　　9:48 AM

FIG. 3Q

REFERENCE NO 1404　　　　　ANDREWS LEE (ANDREWS REBECCA I SR)　　　　　NABK (DECLINE)
────────────────────────APPLICATION OVERVIEW────────────────────────

```
APPLICANT INFORMATION                          CO-APPLICANT INFORMATION
NAME : ANDREWS LEE                             NAME : ANDREWS REBECCA I SR
PH   : (410) 555 - 5555                        PH   : (410) 555 - 5555
DOB  : 01/01/60       AGE : 34                 DOB  : 12/12/55       AGE : 39
RES  : OWN    RENT/MTG : $950    TIME: 10 Y 6M RES  : OWN    RENT/MTG : $950    TIME: 10 Y 6 M
EMP  : ACME EMPLOYERS            TIME:  8 Y 0M EMP  : VISA                      TIME: 12 Y 2 M
OCC  : E              INCOME : $25,000         OCC  : CIVIL ENGINEER  INCOME : $13,333
                        AUTO/LOAN INFORMATION
AUTO : 0         PRICE : $23,000.00    DOWN : $12,000.00   REQUEST AMT : $13,300.00   TERM : 60
                          BUREAU INFORMATION
                    DEROG TRADES / FRAUD / SS# DIFFERS / SUFFIX DIFFERS
                                       OLDEST INQ/TRD OPEN : 10/01/82  LATEST : 02/01/91
BUREAU : CBI (1 OF 1 FILES)            MAJOR DEROGATORIES  : 3         MINOR : 1   SATISFACTORY : 3
TRADES :  7   INQUIRIES : 0                                : 3/0       LATE 60 : 4/0   LATE 90 : 5/0
DEBT RATIO : 100.05    PUBLIC RECORDS : 0   INST/REV LATE 30
```

CBI
CREDIT CONNECTION®　　　　　　　　　0　　　($13,300.00)　　　　　　　　　　9:48 AM
USE THE LEFT AND RIGHT ARROW KEYS TO CHANGE THE BUREAU.

*FIG. 3R*

REFERENCE NO 1404　　　ANDREWS LEE (ANDREWS REBECCA I SR)　　　NABK (DECLINE)

SEND APPLICATION TO LENDERS

| LENDER NAME | CONTACT | PHONE | SEND BY | SEND DATE | RECEIVE DATE | STATUS |
|---|---|---|---|---|---|---|
| USBK US BANCORP | MICHAEL F. LUITEN | (206) 450 - 5860 | CRCONNECTION | 07/08 14:52 | 07/08 14:58 | DECLINE |

<PAGE>

[RETURN] SEND　[F1] ENTER LENDERS 0　　($13,300.00)　　　　　　　　　　9:48 AM

THIS IS THE LAST PAGE
CREDIT CONNECTION®

*FIG. 3S*

REFERENCE NO 1404　　　ANDREWS LEE (ANDREWS REBECCA I SR)　　　NABK (DECLINE)

┌─SEND APPLICATION TO LENDERS─────────────────────────────────────────┐
│ LENDER NAME        CONTACT            PHONE           SEND BY        SEND DATE    RECEIVE DATE   STATUS │
│ USBK   US BANCORP  MICHAEL F. LUITEN  (206) 450-5860  CRCONNECTION   07/08 14:52  07/08 14:58    DECLINE │
│                                                                                                          │
└──────────────────────────────────────────────────────────────────────┘
<PAGE>

┌─ENTER THE LENDERS──────────────────┐   ┌─SEND TO ALL/ONE BY ONE: ONE BY ONE─┐
│ FIRST LENDER: ___  SECOND LENDER: ___  THIRD LENDER: ___ │
└────────────────────────────────────┘

[RETURN] SEND   [F1] ENTER LENDERS

CREDIT CONNECTION®         0        ($13,300.00)                          9:48 AM

FIG. 3T

REFERENCE NO 1404
CBI (1 OF 1 FILES INCLUDED)
NUMBER OF LINES: 44

ANDREWS LEE (ANDREWS REBECCA I SR)  NABK (DECLINE)

1
2  CBI FOR APPLICATION 1404
3
4
5  • 001 UNKNOWN CREDIT BUREAU -- CONTACT YOUR SYSTEM ADMINISTRATOR
6
7  BEACON IS TEMPORARILY UNAVAILABLE.
8
9
10  SAFESCAN WARNING: IS SS# A TYPO ERROR? SS# OUT OF RANGE.
11
12
13  *ANDREWS, LEE,, JR, CATHY   SINCE 05/00/72  FAD 03/19/91
14  8827, MITCHELL, DR, DECATUR, GA, 30032, DAT RPTD 04/90
15  23929, MAIN, DECATUR, GA, 30032, DAT RPTD 12/90
16  FN-ANDROPOLIS, LEEWISKI,, JR
17  MAR-M, DEPS-4, BDS-06/12/47, SSS-142-71-7890
18  00 ES-, EMPLOYER
19  01 EF-, FPL 0   ($13,300.00)

CBI    [F1]  FIND
CREDIT CONNECTION®                                              9:48 AM
USE THE LEFT AND RIGHT ARROW KEYS TO CHANGE THE BUREAU.

*FIG. 3U*

| REFERENCE NO 1404 | ANDREWS LEE (ANDREWS REBECCA I SR) | | | | | | | | NABK (DECLINE) |
|---|---|---|---|---|---|---|---|---|---|
| | CREDIT BUREAU SUMMARY FOR CBI (1 OF 1 FILES INCLUDED) | | | | | | | | |
| TRADES (OPEN OR CLOSED) | 7 | TRADES (OPEN) | | | | | | | 6 |
| PUBLIC RECORDS | 0 | BANK REVOLVING AND NATIONAL CREDIT CARDS | | | | | | | 0 |
| MAJOR DEROGATORY | 3 | BANK INSTALLMENT AND OTHERS | | | | | | | 2 |
| MINOR DEROGATORY | 1 | DEPARTMENT STORES | | | | | | | 1 |
| SATISFACTORY | 3 | FINANCE COMPANIES | | | | | | | 2 |
| INQUIRIES IN PAST SIX MONTHS | 0 | OTHERS | | | | | | | 1 |
| INQUIRY/TRADE OPENING OLDEST: 10/01/82 LATEST: 02/01/91 | | REVOLVING ACCOUNTS | | | | | | | 2 |
| TIMES LATE INST. 30 DAYS: 3 60 DAYS: 4 90 DAYS: 5 | | INSTALLMENT ACCOUNTS | | | | | | | 4 |
| REV. 30 DAYS: 0 60 DAYS: 0 90 DAYS: 0 | | | | | | | | | |
| TOTAL BALANCE (REV: $ 660 INST: $ 8,498) | $ 9,158 | DEBT RATIO | | | | | | | $ 38,354 / $ 38,333 = 100.05% |
| HIGHEST CREDIT REVOLVING | $ 860 | BUREAU SERVICE SCORE (APPLICANT) | | | | | | | |
| HIGHEST CREDIT INSTALLMENT | $ 10,000 | BUREAU SERVICE SCORE (CO-APPLICANT) | | | | | | | |
| | DEROG TRADES / FRAUD / SS# DIFFERS / SUFFIX DIFFERS | 0 | ($13,300.00) | 0 | | | | | |
| TRADE RATINGS (AS OF LAST REPORTED DATE) | | 0 | 1 | 2 | 3 | 4 | 5 | 6 | 7 8 9 |
| PRESENT RATINGS | | 0 | 4 | 0 | 1 | 0 | 1 | 0 | 0 0 1 |
| PAST DELINQUENCY | | | | | | | | | 0 1 |

CBI

CREDIT CONNECTION®  9:48 AM
USE THE LEFT AND RIGHT ARROW KEYS TO CHANGE THE BUREAU.

*FIG. 3V*

REFERENCE NO 1404   ANDREWS LEE (ANDREWS REBECCA I SR)   NABK (DECLINE)

PUBLIC RECORDS FROM CBI (1 OF 1 FILES INCLUDED)

| DESCRIPTION | SEVERITY | FILED | REPORTED | SETTLED | AMOUNT | BALANCE | COURT # |
|---|---|---|---|---|---|---|---|
| | 0 | | | 0 | ($13,300.00) | | |

CBI
NO RECORDS AVAILABLE.
CREDIT CONNECTION®   9:48 AM
USE THE LEFT AND RIGHT ARROW KEYS TO CHANGE THE BUREAU.

*FIG. 3W*

REFERENCE NO 1404    ANDREWS LEE (ANDREWS REBECCA I SR)    NABK (DECLINE)

┌─CHOOSE A BUREAU TO CALL─┐
│ 1. CBI                                              │
│ 2. TRW                                             │
│ 3. TRU                                              │

CREDIT CONNECTION®    0    ($13,300.00)    9:48 AM

FIG. 3X

REFERENCE NO 1404      ANDREWS LEE (ANDREWS REBECCA I SR)      NABK (DECLINE)

─── UNIQUE TRADES FROM FROM CBI (1 OF 1 FILES INCLUDED) ───

| NAME | OWN | TYPE | OPEN | OPEN REPORT | PAYMENT HISTORY | HC/ORIGBL | BALANCE | TERMS | ORIG PMT | PMT |
|---|---|---|---|---|---|---|---|---|---|---|
| HFC | A | I | YES | 10/85 02/91 | | 1,248 | 1,647 | 36 | 19,764 | 19,764 |
| HFC | A | I | YES | 10/82 02/91 | | 1,647 | 1,330 | 36 | 15,960 | 15,960 |
| FNB ATL | A | I | YES | 08/88 02/91 | | 10,000 | 5,321 | 0 | 350 | 350 |
| RICH'S | A | R | YES | 07/89 02/91 | | 860 | 660 | 0 | 55 | 55 |
| TRUST COMP | A | I | YES | 11/89 02/91 | | 259 | 200 | 0 | 25 | 25 |
| TRUST COMP | A | I | NO | 03/90 02/91 | | 5,000 | 0 | 0 | 0 | 0 |
| LERNERS | A | R | YES | 04/84 02/91 | | 200 | 0 | 0 | 0 | 0 |

─── TRADE DETAIL ───

TRADE NAME : HFC     ACCOUNT#: 32081-44888     DESIGNATOR: J    INDUSTRY: F    MEMBER#: 401FP3300
CURRENT RATE : 1 PAYS ACCOUNT AS AGREED             TIMES LATE 30: 0    LATE 60: 0    LATE 90: 0
PAST RATE :

APP DEBT: 1,900    PMT: 300    BUREAU DEBT: 36,154    TOTAL DEBT: 38,354    TOTAL INCOME: 38,333    DEBT RATIO: 100.05%
CBI                             [RETURN] CHANGE PAYMENT

CREDIT CONNECTION®       0    ($13,300.00)                              9:48 AM
USE THE LEFT AND RIGHT ARROW KEYS TO CHANGE THE BUREAU.

FIG. 3Y

REFERENCE NO 1404　　　ANDREWS LEE (ANDREWS REBECCA I SR)　　　NABK (DECLINE)

```
┌─ SELECT NEXT STATION
│  PENDING DECISION
│  PENDING DELIVERY
│  COMPLETED
└─
```

CREDIT CONNECTION®　　　0　　($13,300.00)　　9:48 AM

*FIG. 3Z*

| REMARKS | REF NO | APP/BUSINESS | CO-APP/GUARANTOR | BANK DECISION | BANK DECISION MESSAGE | BANK DECISION NABK | BANK DECISION SIGN | INITIATED |
|---------|--------|--------------|------------------|---------------|----------------------|--------------------|--------------------|-----------|
|         | 22137  | KELLER JERRY J | KELLER LAURA J | PENDING | | NABK | SIGN | 06/21 11:09 |

CREDIT CONNECTION® — 3:27 PM
PENDING DELIVERY QUEUE

CONSTRAINTS
WEEKS : ALL

THIS IS THE LAST PAGE.

[F1] ENTER REF NO  [F2] ENTER NAME  [F3] MODIFY CONSTRAINTS

*FIG. 3AA*

LENDER LOOKUP                                                                      3:28PM

―――――――――――――――――――――――――LENDER LIST―――――――――――――――――――――――――
| LENDER | NAME | CITY | ST | CONTACT | PHONE | CC/FAX | FAX | ACTIVE |
|---|---|---|---|---|---|---|---|---|
| Firs | FIRST UNION | CHARLOTTE | NC | PATTY MEEHAN | (919) 848-4747 474 | FAX | (919) 848-7464 | ACTIVE |
| sign | SIGNET BANK | BALTIMORE | MD | RICH KIRKWOOD | (410) 484-8484 844 | FAX | (410) 484-8487 | ACTIVE |
| CITZ | CITIZENS BANK | ELLICOTT CITY | MD | ANGELA COOPER | (410) 848-8888 | FAX | (410) 848-8744 | ACTIVE |
| CITI | CITIBANK | NEW YORK | NY | DAN KATZ | (212) 847-7477 444 | FAX | (212) 847-7488 | ACTIVE |
| Chas | CHASE MANHATTEN | NEW YORK | NY | JOE SMITH | (212) 887-4888 | FAX | (212) 887-5647 | ACTIVE |
| Well | WELLS FARGO | SAN FRANCISCO | CA | SCOTT SMITH | (619) 767-6467 | FAX | (619) 767-4848 | ACTIVE |
| JB | JERRY'S BANK | | | ME | (410) 111-2222 | FAX | (410) 111-3333 | ACTIVE |
| ALCO | ALCO CAPITOL | MACON | GA | NANCY SHEPPARD | (912) 471-2300 | CC | (912) 471-4844 | ACTIVE |

<PAGE>

―――――――――――――――――――――LENDER HISTORY―――――――――――――――――――――
| DAYS | TOTAL APPS | APPROVED | COND APPR | DECLINED | BOOKED | APPR/TOTAL % | BOOKED/TOTAL % | % OF TOTAL APPS |
|---|---|---|---|---|---|---|---|---|
| 0 - 30 | 5 | 4 | 1 | 0 | 3 | 100 | 60 | 2 |
| 30 - 60 | 10 | 7 | 2 | 1 | 6 | 90 | 60 | 5 |
| 60 - 90 | 10 | 6 | 2 | 2 | 5 | 80 | 50 | 5 |

[RETURN] LENDER DETAILS

CREDIT CONNECTION®

SYSADM MAIN MENU
D. DEALER SETUP
L. LENDER SETUP
U. USER SETUP
X. EXIT USER

LATEST NEWS FROM CMSI   2:46 AM
THE SYSTEM WILL BE UNAVAILABLE TOMORROW OCTOBER 6, FROM 7:00 AM TO 7:15 AM DUE TO SCHEDULED HARDWARE MAINTENANCE. IF YOU HAVE ANY QUESTIONS PLEASE CALL CMSI AT (800) 777 2674 EXT 456. THANKS FOR YOUR CO-OPERATION.

CHOOSE A MENU ITEM OR PRESS F12 ANYTIME FOR MORE OPTIONS.

*FIG. 3AD*

```
                    DEALER SETUP                           3:29 PM
          ┌──────────DEALER SETUP──────────────────────────────────┐
          │                                                        │
          │  DEALER ID    : AUTOHAUS                               │
          │  NAME         : AUTOHAUS TISCHER                       │
          │  MANAGER      : JOHN DOE                               │
          │  CONTACT      : HOWARD WOODS                           │
          │  ADDRESS      : 123 FORT MEADE ST                      │
          │                                                        │
          │  CITY         : LAUREL            STATE: MD   ZIP: 21227.│
          │  PHONE        : (301) 643-1600                         │
          │  FAX NUMBER   : (410) 643-1645                         │
          │                  BUREAU INFORMATION                    │
          │  SELECTION    : A  AUTO   PRIMARY BUREAU: CBI  SECONDARY BUREAU: │
          │  CBI ACCESS#  : 999ZS00472-T3FYBS                      │
          │  TRW ACCESS#  : TCA13122250X1J                         │
          │  TRU ACCESS#  : 17MAZ 00005276R58X                     │
          │                                                        │
          └────────────────[F1]  UPDATE DEALER─────────────────────┘
```

*FIG. 3AE*

LENDER SETUP                                                      3:29 PM

```
──────CURRENT LENDERS──────              ──────LENDER DETAILS──────
     LENDER              CC/FAX  ACCESS CODE
Firs FIRST UNION         FAX                   LENDER CD    : 0001
sign SIGNET BANK         FAX                   LENDER       : FIRST UNION
CITZ CITIZENS BANK OF MD FAX                   SHORT NAME:  Firs
CITI CITIBANK            FAX                   ACCESS CD    :
Chas CHASE MANHATTEN BANK FAX                  CONTACT      : PATTY MEEHAN
Well WELLS FARGO         FAX                   PHONE        : (919) 848-4747 474
JB   JERRY'S BANK        FAX                   FAX          : (919) 848-7464
ALCO ALCO CAPITOL        CC                    ADDRESS      : 1 MAIN AVENUE
BOAT BOATMEN'S BANCSHARES CC    08474756
Banc BANC ONE            CC                    CITY  : CHARLOTTE  STATE: NC  ZIP: 87747.
<PAGE>
                                               ACTIVE : ACTIVE
```

[F1] ADD   [F2] UPDATE   [F3] DELETE

FIG. 3AF

USER SETUP

————CURRENT USERS————

| USER ID | NAME | GSP | IN USE |
|---|---|---|---|
| andy | Andy Mayers | MASTER | NO |
| arv | arv | SALES | NO |
| billy | Billy Roberts | MASTER | NO |
| jerry | Jerry Keller | MASTER | NO |
| jima | Jim alsobrook | MASTER | NO |
| jimc | Jim Cain | | |

————USER DETAILS————

| | | |
|---|---|---|
| USER ID | : | andy |
| NAME | : | Andy Mayers |
| GSP | : | |
| PHONE NO | : | |
| PASSWORD | : | |
| TIME BETWEEN | : | 999 |
| NEXT CHANGE | : | 08/30 |
| DEF WEEKS | : | 0 |

3:31 PM

[F1] ADD    [F2] UPDATE    [F3] DELETE

FIG. 3AG

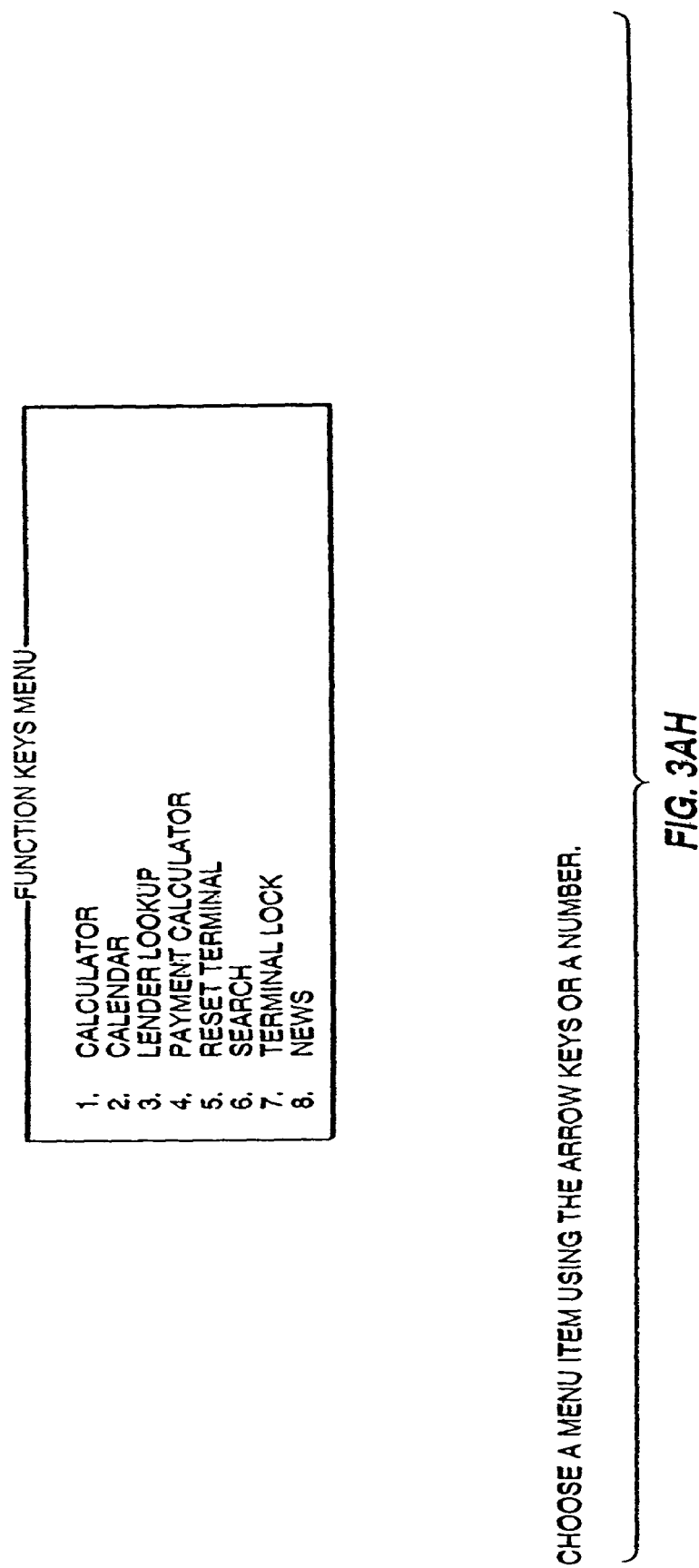

ENTER SEARCH CRITERIA

SPECIFIC REFERENCE NO : 0

APPLICANT NAME : ALL
CO-APPLICANT NAME : ALL
BUSINESS NAME : ALL

APPLICANT SS# : ALL - -
CO-APPLICANT SS# : ALL - -

STATION : ALL

CONSTRAINTS
FROM INITIATED DATE :          TO INITIATED DATE :

ENTER DATA OR PRESS F4 TO END.

FIG. 3AI

SEARCH APPLICATIONS
LIST OF APPLICATIONS

| REMARKS | REF NO | APP/BUSINESS | CO-APP/GUARANTOR | STATION | BANK | STATUS | BANK STATUS | INITIATED |
|---|---|---|---|---|---|---|---|---|
| | 2123 | Fax Larry | | DONE | Natl | APPROVE | | 02/03 10:28 |
| | 2125 | Cain James V | | DONE | Natl | DECLINE | | 03/17 14:59 |
| | 2126 | Fax Larry | | PY | Natl | APPROVE | | 04/06 14:57 |
| | 2127 | Jones John | | PD | Natl | APPROVE | | 04/10 13:34 |
| | 2128 | aaaa AAA | aaaaa   aaaaa | DONE | | | | 04/28 11:26 |
| | 2129 | CUFF JENNIFER | | DONE | | | | 05/03 13:54 |
| | 2130 | Fax Larry | | PD | Natl | APPROVE | | 05/05 10:34 |
| | 2131 | FAX LARRY | | DONE | | | | 05/11 09:01 |
| | 2133 | test TEst | | DONE | | | | 05/18 17:22 |
| | 2134 | W TEst | | DONE | | | | 05/18 17:24 |
| | 2137 | Keller Jerry J | | PD | | | | 06/21 11:09 |

```
─────CONSTRAINTS─────
FROM INITIATED DATE :          TO INITIATED DATE :

[F1] ENTER REF NO  [F2] MODIFY CONSTRAINTS
```

```
─────NEWS─────
DATE    FROM    TOPIC
10/05   02:46   CMSI    SCHEDULED HARDWARE MAINTENANCE
09/13   02:46   CMSI    LATEST LIST OF CREDIT CONNECTION@LENDERS
09/13   02:30   Natl    REDUCED RATES FOR AUTO LOANS.
09/13   02:13   BOAT    CHANGES IN USED AUTO LENDING
09/13   02:09   USBK    RATE CHANGES EFFECTIVE OCTOBER 1
```

THE SYSTEM WILL BE UNAVAILABLE TOMORROW OCTOBER 6, FROM 7:00 AM TO 7:15 AM DUE TO SCHEDULED HARDWARE MAINTENANCE. IF YOU HAVE ANY QUESTIONS PLEASE CALL CMSI AT (800) 777 2674 EXT 456. THANKS FOR YOUR CO-OPERATION.

FIG. 3AK

COMPUTER IMPLEMENTED AUTOMATED CREDIT APPLICATION ANALYSIS AND DECISION ROUTING SYSTEM

CROSS-REFERENCE TO RELATED APPLICATIONS

This application is a divisional application of U.S. patent application Ser. No. 10/441,534, filed on May 20, 2003, and a continuation in-part of U.S. patent application Ser. No. 08/922,462, filed on Sep. 3, 1997 (now issued as U.S. Pat. No. 7,181,427). U.S. patent application Ser. No. 10/441,534 is a divisional application of U.S. patent application Ser. No. 09/107,321, filed on Jun. 30, 1998 (now issued as U.S. Pat. No. 6,587,841), which is a divisional application of U.S. patent application Ser. No. 08/526,776, filed on Sep. 12, 1995 (now issued as U.S. Pat. No. 5,878,403). U.S. patent application Ser. No. 08/922,462 is a continuation-in-part of U.S. patent application Ser. No. 08/526,776, filed on Sep. 12, 1995 (now issued as U.S. Pat. No. 5,878,403).

This application is a continuation-in-part of co-pending U.S. application Ser. No. 08/922,462, filed on Sep. 3, 1997, the contents of which are hereby incorporated by reference herein in the entirety.

STATEMENT REGARDING FEDERALLY SPONSORED RESEARCH OR DEVELOPMENT

Not applicable.

REFERENCES TO SEQUENCE LISTING, TABLES OR COMPUTER PROGRAM LISTING APPENDIX ON COMPACT DISK

Not applicable.

BACKGROUND OF THE INVENTION

1. Field of the Invention

The invention relates to the technical field of data processing, and more particularly to a computer implemented credit application analysis and decision routing system.

2. Background Information

Obtaining credit and financing of a major consumer purchase has been done manually in the past. Typically, an applicant fills out a credit (loan) application by hand. A sales representative of the vendor from which the consumer wishes to make his purchase, using information from the consumer's application, may then call up a credit bureau to obtain by teletype a credit report on the applicant. Sometimes the credit bureau has an automated computerized system from which the sales representative can obtain the credit report on-line. The process of obtaining a credit bureau report, regardless of the method used, is hereinafter sometimes referred to as "pulling" a credit bureau report. Subscribers to a credit bureau, such as retail vendors or banks, are charged a fee by the credit bureau each time they pull a credit bureau report.

While sales representatives use credit bureau reports to gain information regarding an applicant's credit profile that will be helpful in determining which funding sources, e.g., banks, may be most likely to approve the applicant's transaction, credit bureau report reviews by sales representatives generally are somewhat superficial. This is in part due to the fact that certain information in credit bureau reports is encrypted or abbreviated in ways that render the information virtually inaccessible to someone who is not specially trained in credit bureau report analysis, and sales representatives rarely if ever have such detailed training. Consequently, the sales representative makes a judgmental or subjective credit analysis based on the information he can glean from the credit bureau report. The consumer's paper application then is faxed to one or more lenders for detailed credit analysis and a decision by the lender(s) regarding approval of the application.

Put another way, the current industry approach is that prior to submitting the application to a funding source or sources, the dealer F&I (Finance and Insurance) staff will request an inquiry copy of the applicant's credit bureau information, either manually or on-line. Currently, the credit bureau inquiry report the dealer F&I staff uses is in the so-called "TTY format", as provided by the credit bureau. Each credit bureau has its own format for their "TTY formatted inquiry response." The dealer F&I staff must be able to read and interpret the information in the credit bureau inquiry response because they use this information to determine which funding source or sources are more likely to approve the applicant's credit application.

Often the dealer's F&I staff must request an applicant's credit bureau information from more than one credit bureau, such as when information on a credit bureau report is lacking in pertinent information, shows a negative credit history, and/or does not agree with the information provided by the applicant. The dealer F&I staff then must read and interpret multiple credit bureau TTY formatted reports consisting of lists of codes and extracts of credit information, which are, as noted earlier, difficult to understand. Finding pertinent information to assist the dealer F&I staff in choosing the appropriate funding sources or sources to receive a given application is, therefore, not easy, and there is a considerable opportunity for errors and misinterpretations to occur.

At the lender, the faxed application is entered into the lender credit analysis system and/or forwarded manually to an appropriate decision-maker to be reviewed. As part of this credit analysis process, the lender also pulls its own credit bureau report(s) on the applicant. Once a decision is made whether or not to provide an approval of the application, a written notice is prepared and faxed back to the sales representative or the lender telephones the sales representative with the lender's decision.

In the automotive sales arena in particular, when a dealer sells a vehicle, one of the important services it provides to its customers is vehicle financing. To provide this service, an auto dealer typically has agreements with multiple financial institutions to provide indirect loan application processing and funding. As the term suggests, indirect loans or indirect financing involves any financing transaction which is originated by an entity other than the funding source. For example, an auto dealer initiates automobile financing transactions for his customers (e.g., a car loan or lease), but financial institutions actually fund the transactions. These financial institutions will be hereinafter referred to interchangeably as funding sources, lenders, or banks.

An auto dealer, also referred to hereinafter as a dealership, needs access to multiple funding sources so that it can provide credit for all of its customers regardless their credit history and ability to pay. This service is very important to the dealership and most dealerships have a distinct department to provide just this service, referred to as the Finance and Insurance department, or simply the "F&I" department. The F&I department takes credit application information (e.g., Automotive Dealer Indirect Credit information) from its vehicle customers, prepares indirect loan or financing applications, hereinafter also referred to as credit applications or simply the applications, and forwards each application to the funding sources which are considered likely to provide credit for particular purchases. In cases where the dealer pulls its own credit bureau report on an applicant, the decision regarding which funding sources will be sent the application is generally based on the dealers subjective review of the credit bureau report.

Currently, the dealer either manually writes a credit application or enters the application data into an F&I computer system. In the latter case, the application is printed from the F&I system on paper and the paper application is faxed to the funding source. In a few instances certain dealers may have the ability to transmit applications from their computers via modem to a preferred funding source(s), but application processing by the funding source is still performed off-line (i.e., independently of this transmission process between the dealer and the funding source) and is not integrated as a single system with the dealer's application preparation process.

If the dealer wanted to send the application to multiple funding sources, until now, the dealer had to manually fax it or transmit it to each funding source. If the dealer wanted to make changes to the application, the new or revised paper application had to again be faxed or transmitted to the funding source or sources.

Further, after the bank received the paper credit application by fax, the bank would typically then manually enter the application data into their credit application processing system, and any changes later supplied by the dealer would also have to be manually entered. As can be readily appreciated, the manual processing of credit application data by the dealer and the bank provides many possibilities for the introduction of errors and delays in the processing, and consequently in the approval or disapproval decision regarding a credit application.

Entering the application data into the credit processing system at the bank requires bank personnel. Although a large number of automobile purchases are made on weekends, most banks either do not have any staff or do not have adequate numbers of staff available on the weekends to handle the application data volume. As no electronic system or device exists today for automating financing decisions and review application data entered at a dealership, the current approach typically results in a major backlog of data entry on Monday mornings or the first day after a bank is closed. Besides the adverse effect on workload, this also represents a delay in processing credit applications.

As described, currently a dealer uses a manual or non-automated approach to find a funding source that is willing to provide a loan to a particular dealer customer, for a particular vehicle purchase. The dealer F&I staff manually prepare the loan application and manually fax the paper application to one or multiple funding sources. The dealer F&I staff must then wait for the funding source to determine if the application is approved or disapproved, or whether additional information is required, and it is not uncommon for hours to elapse without any response from the funding sources. Should an unreasonable amount of time elapse, the F&I staff may then decide to call one or more of the funding sources which were sent the application for an update on the status of the decision process. The dealer F&I staff must wait while the funding source(s) staff enter the credit application in their credit application processing system, pull a credit bureau report(s) on the applicant, and then process the credit application data. The dealer F&I staff must keep track of when and to which funding sources a particular application has been sent, resulting in a substantial record keeping burden. This burden is further magnified when credit application volume is high, as typically occurs during sales promotions, for example.

As mentioned above, the dealer F&I staff can send an application to one, several or all funding sources available to the dealer. Sending the application to all available funding sources at the same time is sometimes referred to as "shot-gunning," a practice used by some F&I departments to get the quickest response to a credit application. On the other hand, shot-gunning is naturally discouraged by funding sources because of the time and overhead required by the funding source staff to enter and process the credit application and the reduced probability of the funding source ultimately funding the associated loan or lease from the dealer. Manually shot-gunning applications can be time consuming and wasteful of employee resources.

Currently, there is no system permitting sharing of credit bureau report information between funding sources and dealers. Consequently, the cost of pulling credit bureau reports may be unnecessarily duplicated at the funding source and dealer levels. Additionally, as there are three different major credit bureaus in the U.S. market, and each uses a unique format and may have access to different credit information on any given individual than the other credit bureaus, the credit analysis and decision process can become further complicated. For example, if the dealer obtains its report from a different credit bureau than the one used by the funding source and discussions between the dealer and the funding source required before any decision can be made, these discussions are often hampered by the fact that the two parties to the discussion, the dealer and the funding source, do not have access to the same complete set of information which the other party is using to draw its conclusions.

Certain aspects of the above process have been automated to a limited extent, for example, according to Jones et al. (U.S. Pat. No. 5,239,462). However, a need has existed for a comprehensive automation of the whole credit application process to solve the above problems, as well as to provide additional flexibility and functionality in the management of the credit application process.

OBJECTS OF THE INVENTION

An objective of the present invention is to solve the above-mentioned problems, which include but are not necessarily limited to: (i) manual loan application entry by funding sources, (ii) heavy reliance on verbal telephone conversations and fax transmissions throughout the application routing, review and approval process, (iii) appropriate funding source selection for specific applications, (iv) shot-gunning applications, (v) difficulties with credit bureau report analysis, (vi) duplicating costs for pulling the same credit bureau report, (vii) the introduction of errors into applications resulting from the need to enter information more than once, (viii) the length of time between submitting applications to finding sources and receiving responses, (ix) delays resulting from the funding source being closed or periods of high sales volumes, and (x) sales representatives/dealers and funding sources not having access to identical sets of credit information regarding the same applicant.

The present in invention further has the following additional objectives.

It is an object of the present invention to provide a centralized conduit for the collection and transfer of credit applications and decisions between dealers and funding sources.

It is an object of the present invention to provide a centralized database which accumulates credit application data.

It is an object of the present invention to allow sales representative personnel (e.g., F&I staff) to perform application data entry in order to eliminate the errors caused by the entry of data by the funding sources' staff. Further, by substantially eliminating the entry of credit applications by the funding sources' staff, except in rare and unusual circumstances, the present invention reduces the need to keep large staffs available on weekends, for example, to enter applications.

It is a further object of the invention to balance the credit application processing load and reduce the backlog of applications on Mondays or the first day after the funding source is closed, for example.

An object of the present invention is to significantly reduce the time required by the overall credit decision process, thereby leveling the application delivery load over any given period of time, balancing the application load on the system and staff while at the same time allowing both to handle greater application volumes, eliminating current bottlenecks in the application analysis, routing and decision process, and providing credit decisions during off-work hours of funding sources.

It is a further object of the invention to reduce the credit application processing time required by the funding sources.

It is an object of the invention to provide a dealer with on-line and off-line entering of application data, for transfer to one or more funding sources sequentially and automatically, and at a time when it is convenient to the dealer.

It is an object of the invention that, instead of faxing an application to the funding sources, a dealer enters the application electronically, either on-line or off-line, and directs the system to selectively send the application to any number of finding sources, including conditions under which the application should be automatically forwarded to additional funding sources in the event a decline notice, conditional approval, or no response, etc., is received from a funding source(s).

It is also an object of the invention to provide for automatic faxing of an electronic application, in standardized fax format, to a funding source as required, for example if normal lines of communications are down, or if the funding source does not utilize a system capable of receiving an application in other than fax format. "Standardized" here means in a format which is standard for the funding source to which the fax is directed, i.e., organized in the format matching the unique requirements of each respective funding source.

It is an object of the present invention to maintain faxed applications the same as electronically submitted applications, to provide fax forwarding, and to keep faxed status indications.

It is an object of the present invention to send the application directly to a funding source credit application processing system, bypassing the need for the funding source to manually enter the application.

It is an object of the invention to provide a dealer with ease and flexibility in funding source selection, sequencing and timing, including user selected defaults which can be overridden on a case-by-case basis.

It is an object of the invention to provide for editing of an electronic application before or after it is electronically sent to a funding source.

It is an object of the invention to provide interactive, on-line and off-line application data entry, editing and review.

It is an object of the invention to provide a dealer with the ability to access credit bureaus, to analyze, summarize and present key credit information contained in a credit bureau report in an easily understandable format, thereby rendering the report more valuable to both the dealer and the funding source as a tool for making credit related decisions.

It is an object of the invention to provide for secure access to the credit application and routing system, facilitating multiple levels of security.

It is an object of the invention to provide credit application management and administrative functions, including statistical analysis of credit application processing, funding source decisions, system usage, applications pending and with which funding sources they are pending, status of all applications entered during various time frames, etc.

It is an object of the invention to provide workflow management of each credit application and an audit trail wherein each significant step of the application process is time, date and user-stamped, wherein any problems or errors encountered are logged for later analysis and correction, and wherein account status, i.e., current charges, transactions processed, etc., can be accessed, as well.

It is an object of the invention to provide a user with access to a variety of optional additional useful features, such as a loan calculator, a loan vs. lease analysis, access to a vehicle pricing guide, news article retrieval, a pop-up calendar, etc.

It is an object of the invention to facilitate lender broadcasts, wherein a lender has the capability to send new product news, for example, to any or all dealers, individually or in lender defined groups.

It is an object of the invention to provide various billing features, including automatic direct billing, or billing to a credit card.

It is an object of the present invention to enable the distribution of "pricing," that is, the transactional costs associated with the processing and routing of the credit applications, between the dealer and the bank. According to this object, a bank, as an enticement to dealers for originating credit application with them, can agree to pay the dealer's portion of the costs.

It is an object of the present invention to provide an on-line, real time, solution for the entire automotive indirect loan application process and funding.

It is an object of the invention to provide direct full-time connect access and dial-up access to the system by the dealer, and provide direct connect full-time access to the funding source(s).

It is a further object to provide dial-up access to the system as a back-up to the direct connections for both the dealers and the funding sources.

It is an object of the present invention to service all dealerships and service all financial institutions.

It is an object of the present invention to allow for sharing of data between the bank and the dealer, e.g. credit bureau information, thereby reducing credit bureau costs.

It is an object of the present invention to provide system-wide electronic news and broadcasts to the entire dealer community.

It is an object of the present invention to allow a dealer to enter and submit applications, pull credit bureau information using minimum input, summarize credit bureau information in a readable format, track the status of all applications to all banks, direct, redirect and queue applications to banks, make changes to previously submitted applications, book an application, and use screens and information similar to the bank's credit analysis screens when talking to bank staff about the application.

It is an object of the invention that, if the bank is using automatic decision making and scoring, the dealer can receive application acceptance and rejection notices on line, or while on-line can request or submit additional information.

It is an object of the present invention to provide flexibility in where an application is entered, allowing dealers to enter their applications either on-line, directly into the present invention's centralized system or off-line in their own F&I system.

It is an object of the present invention to reduce the need for dealers to shotgun applications by allowing the dealer to send an application to a bank immediately upon entry into the system and to receive a quick decision, in some instances within a few minutes afterwards.

It is an object of the present invention to provide the dealer with faxing capabilities to funding sources which are not connected to the invention's electronic network, and to provide faxing of applications even to network connected banks as a backup when lines are down or when the bank system is not available.

It is an object of the present invention to allow a bank to have one standardized network and application interface to all of its dealers regardless of the dealer's F&I system, which can be expanded to include non-automotive customers.

It is a further object of the invention to allow a bank to share credit bureau information with a dealership.

It is also an object of the invention to allow a bank to send messages and bulletins to the dealers on-line.

It is also an object of the invention to provide for review of the status of applications together with decisions and related terms and conditions from the funding sources.

It is also an object of the invention to provide for the use of similar screens when the funding source and dealership are discussing an application.

It is also an object of the invention to provide for automatic decision making and scoring effectively for immediate action by the dealer in "booking" the loan, i.e., selecting the funding source which will issue the financing.

It is an object of the present invention to provide banks with an automated method of sending "B & C" credit applications, that is, applications with marginal credit quality as opposed to higher quality "A" credit applications, to their business partners who fund such transactions.

It is a further object of the present invention to interface and communicate with the banks and the dealers through a variety of mediums, including a Value Added Network (e.g., CompuServe.®) or the Internet, with an appropriately sized trunk.

It is an object of the present invention to act as a service bureau to provide a front-end processor to a bank's credit processing system, taking the individual dealer communication load off of the bank's system, and providing and maintaining the communications protocol between the invention system processor and the bank.

It is an object of the present invention to provide a level of security between the bank and dealership, wherein dealers will not be able to directly connect to the bank, wherein all communications must go through the present invention system, wherein only authorized dealers will be able to send applications to the bank via the present invention, and wherein the present invention meets all the security expectations of the banks.

It is an object of the present invention to facilitate application entry customization to verify that specific data fields are entered on the application prior to sending it to the bank, wherein each bank can add customized data elements to a standard application, for example, the standard CBA (Consumer Bank Association) application format.

It is an object of the present invention that the dealer will know immediately whether an application was received at the bank and if there were any required data fields on the application that were not entered.

It is an object of the present invention to route an application to one or more banks as directed by the user, or alternatively, a dealer can indicate which bank or banks to send the application to immediately after entering the application. In instances when more than one bank is requested, the present invention can route the application to the next bank automatically using either a time delay as determined by the dealer or the application's decision status or a combination to the application's decision status and a time delay. At his discretion the dealer also can manually route the application to the next bank.

It is an object of the present invention to enable dealers to setup default funding sources, wherein applications can be scheduled and routed to the default funding sources.

It is an object of the present invention to enable the dealer to see exactly where each application is in the bank's application processing by keeping a constant update on the status of all applications, keeping track of which applications were sent to which banks and when, including an indication of when the application was received by the bank, the information being available to both the dealer and the bank.

It is an object of the present invention to provide comprehensive analysis tools for troubleshooting and fixing problems as they occur, and for the answering of questions on-line.

It is an object of the present invention to provide report and printout features, such that a dealer can cause reports to be generated at the central processor of the system and have them faxed to the dealer location, wherein file transfer may also be optionally selected, wherein the reports can relate to any information maintained by the system concerning the dealer (for example, the number of credit applications sent to a particular funding source and their subsequent outcome).

It is an object of the present invention to provide consolidated reports to "Mega-dealers," i.e., dealers with several locations and franchises.

It is an object of the present invention to provide a lender history report to the dealers, that is, a report which provides, for example, the number of applications sent to any funding source with the percent approved and rejected, etc.

It is an object of the present invention to provide a centralized enrollment and billing process, that is, a process for activating and enrolling a dealer, bank, or other user, with a password and ID.

It is an object of the present invention to enable banks to easily and quickly develop and deploy new products and enhancements, wherein initial marketing of new products can occur through the present invention, and enrollment of new products can easily occur.

It is an object of the present invention to make it easier for the banks to accommodate growth in the number of dealers and volume of applications.

It is an object of the present invention to continuously monitor system and network performance and utilization.

It is an object of the present invention to permit updating and increasing system resources and availability as the number of dealers and volume of applications increases, wherein the cost to accommodate growth in volumes may be spread across all banks and be fixed per application.

It is an object of the present invention to provide the bank with one vendor to handle all dealer electronic application entry questions, thereby providing a turnkey solution for the bank.

It is an object of the invention to provide for a dealer to enter an application either on-line to the inventive system or off-line, and electronically transfer the application to the inventive system, the inventive system routing the application to all requested funding sources and receiving the funding source's response to the application, making the response available to the dealer user on-line and to the off-line users when they come on-line again, thereby giving the dealer complete management of the application process.

SUMMARY OF THE INVENTION

In accordance with the above objects, the present invention is a centralized credit application entry and routing system which accepts applications from, for example, automotive dealerships, electronically and selectively forwards them to funding sources, including funding sources having computerized credit application systems. The following additional features and advantages are achieved according to the embodiments disclosed and claimed.

An embodiment of the present invention with anticipated commercial potential will sometimes be referred to as "Credit Connection.®." herein. All rights in Credit Connection.® are expressly reserved. Also, CreditRevue.® used herein refers to a proprietary bank credit processing software package of Credit Management Solutions, Inc. (CMSI) and all rights in CreditRevue.® and the software package which implements a bank credit processing system, are also expressly reserved.

A major advantage of present invention relates to the submission of a credit application electronically from an automotive dealer, for example, to a bank.

Instead of faxing an application to the funding sources, according to an embodiment of the invention, the dealer enters the application directly to the inventive system electronically on-line, or off-line to a system like an automobile dealer's F&I system for later entry into the invention system through an electronic interface with the F&I system. The dealer then directs the system to selectively send the application to any number of funding sources. The system according to the present invention sends the application directly to the funding sources credit application processing system, bypassing the need for the funding source to manually enter the application.

A user, e.g., dealer, can enter a credit application in the system according to the present invention in different ways. For example, the dealer can enter the application on-line via a telephone or network connection, for example, by logging-on to the system according to the present invention using either an intelligent device, e.g., a personal computer performing a terminal emulation, a local host or in-house system, or using a dumb terminal at the dealership. The term "terminal device" will used herein to encompass any device, e.g., personal computer or dumb terminal, located at a logical or physical terminus of the system. The application data can then be entered on-line and interactively through the inventive system's application entry method.

In another way of using the system according to the present invention, the dealer can enter the application data off-line, into its own off-line system, for example. After a dealer collects or enters application data into its off-line system, the dealer can then log-on to the inventive system, and transfer a stored application from the off-line system to the inventive system.

Further, after an application is entered off-line and sent to the inventive system, the dealer can later log-on to the inventive system, and make changes on-line to the application, or otherwise complete the application processing. However, any changes thus made to the application on-line need not modify the off-line application maintained in the dealer F&I system.

In either of the above ways of entering an application, the application is saved in a database and sent to the banks as requested by the dealer.

Advantageously, the present invention basic application format is the standard CBA (Consumer Bank Association) application, and each participating funding source can add a number of additional fields to the basic application format.

After an application is input to the inventive system, the user (dealer) can continue application processing on-line. If the application was sent in from a dealer F&I system, the user can either disconnect and reconnect with the inventive system using the dealer F&I computer system, or the user can switch from a transfer mode to an interactive, on-line mode on the same connection to complete the application process. However, the exact sequence may be dependent on the functionality provided by the particular dealer F&I system.

Advantageously, prior to sending an application to funding sources, the user can select to use user defined default funding sources, sequences and timings, or alternatively, the user can select other funding sources to which the application is to be sent. The user can select the sequence of sending, and/or the timing of the each delivery, and/or the conditions upon which each delivery should be executed. Multiple levels of default are possible.

After funding sources have been selected, the inventive system prompts the user to enter any additional application fields required by any particular funding source selected.

When all required application fields have been entered for that selected finding source(s), the application including the appropriate additional application fields is transferred to the appropriate selected funding source in accordance with the sending sequence established by the user.

When all funding source application field requirements have been satisfied, the application is marked as ready to be sent and transferred to the funding source. After the application has been transmitted to a funding source, an associated application record is marked as sent to that particular funding source.

After an application has been sent to any or all selected funding sources or the dealer stops sending to the funding sources, the application is marked as pending for those funding sources which were sent the application.

The present invention furthermore simplifies how a dealer manages the funding sources and selects funding sources for an application. During installation of the present invention at a dealership, the dealer initially sets up all of the funding sources with which it has business agreements. The dealer further sets up default values for selecting and prioritizing the funding sources. For example, the following funding source defaults may be set up to be used with every application:

(1) Any of several funding sources which will be initially used when selecting the funding sources for a type of credit application, i.e., finance versus lease, "A" quality versus "B & C" quality.

(2) The sequence in which an application is sent to selected funding sources and the timing of when the application is sent:

(a) The application is sent to selected funding sources at the same time;

(b) the application is sent in sequence of how the funding sources are entered with a maximum predetermined waiting for decision time period before sending to a next funding source (if sequence sending is selected, the system will stop sending the application to subsequent sources after receiving a positive response from a previous source or forward immediately to the next funding source upon a negative response);

(c) send the application to all funding sources at the same time (i.e., shotgun).

(3) Automatically fax the application to the funding source if normal communications to the funding source are not available. When the dealer has chosen to automatically fax to the funding source, the dealer is notified that the application was faxed and the application is marked as faxed to this particular funding source. If the dealer selected sequence sending, the waiting for decision time period (the delay to the next funding source) is overridden and the application is sent to the next sequenced source without a waiting for decision time period delay. When the dealer has chosen not to automatically fax to the funding source in case normal communications are down, the dealer is prompted whether to fax the application or not. When the dealer chooses to fax the application, the application is faxed and marked as being faxed to this particular source. If the dealer chooses not to fax the application to the particular funding source, the funding source is deleted as a selection and the application is sent to the next selected funding source.

When the basic application fields have been entered on the inventive system, the dealer is prompted to select funding sources. The dealer can then choose to use the defaults as described above, or to override them. For example, for any particular application the dealer may change which funding sources to use either by highlighting or entering a new funding source, or by deleting a default funding source. After the dealer selects which funding sources to use for the application, the dealer is prompted to enter any additional fields required, as described above. After all additional fields have been entered, the dealer has the ability either to change the funding sources again or to send the application to the already selected funding sources.

When the dealer decides to send the application to the funding sources, the dealer is prompted to accept the default sequencing, or to change from the default settings for this particular application functions relating to (i) the sequence of how the application is sent, (ii) the waiting for decision time period, (iii) the condition upon which forwarding the application would terminate, (iv) forward immediately when faxing the application. After the dealer decides when, where, and how the application is to be sent, the application is sent to the funding source(s) as already described above.

The dealer has complete control over the selection of which funding sources to send an application to and the routing of the application to the funding sources.

A dealer may have more than one funding source. However, it is contemplated that it may be the case that all dealer funding sources are not using the present invention. Therefore, as a service to the dealers in this situation, and to make the present invention a one-stop, turnkey operation for the user, the dealer can setup funding sources that are not users of the present invention in the following manner. When a dealer sets up their funding sources, the dealer is told by the system whether the funding source is a user of the present invention. If the source is not a user, the dealer is prompted for the fax number of the funding source.

Thereafter, when a dealer selects which funding sources to send an application to, if the funding source is a non-user of the present invention, the inventive system automatically faxes the application to the funding source. The dealer does not need to reenter the fax number and it is defaulted from the original setup.

Therefore, advantageously, the dealer enters the application on the system according to the present invention only once. The system routes the application as directed by the dealer, using either the default routing scheme or as the dealer customized the routing for a particular application.

The invention is further extremely easy to use. Function key use has been minimized and a >HELP! key displays a list of valid function keys. Function keys are made to be consistent with other dealer software wherever possible. In addition, an on-line training database is available for use with a training video or manual.

A dealer is able to set up information on the system about the dealership using a convenient maintenance screen. This screen includes fields for name and address, credit bureau and application routing preferences, type of F&I software used, etc. On-line help may be optionally accessed throughout the various stages of application processing, scheduling, routing, etc.

To provide system security, a dealer is able to log-on with a unique ID and code and there are many possible options in this regard. For example, the dealer could log-on directly to the inventive system over a dial-up telephone line or satellite link, or connect via a value-added network to the system according to the present invention.

Each action, e.g., application entry, sending to funding source, booking the loan, etc., can be tracked by the system.

In an embodiment of the system according to the present invention, screens are organized so that a dealer can skip over ancillary fields easily. For example, a collateral screen is organized so that the dealer does not have to "tab" through numerous fields just to enter a payment amount.

Automatic calculations in spread-sheet fashion may be provided for on the collateral screen, and "Hooks" to vehicle pricing guides, for example, or other information, may be optionally provided. The automobile vehicle identification number (VIN) is prompted for first in the collateral screen.

A "quick application" option is provided according to an embodiment of the invention, where a dealer can enter just enough information to call a credit bureau, for example. The dealer is able to enter additional information at a later time.

At the end of a short (quick) or a long (full) credit application, the dealer is prompted whether a credit bureau should be called. File transfer of application data, to support future F&I interfaces, is accommodated.

A dealer is also able to specify primary and secondary credit bureau preferences so that a bureau can be automatically selected and called. Another feature of the invention allows the dealer to selectively call or recall a credit bureau at any time.

An overview screen can be accessed which summarizes information about an applicant, co-applicant (if applicable), credit bureau, and collateral, for example.

Reviewing credit bureau information is provided for according to another feature of the invention. This allows the dealer to review not only the standard teletype bureau format but also the invention's unique credit bureau summary which renders the credit bureau information far more accessible and understandable. Additionally, the dealer may also view credit bureau information regarding public records and credit trades. The screens displaying all such credit bureau report information are advantageously simplified wherever possible. When more than one credit bureau exists for an application, the dealer is also able to toggle between the bureaus, greatly facilitating analysis of the different bureau data. The present invention also supports cases when only part of the credit bureau to be viewed by the dealer. There are several options, including view only the teletype, view only the summary information, view the summary information, trades, and public records, and view everything, for example.

Depending on the particular installation, various ways can be used to request credit bureaus, e.g., dial-up, TCP/IP, or LU6.2.

Modifying an entered application is provided for as another feature of the present invention wherein a dealer is able to modify any part of a previously entered credit application. However, there is a warning issued if the dealer tries to modify an application that has already been sent to a lender. A dealer is also able to resubmit an application to a lender which has been modified to add additional information or to edit already entered information, for example.

Various features relating to entering lender required data are provided according to another feature of the invention. For example, each funding source can specify a number of additional fields from the credit application to capture. Once the dealer selects one or more funding sources, the present invention prompts the dealer for any additional information for a particular funding source if required. Advantageously, the same extra data field is assigned to the same "position" so that the dealer will not have to enter the same additional information more than once. According to another feature of the invention, a dealer is able to set up in a configuration file details about the particular funding sources with which it deals. For funding sources which are users of the present invention system, a special code is entered as part of the lender setup.

The present invention supports faxing of credit applications to a funding source, if necessary. The fax is formatted professionally like a real paper credit application, and designates that the application was sent from a system according to the present invention. All the typical associated functionality, e.g., fax queuing, handling fax failures, entering and modifying the fax number, etc. are provided for as part of this feature of the present invention.

As already noted, a dealer is able to select a plurality of funding sources to which the credit application will be sent, and if more than one funding source is selected, various options are available. For example, the dealer may optionally send to all at once (shot-gunning), send to each in turn if the previous funding source has declined the application, send to each if the previous funding source has not responded in "N" (a selectable number of) minutes, send to each in turn if the previous funding source has declined or conditioned the application, or any combination of the last three ways.

A preferred method of handling multiple funding sources can be stored in a dealer's configuration file which is set up during initial installation and is capable of being changed by the dealer.

The present invention system to funding source interface follows predetermined guidelines which are specified in a branch interface document. Each side of the link may have monitors, i.e., the system scans for incoming credit decisions from the funding sources, and the funding sources scan for incoming credit applications from the system. In one embodiment, file formats are made up of segments, and a header segment is the same no matter what is being passed back and forth. Depending on the type of transaction occurring, one or more additional segments may be sent.

In the embodiment in which the credit application file contains additional data fields for any particular finding source(s) (as described above), these additional fields are stored in their own segment. Therefore, if no additional fields are required, then that segment containing the additional information need not be sent.

Resubmits may require different handling by some funding sources and the present invention accommodates this.

The file format supports sending credit bureau information from the funding source to the dealer, and there are several options, for example, send only the teletype, send only the summary information, send the summary information, trades, and public records, or send everything.

Each funding source is able to send back additional information, such as a score, grade, etc., referred to herein as credit bureau sharing. There is also a comment field to enter more complex things, for example, a list of rate/term options. In this case, the finding source side of the interface can write the complex information into a comment.

Sending and/or reviewing funding source decisions is also provided for according to another feature of the present invention. Advantageously, a dealer is able to quickly see in summary form, e.g., in tabular form, all pending applications and their decisions from the funding sources to which they were sent. The dealer is also able to review each decision in detail. If additional information exists, such as score, grade, comments, etc., the dealer is able to display that information as well. With this information at hand, the dealer is better able to select the lender with whom to book the deal.

According to another feature of the present invention, the capability of outputting data to be loaded into the dealer's F&I software is also provided.

An audit trail is provided for in the present invention. Each significant step of the process is time, date, dealer and user stamped. The present invention is able to track all problems with interfaces, credit bureaus, faxes, etc.

Other optional functions are also provided for according to further embodiments of the present invention. For example, there is a loan vs. lease analysis function, there is an option to query a vehicle pricing guide, there is a funding source history report, there is the ability to review and save general news articles and funding source articles and news, a pop-up calendar is provided, and there is an optional function to allow a dealer to query the status of his account (current charges, transactions processed, etc.).

According to another advantageous feature, a funding source is able to send a message to one dealer, a group of dealers, or all dealers. The funding source has the capability to define dealer groups. Articles selected by the funding source may be broadcast over the system. A dealer is able to see new (not read before) news articles when they log-on to the system, and the system can keep track of which news articles have been read by which users. Once a news article has been read, it can be deleted or saved, and if saved, it can be recalled. News can also be selectively sent to one or more dealers and/or one or more funding sources by an administrator or system operator ("SYSOP").

Security features are provided according to a further embodiment of the invention. For example, a dealer is able to set up whether or not the system will allow an application to be modified after it has been sent to a funding source. The dealer is also able to set up whether the system will allow "shot-gunning," which may or may not be a desirable practice at a particular dealership due to cost considerations, for example. The dealer is of course able to define valid users and passwords, and is able to easily reset a password, delete a user, or change a user's security. Further, the dealer is able to define which functions a particular user may or may not access. The dealer is able to set up the conditions under which the system will automatically forward an application to a next selected funding source, and this can be overridden on a deal-by-deal basis.

Reporting and printing features are provided according to further features of the invention. The inventive system allows the dealer to selectively print various types of reports provided for by the system. This information can then be faxed, for example, to the dealer from the system's central location. The system advantageously can provide reports on credit applications taken, credit applications decided, credit applications sent to each lender, credit applications by salesperson, etc. Besides being able to fax reports to the dealer upon request, the system can support a file transfer of the report data as well. The system furthermore provides the capability to get reports at a "Mega-dealer" level, however, if so configured, a special user ID and password can be required to obtain this report.

Billing features are also provided according to further features of the invention. Anything that might be used as a basis for billing is made a part of the audit trail, mentioned above. For example, applications entered, bureaus requested, faxes sent, resubmissions ("resubmits"), reports requested, etc. Billing reports are available from the system, and billing can be handled in various ways, for example, by sending a bill, billing a credit card, or by other methods as arranged with system users. Pricing can be spread between the dealer and the bank, and a bank can determine whether or not to pay the dealer's portion of the costs.

System administration features are provided according to further features and include, for example, the ability to start and stop servers, bureaus, faxes, etc., and to archive, backup and restore programs and data.

In order to implement the above advantageous features, there is provided according to one embodiment a credit application and routing system comprising a central processor having a program and operational to: selectively receive credit application data associated with respective applicants from at least one remote applicant terminal device; selectively forward the credit application data to at least one remote funding source terminal device; and selectively forward funding decision data from the at least one funding source terminal device to the respective at least one remote applicant terminal device; and coupling means for coupling said central processor to a communications medium to thereby enable the sending and receiving of the credit application data and the funding decision data over the communications medium.

According to another embodiment, there is provided a credit application and routing system including a central processor having a program and further comprising: data input means for selectively receiving credit application data from respective dealers at remote locations; and routing means for selectively forwarding the credit application data to remote funding sources and selectively forwarding funding decision data from the funding sources to the respective dealers.

According to another embodiment, there is provided a computer based method of operating a credit application and routing system, the system including a central processor coupled to a communications medium for communicating with remote application entry and display devices, remote credit bureau terminal devices (computers), and remote funding source terminal devices (computers), the method comprising: selectively receiving credit application data from a remote application entry and display device; selectively obtaining credit report data from at least one remote credit bureau terminal device (computer); selectively forwarding the credit application data to at least one remote funding source terminal device (computer), if appropriate; and selectively forwarding funding decision data from at least one remote funding source terminal device (computer) to the respective remote application entry and display device.

According to another embodiment, there is provided a credit application and routing system, comprising: a communications medium; central processing means, operably coupled to said communications medium, for executing a computer program which implements and controls credit application processing and routing; at least one credit application input terminal device, operably coupled to said communications medium, for keyboard entry of at least credit application information, for visual display of at least funding decision information, and for sending and receiving to and from said central processing means over said communications medium; and at least one funding source terminal device (computer), operably coupled to said communications medium, for receiving at least a portion of a credit application over said communications medium from said at least one credit application input terminal device through said central processing means, and for sending a finding decision to said at least one credit application input terminal device through said central processing means over said communications medium.

According to another embodiment, there is provided an article of manufacture comprising a computer readable storage medium having a substrate physically configured to represent a computer program, the computer program comprising means for causing a computer to provide a credit application analysis and decision routing system.

According to another embodiment, there is provided a computer program having a plurality of program steps to be executed on a computer to implement and control an interactive credit application and routing system, said program comprising: means for receiving a credit application from at least one remote application input and display device; means for selectively forwarding a received credit application to at least one funding source; means for receiving a funding decision from the at least one funding source; and means for forwarding a received funding decision to the at least one remote application input and display device.

In another embodiment, there is further provided means for selectively obtaining a credit report associated with a respective applicant from at least one credit bureau; means for analyzing and summarizing an obtained credit report and providing credit report information in an analyzed and summarized format in order to facilitate a dealer user making a decision as to which funding source or sources should receive a respective credit application, the decision being based on applicant criteria including at least one of: the credit history of the applicant, and the respective lending criteria of each funding source; and means for enabling a funding source and a dealer user to share credit reports which either of them may have obtained, including sharing credit report information in an analyzed and summarized format provided.

According to a further embodiment, the systems includes means for analyzing credit application and credit bureau report information, including debt ratio computation, loan to value computation, grading of applicant's credit-worthiness, triggering of "decision rules" and issuing a corresponding "alert message" (a decision rule is triggered whenever any information regarding the applicant contained in the application and the credit bureau report is inconsistent or contradictory), correcting errors within credit bureau reports where a single event, such as a loan, may incorrectly be shown as two loans (such corrective function may commonly be referred to as de-duplicating or de-duping), adjusting debt ratio, loan to value, and lending parameters where required when inaccuracies are identified, and providing a plain English interpretation of credit bureau codes and reports.

Regarding the "decision rules," the invention triggers a decision rule and displays a corresponding "alert message" when a credit application includes information which the system has been programmed to identify as requiring investigation prior to approval of the transaction. The decision rules include, but are not limited to bank policy rules, lending policy rules of application/bureau consistency rules. A bank policy rule may be a policy of a bank that it will not issue loans to employees. If the applicant is an employee of the bank, a bank policy rule could be triggered and an alert message generated. If a funding source has a minimum income policy for loans of specific sizes, a lending policy rule could be triggered by an applicant's failure to meet the appropriate level. If inconsistencies appear between the application data and the credit bureau report data, such as social security number not matching, an application/bureau consistency rule could be triggered.

BRIEF DESCRIPTION OF THE DRAWINGS

The above and other objects, advantages and features of the invention and the disclosed embodiments will become apparent from the following detailed description taken with the drawings in which:

FIGS. 2C-1 and 2C-2 illustrate in flow chart form the Send Application (3) branch of FIG. 2.

DETAILED DESCRIPTION OF THE PREFERRED EMBODIMENT(S)

The invention will now be described in more detail by example with reference to the embodiment(s) shown in the Figures. It should be kept in mind that the following described embodiment(s) is only presented by way of example and should not be construed as limiting the inventive concept to any particular physical configuration.

Figure 2:
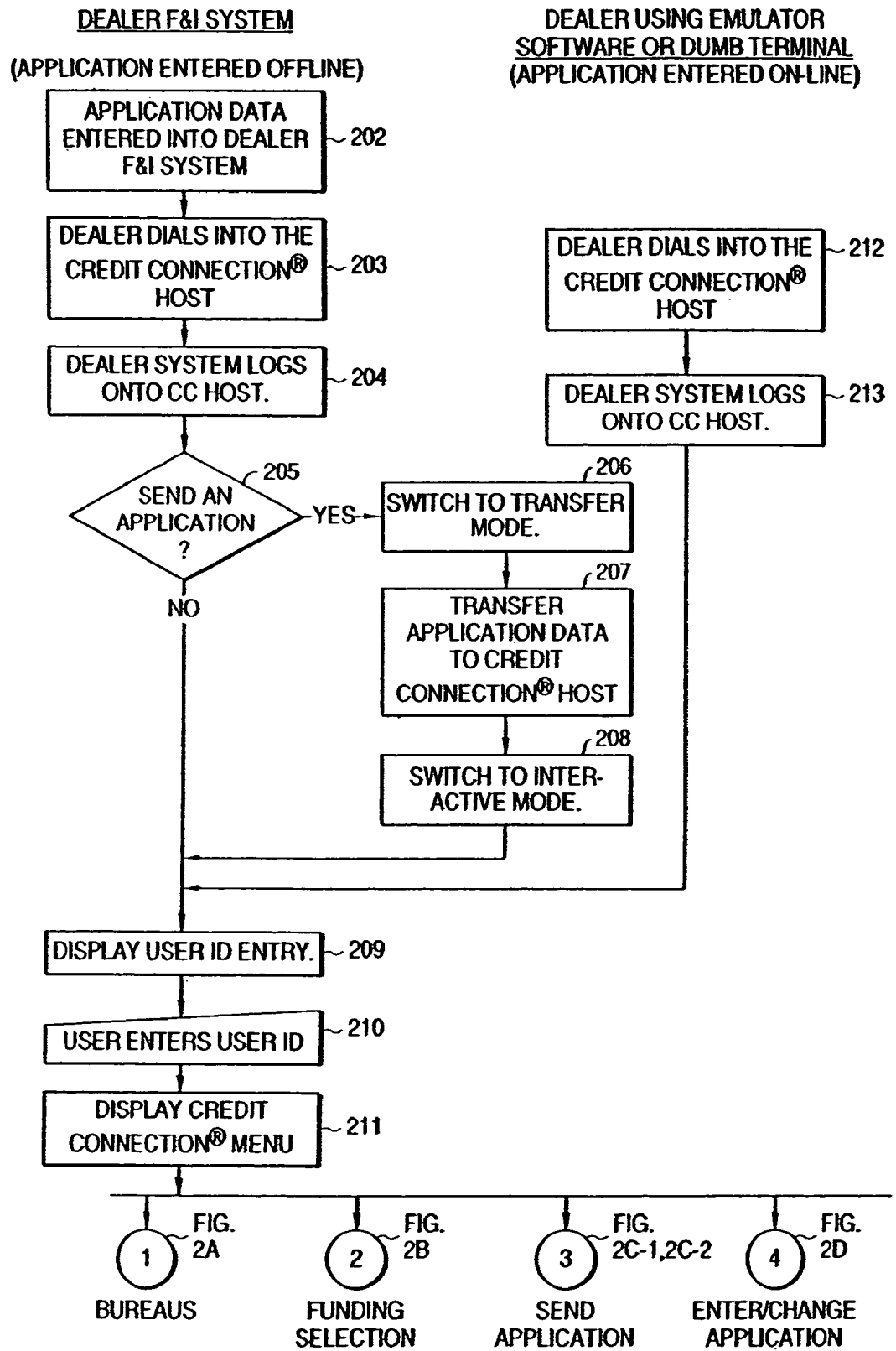
FIG. 2 is a high-level flow chart of some of the main functions of a program implementing a credit application and routing system according to an exemplary embodiment of the invention.
Figure 2A:
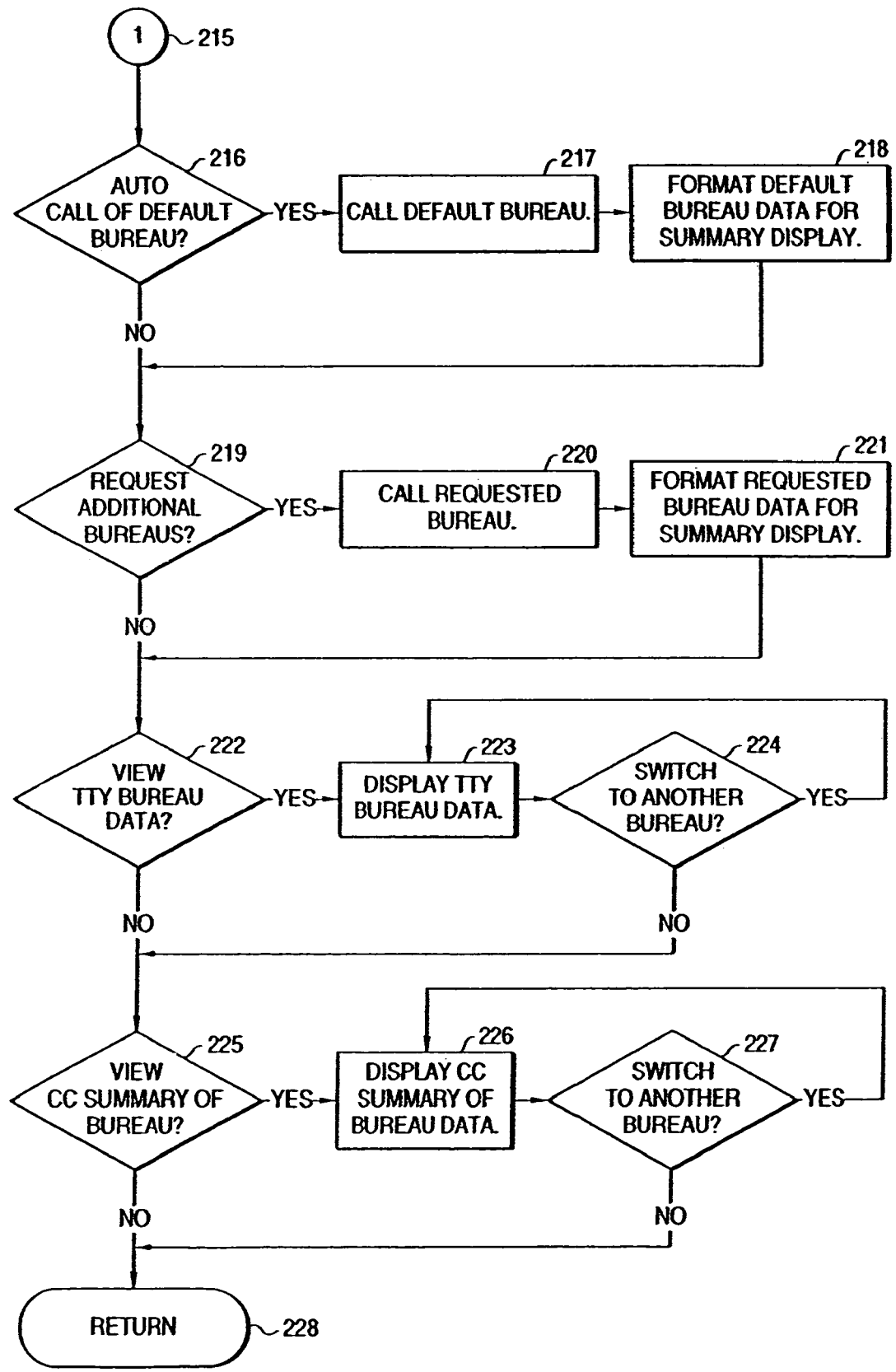
FIG. 2A illustrates in flow chart form the Bureaus (1) branch of FIG. 2.
Figure 2B:
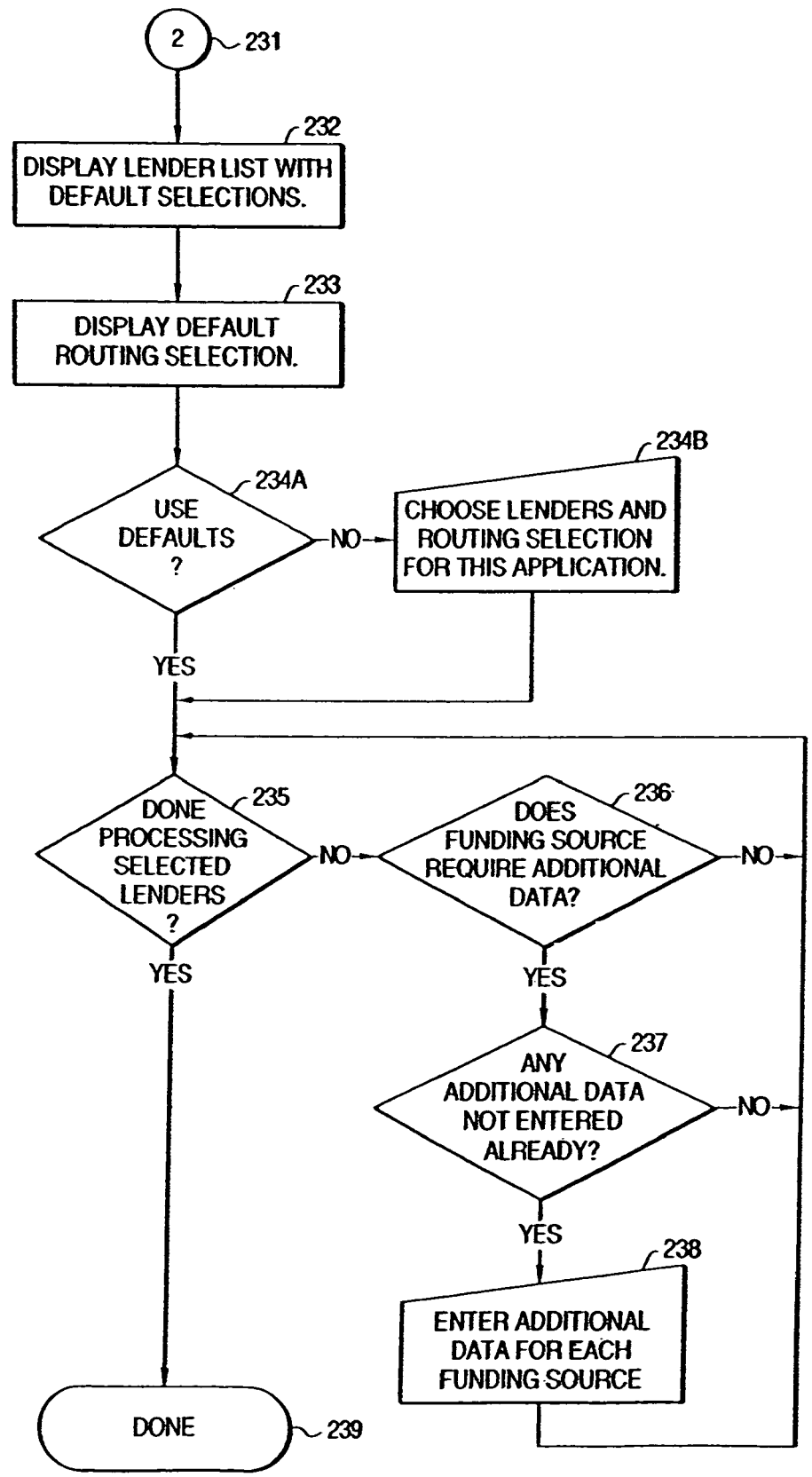
FIG. 2B illustrates in flow chart form the Funding Selection (2) branch of FIG. 2.
Figures 1, 2C:
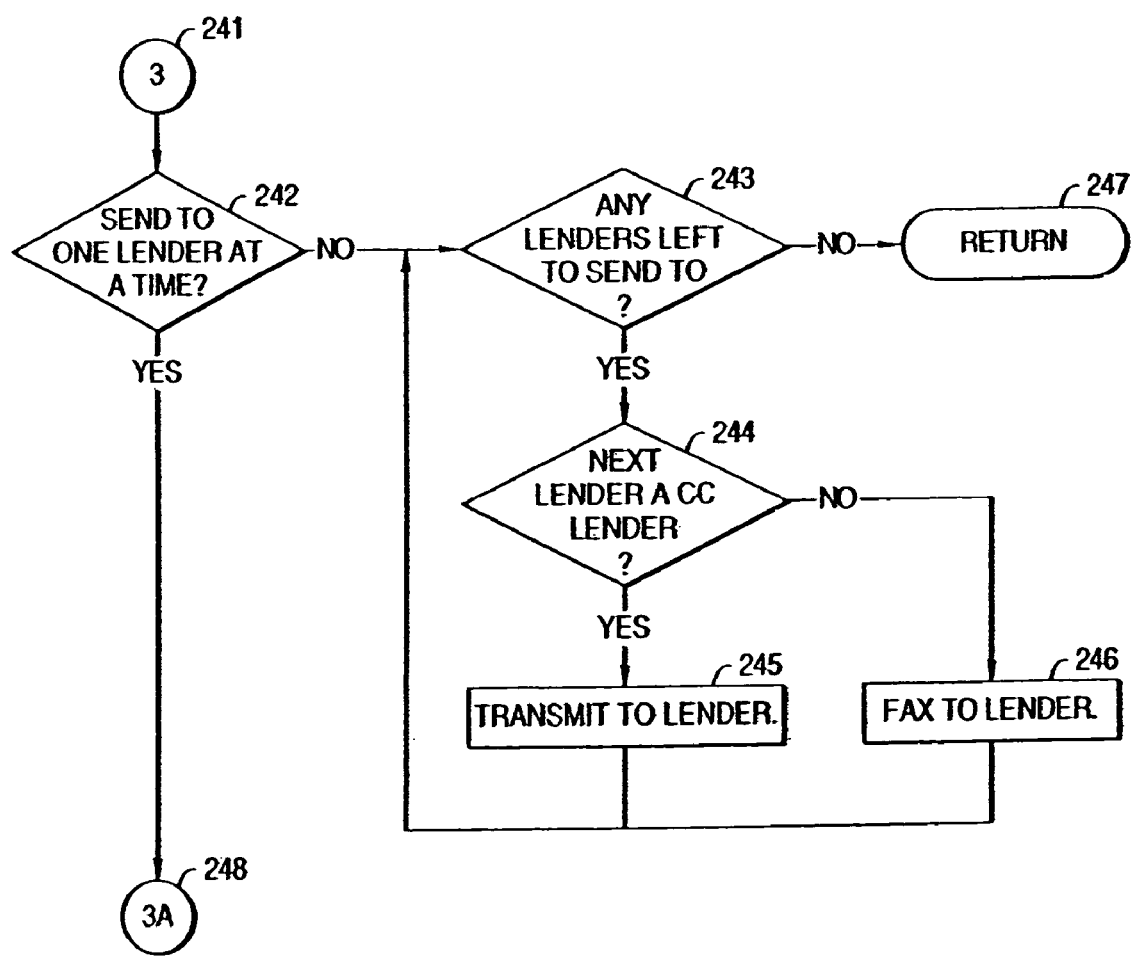
Figures 2, 2C:
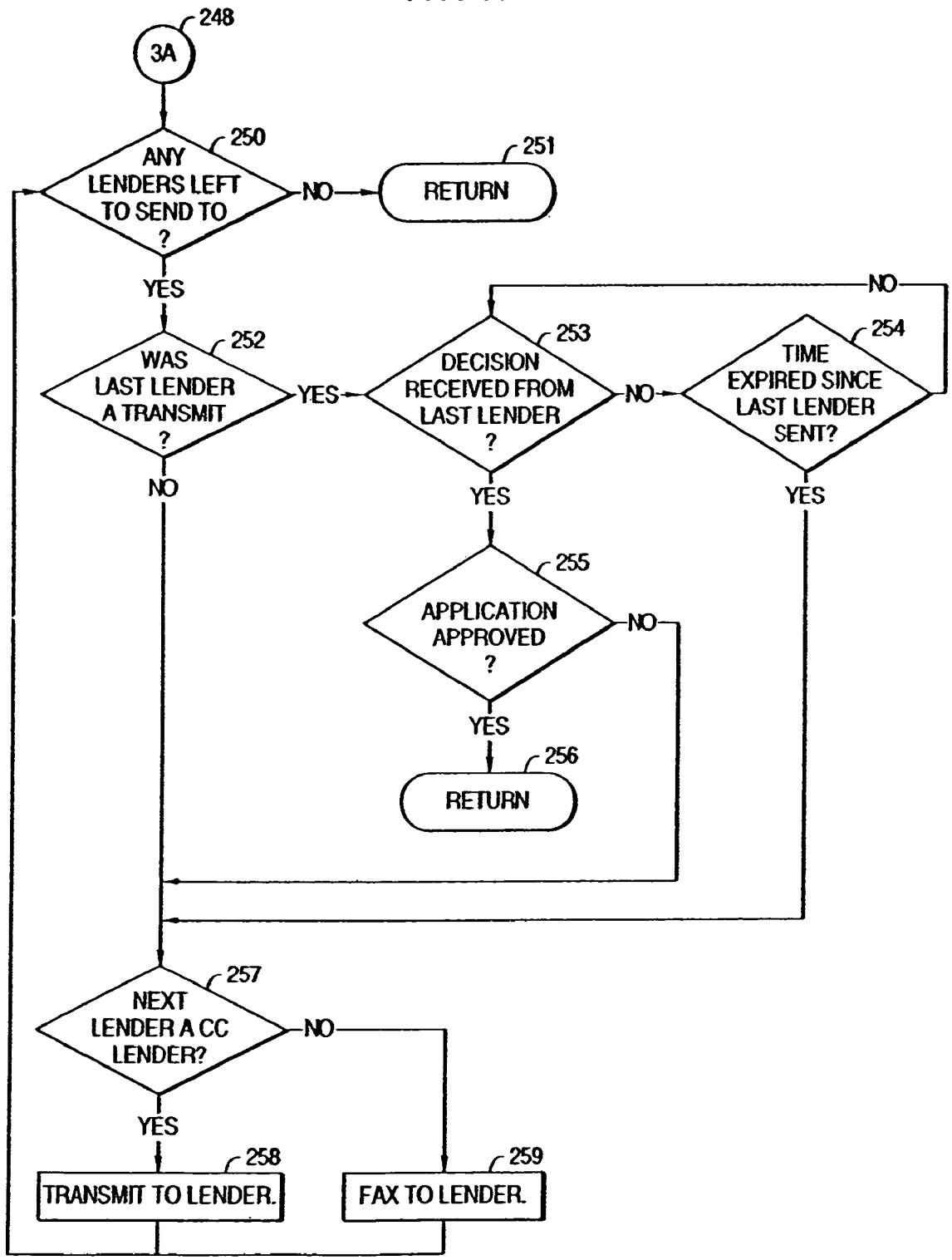

With reference to the exemplary embodiment of a credit application and routing system illustrated in FIG. 1, central processor having a program implementing and controlling credit application processing and routing, i.e., the overall operation of the system, referred to as simply central processor 102 for this discussion, is operably coupled to a communications medium, for example, a wide area network 104 by, in this case, network device 103. Although illustrated as a wide area network, it should be appreciated that the communications medium could take a variety of other forms, for example, a local area network, a satellite communications network, a commercial value added network (VAN), the Internet, ordinary telephone lines, or private leased lines. The banks may be connected to a VAN with an appropriately sized trunk line; 56K BPS, Fractional T1, T1, multiple T1's, or T3. The communications medium used need only provide fast reliable data communication between its users.

The processor 102 can be any modem main-frame, supermini or minicomputer system, such as is commercially available from IBM, Data General, or Hewlett-Packard, for example, having the capability of handling a real-time, multitasking, remote-access database application. The processor provides a centralized conduit for the collection and transfer of applications between dealers and banks, and in the process also provides a centralized database which accumulates credit application data that is valuable in and of itself. The only information required to be kept on the funding source system is information required to process the loan. Status information, for example, is stored on the present invention system, not on the funding source system, thereby reducing the overhead for the funding source system.

Related to the collection of data, the invention provides billing features, including automatic direct billing, or billing to a credit card. Anything that might be used as a basis for billing is made a part of an audit trail, as mentioned above. For example, applications entered, bureaus requested, faxes sent, resubmits, reports requested, etc. Billing reports are available from the system. Furthermore, the costs of activities can be spread between the dealer and the bank, and a bank can decide whether or not to pay the dealer's portion of the costs.

Predefined events will create a billing transaction, to be sent to the billing system. Examples of billable events are:

A. Dealer Billable Events
1) Application Fee, 1st bank 2nd, 3rd, . . . bank Fax surcharge
2) 1st Credit bureau request 2nd, 3rd, . . . bureau
Plus any bureau charges
3) three-tier % Discount, based on application volume Volume/% Due
4) Tracking for relationship ADP/Reynolds
5) Number of terminals/Network connections
6) Report package "code"
7) On-demand reports
8) Base monthly fee
9) Set-up fee B. Bank Billable Events
1) Base Monthly fee
2) Application Fee
3) Three-tier volume discount
4) Network costs per month
5) Report Package "codes"/month
6) On-demand reports
7) Tracking relationship D, APPRO, etc.
8) Set-up fee Each billing event will be logged and recorded at the time of the event. Billing of these events will occur in the billing system.

Administrative functions are also provided, including statistical analysis of credit application processing, funding source decisions, system usage, applications pending, status of all applications entered during various time frames, etc. The audit trail provides that each significant step of the process is time, date and user-stamped. Dealer time zones can be tracked so that all times displayed to the dealer would be in their local time zone. The central processor database, however, would always store times using local time, e.g., EST. Any problems or errors encountered are logged for later analysis and correction. Account status, i.e., current charges, transactions processed, etc., can be accessed, as well. Statistics about electronic and faxed applications are available as well, and thus a dealer does not need to manually calculate faxed statistics. The present invention thus provides comprehensive analysis tools for troubleshooting and fixing problems and answering questions.

In a preferred embodiment, the central processor is a Data General system running the UNIX operating system, however, practically any operating system with multi-tasking capabilities would be suitable. In a preferred embodiment, the database used is a Progress database, that is, it was developed using the Progress development language, however, other modem databases could also be used.

At a dealer 110, at least one credit application input terminal device 112a, 112b and/or 112c, is operably coupled to the communications medium 104 by a network device 113a or 113b or modem 113c. The terminal devices are for keyboard entry of credit application information, visual display of funding decision information, and for sending and receiving to and from the central processor 102 over the communications medium 104, for example. The dealer terminal device may be the dealer's F&I system 112a, a dealer personal computer using a VT100-VT320 emulator 112b, or simply a dumb terminal device 112c. The credit application would typically be a standard CBA (Consumer Bank Association) application, however, each participating funding source can add a number of additional fields to the basic application format. The present invention thus advantageously provides the funding source with one standard application format with its own required additional fields from all dealers using the system. A "quick" application is also supported.

At a funding source 120 there is some sort of computer likewise operably coupled to the communications medium 104 for receiving a credit application over the communications medium 104 input from a credit application input terminal device 112a-112c under control of the central processor 102, and for sending a funding decision to a credit application input terminal device 112a-112c through the central processor 102 over the communications medium 104. As illustrated, such a funding source computer may be a Bank CreditRevue.®. System 124a coupled by an interface 122a and network device 123a to the communications medium 104, or some other Bank Credit Processing System 124b (i.e., not a CreditRevue.®. System) similarly coupled via an interface 122b and network device 123b. CreditRevue.®. refers to a proprietary software package available from Credit Management Solutions, Inc. (CMSI). Since a goal of the present invention to service all dealerships and service all financial institutions, accommodation of a variety of different bank credit processing systems is accomplished through such an interface 122b as illustrated. However, if a lending source bank is using CreditRevue.®, the inventive system takes advantage of the various formats used in CreditRevue.®, thereby simplifying use.

The Credit Connection.®. host interfaces 122a and 122b at the funding sources 120 receive the credit application data over the communications medium 104 through the network devices 123a and 123b, respectively, and provide a communications interface to the funding source credit processing systems 124a and 124b, respectively. The interfaces 122a and 122b serve as front end processors taking the burden of handling communications, data formatting, etc., off of the funding source credit processing systems 124a and 124b. The present invention will provide and maintain the communications protocol between the dealers and the funding source.

As noted above, an objective of the present invention is to send the application directly to a funding source credit application processing system, bypassing the need for the funding source to manually enter the application. However, as explained in the summary section, if normal lines of communication are down, in this case the network 104, or if the application is to be sent to a funding source that does not have an active automated credit processing system (non-electronic funding sources or down bank system) or does not have an active Credit Connection.®. host interface 122a or 122b, as examples, the central processor 102 can have a telefax facsimile credit application sent to a funding source via fax host 105 and non-automated fax 125.

Besides eliminating the errors caused by the entry of data by the funding source staff, it is also an objective of the present invention to reduce the need to keep large staffs available on weekends, for example, to enter applications and to balance the credit application processing load reducing the backlog of applications on Mondays or the first day after the funding source is closed, for example. The present invention spreads the application delivery load over a longer time frame, balancing the load on the system and staff, eliminating the Monday morning bottleneck, and minimizing response time to the dealer.

Therefore, this faxing capability is considered a fallback arrangement, since the present invention ideally eliminates entirely any need for manual entry of application data. The present invention provides for fax forwarding and a faxed status is kept. The present invention maintains faxed applications in its database the same as electronically submitted applications.

A print of a completed application can be sent to the dealer if required, for example, since some banks may require a signed copy of the application.

As also illustrated, the central processor 102 is connected to one or more Credit Bureaus 130 in a similar fashion, i.e., with network devices 133a-133c, for example. As assumed, the credit bureaus generally have a computer system which is accessible over dial-up lines or a communications network. Such credit bureaus include, for example, TRW, CBI (Equifax) and TRU (Trans Union). The credit application and routing system according to the present invention can advantageously handle connecting to the credit bureau, transferring the needed information, e.g., name, address and social security number, to the credit bureau, and receiving the credit bureau report, automatically or interactively. Credit application information can be edited before forwarding a credit application to a finding source. Electronic sharing of credit bureau information and related data from the bank to the dealer advantageously reduces credit bureau costs.

A communications module of the program running in the central processor 102 handles the details of communicating with the various dealers 110, funding sources 120 and credit bureaus 130, including the telefaxing, if required. There is also communication programming in the interfaces 122a and 122b to function as front end processors at the respective funding sources, however, details of this aspect of the invention are routine. As would be readily apparent to one skilled in the art, the individual dealer communication load is taken off the bank's system by the provision of a front end processor.

The present invention includes a computer program which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding how to make and use the invention. The inventive functionality of the claimed computer program will be explained in more detail in the following description in conjunction with the remaining figures illustrating the program flow.

It should also be noted that in developing the computer program aspects of the invention, and in implementing a commercial embodiment of the invention, the applicants have written program code. The computer program with respect to the various processes implemented by this program code, as noted above, are considered to be within the scope of the appended claims. The applicants' program code is further covered and protected by copyright, and this disclosure in no way should be construed as waving any rights of the applicants or their successors and/or assignees in the program code protected by copyright.

The present invention makes it easier for the banks to accommodate growth in the number of dealers and volume of applications. Updating and increasing system resources and availability as the number of dealers and volume of applications increases is readily accomplished with the centralized system according to the present invention. The cost to accommodate growth in volumes can be easily spread across all banks and is fixed per application. The funding sources are provided with one vendor to handle all dealer electronic application entry questions, and having staff to continuously monitor system and network performance and utilization. Centralized enrollment and billing provide increased efficiency to the whole credit application handling process.

Figure 1A:
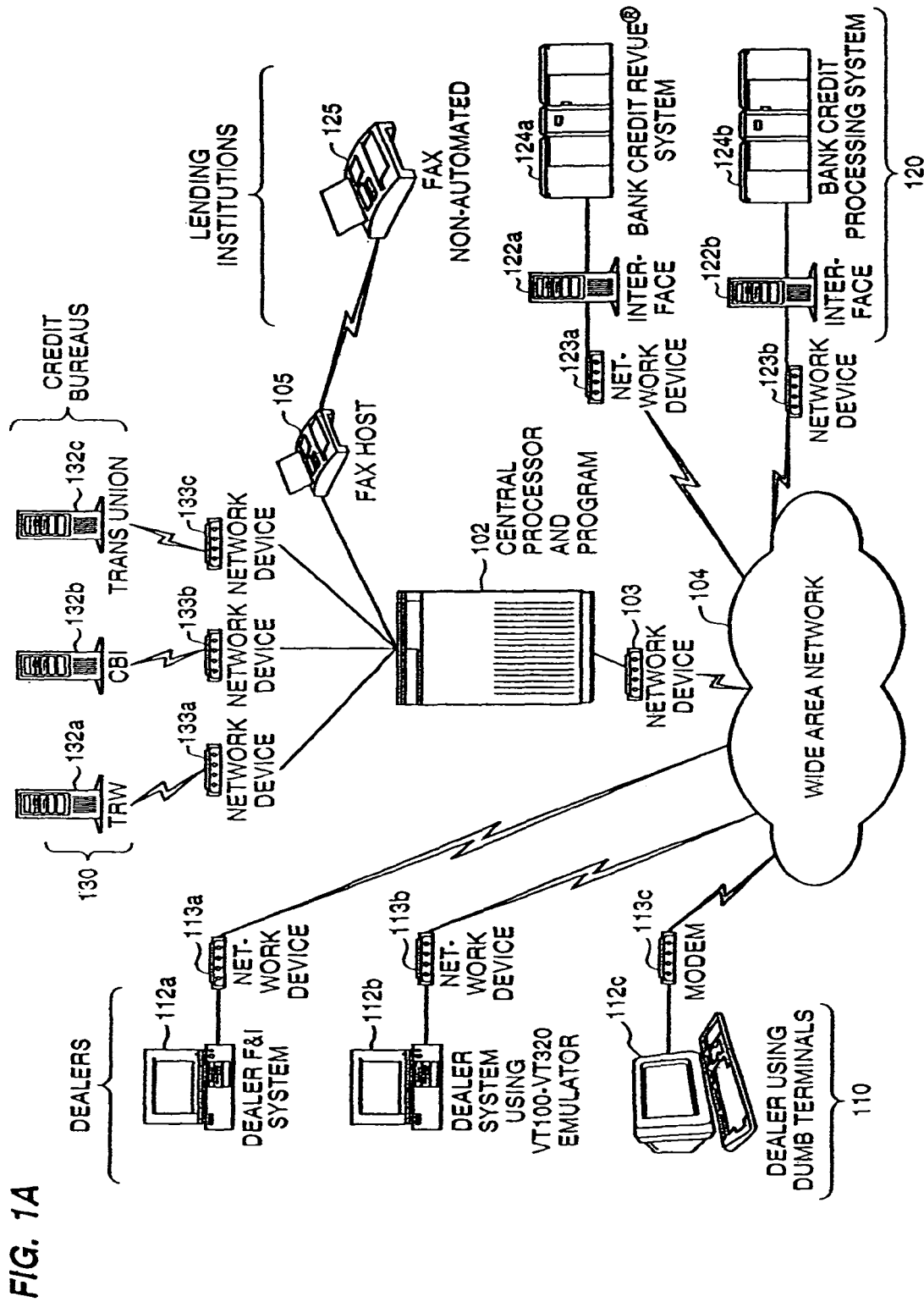
FIG. 1A is an illustration of a credit application and routing system according to an exemplary embodiment of the invention.
Figure 1B:
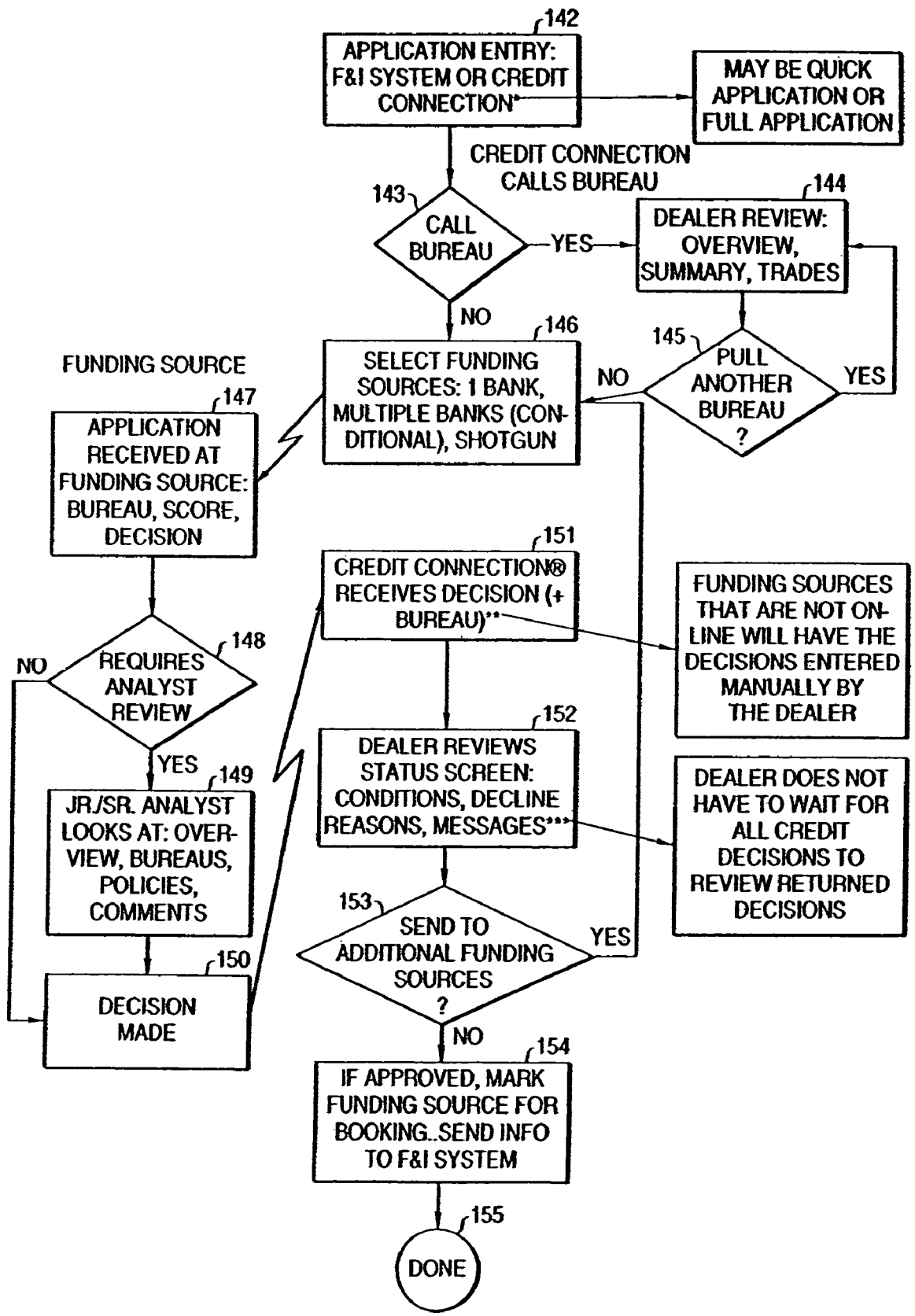
FIG. 1B is an illustration of processing flow in an exemplary embodiment of the invention.

FIG. 1B is an illustration of processing flow in an exemplary embodiment of the computer program aspects of the invention. As already noted above, "Credit Connection.®." is used herein to refer to a commercial embodiment of the present invention. Starting with block 142, a credit application is entered, either indirectly through the dealer F&I system off-line from the Credit Connection.®. host computer, or directly to the host computer system according to the present invention, i.e., on-line directly to the Credit Connection.®. host. Off-line entering of application data advantageously provides for transfer to one or more funding sources at a time when it is most convenient for the dealer and/or for the funding sources. Flexibility in where an application is entered is provided by allowing dealers to enter their applications either on-line, directly into the present invention's centralized system or off-line in F&I software.

The basic application format is the standard CBA (Consumer Bank Association) application, however the application can be a full application, or a "quick" application, that is, an abbreviated application where a dealer enters just enough information to call a credit bureau. The dealer is able to enter additional information to complete the application at a later time.

The quick application option permits a dealer to enter just enough information to call a credit bureau, for example. Applicant name, address, social security number, and date of birth, for example would be included for each applicant, as well as "critical" scoring fields, such as own/rent, time at residence, income, etc., which could, however, be skipped if calling a credit bureau is the only purpose of the quick application entry. The dealer is able to "convert" a quick application to a complete application, for example, by selecting the modify option and adding/modifying information for one section of the application, or selecting to update each section in turn.

At the end of application entry, the user can immediately choose to send the application (to a default lender), select a lender from a displayable list of possible lenders, or call a credit bureau.

Once entered at block 142, a decision is made at block 143 whether to call, that is, connect to, a credit bureau. If a credit bureau is to be called, the bureau is called and a credit report retrieved. Flow then goes to block 144.

Figure 3A:
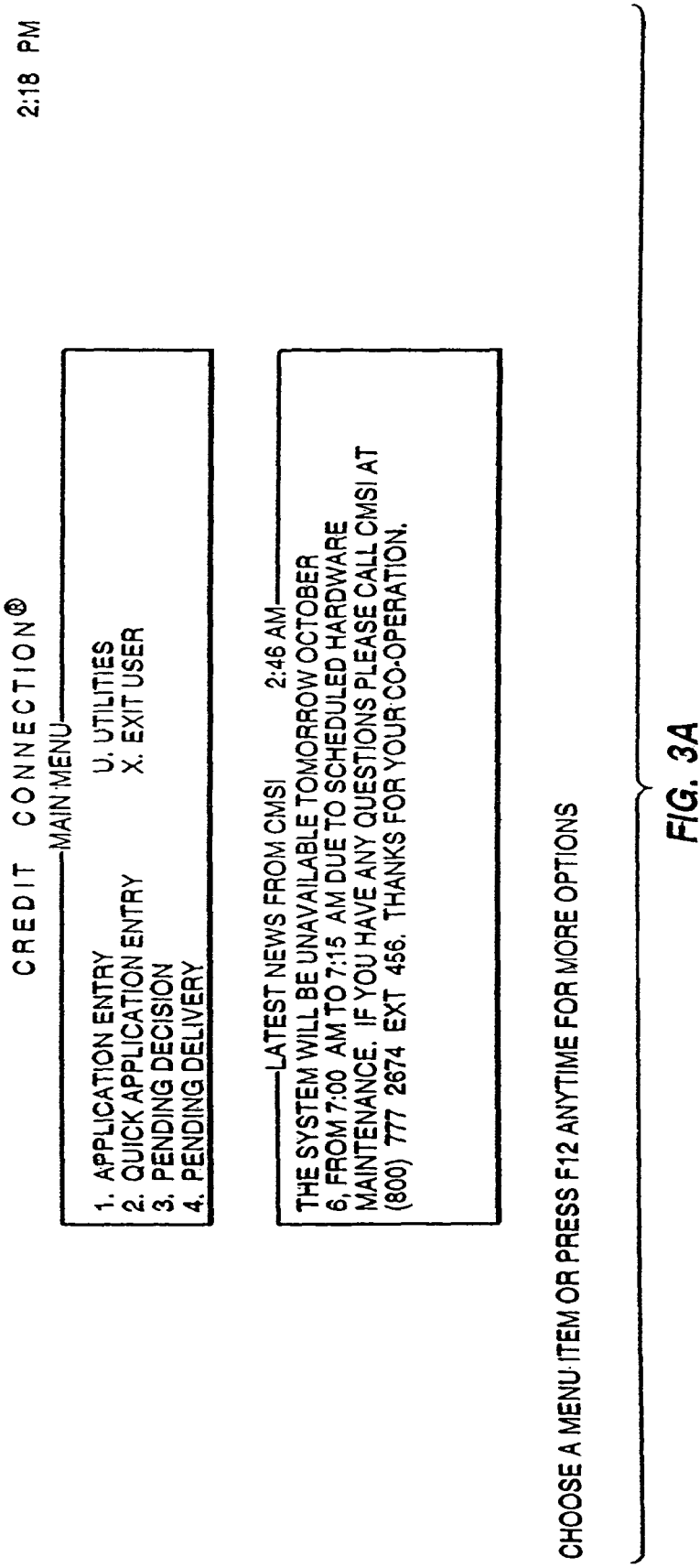
FIGS. 3A to 3AK are representative screens of the type which would be displayed in a credit application and routing system according to an exemplary embodiment of the invention.

In block 144, the dealer has the ability to review the credit bureau information, including an overview, summary and itemized trades. (The lender can also selectively review the status of credit applications from the dealers with the present invention). Examples of screens displaying the credit bureau information are illustrated in FIGS. 3A to 3AD, and will be described in greater detail later. If another credit bureau is to be accessed (pulled), as decided at 145, block 144 is repeated. A dealer may want to access another credit bureau if the previous report obtained is inconclusive or incomplete.

It is noted that currently, a funding source pulls a credit report or reports on an applicant itself, however, the present invention has the capability of sending the dealer obtained credit report information to the funding source along with the credit application information, should changes in funding source credit policies, procedures, laws and/or regulations change.

On the other hand, if no other credit bureau is to be accessed as determined at 145, then flow branches to the select funding sources block 146. If the decision at block 143 was not to call a bureau, flow also proceeds to block 146.

As already mentioned, the present invention provides flexibility in funding source selection, and routing, i.e., sequencing and timing. Dealer selected defaults for source and routing are provided at installation, but can be overridden on a case-by-case basis.

In block 146, a funding source (or sources) is selected to send the credit application, along with credit bureau information, if applicable. If multiple sources are to receive the credit application, then the timing and order of sending is also selected, that is, the routing of the credit application. Routing selections include one funding source at a time in sequence until a positive decision is returned or until a set time has elapsed (conditional), or all funding sources at once (shotgunning), for example. However, it should be remembered that one objective of the present invention is to reduce the need for dealers to shotgun applications by reducing the time required to obtain a credit decision from a funding source, for example. Therefore, a dealer can advantageously configure the system defaults so that shot-gunning is not permitted by its users, e.g., F&I personnel.

Ideally, a dealer enters the credit application data electronically, either on-line or off-line, and directs the system to send the application to a primary funding source. However, since efficient service to customers is paramount to the dealer, the ability to automatically send the application to another funding source after an unacceptable period of time has elapsed since sending it to a previous funding source, permits the dealer to reduce the time needed to close a deal.

The present invention can thus automatically route the application to the next funding source using either a time delay as determined by the dealer, or using the application's status.

The present invention allows a dealer to pre-set the lenders to whom an application is to be sent and to determine the conditions when the application is automatically sent to a second or third lender. However, the dealer can also elect to review a decision before sending the application to the next lender in the sequence.

When the operations in block 146 have been completed, that is the selecting of a funding source and the selecting of the routing for the credit application, the credit application is transmitted and flow is transferred to the funding source, in particular, block 147.

Once the dealer calls a specific credit bureau or a credit bureau is transferred from a lender, that bureau is never replaced by another bureau unless the dealer chooses to recall the specific bureau.

As illustrated at blocks 147 to 150, the funding source receives the application with interface 122a, for example, and an initial decision is made by the funding source's credit processing system 124a. If the funding source requires an analyst's review of the credit application and initial decision, as determined at block 148, then flow proceeds to block 149, where the analyst conducts the review. Once the review is concluded, or if no analyst review was required, flow proceeds to block 150 and the final decision is transmitted back to the central processor of the credit application and routing system at block 151. Of course, if the funding source is not using the system according to the present invention, or does not return decisions on-line for whatever reason, the decision would have to be manually entered by the dealer.

The present invention ideally allows a dealer to enter and submit applications, pull credit bureau information using minimum input, review summarized and analyzed credit bureau information in a readable format, track the status of all applications to all banks, either as a group or singularly, direct and redirect applications to banks, make changes to previously submitted applications, book an application, and use screens and information similar to a bank's Credit Processing System, e.g., CreditRevue.®. or other credit processing system, screens when talking to bank staff about an application. Likewise, a funding source can view similar screens when talking to the dealership about an application. If the funding source is using automatic decision making and scoring, the dealer can wait on-line for application acceptance, rejection or request for additional information.

At block 152, the dealer reviews a display of the status of the credit application, e.g., granted, granted with conditions, or declined and reasons why declined. If multiple decisions are being waited for, the dealer can review them individually as they arrive and does not have to wait for all credit decisions to be returned. Exemplary display screens will be described later with reference to the figures showing them.

Advantageously, with the system according to the invention, the dealer will know immediately whether the application was received at the bank and if there were any fields on the application that were not entered. Further, the present invention enables the dealer to see exactly where each application is in the funding source process. The present invention keeps a constant update on all applications and keeps track of which applications were sent to which funding sources and when. The status indicates when the application was received by the funding source and is available to the dealer and the funding source. The dealer knows readily exactly which funding sources the application was sent to.

At block 153 a decision is made whether the credit application should be sent to additional funding sources, for example, where a single funding source was initially selected, but it either declined the loan, or placed unacceptable conditions on the loan. If additional funding sources are to be selected, flow returns to block 151 until acceptable approval of the credit application is achieved.

If a dealer modifies an application after it has been sent to a lender, the present system stores only one copy of the application, i.e., the modified version. However, if the modified application is subsequently resubmitted to the lender, it is sent as a new application.

At block 154, if the credit application was approved and the terms and conditions are acceptable, the associated funding source is marked for booking. Circle 155 indicates the credit application processing is done.

Figure 1C:
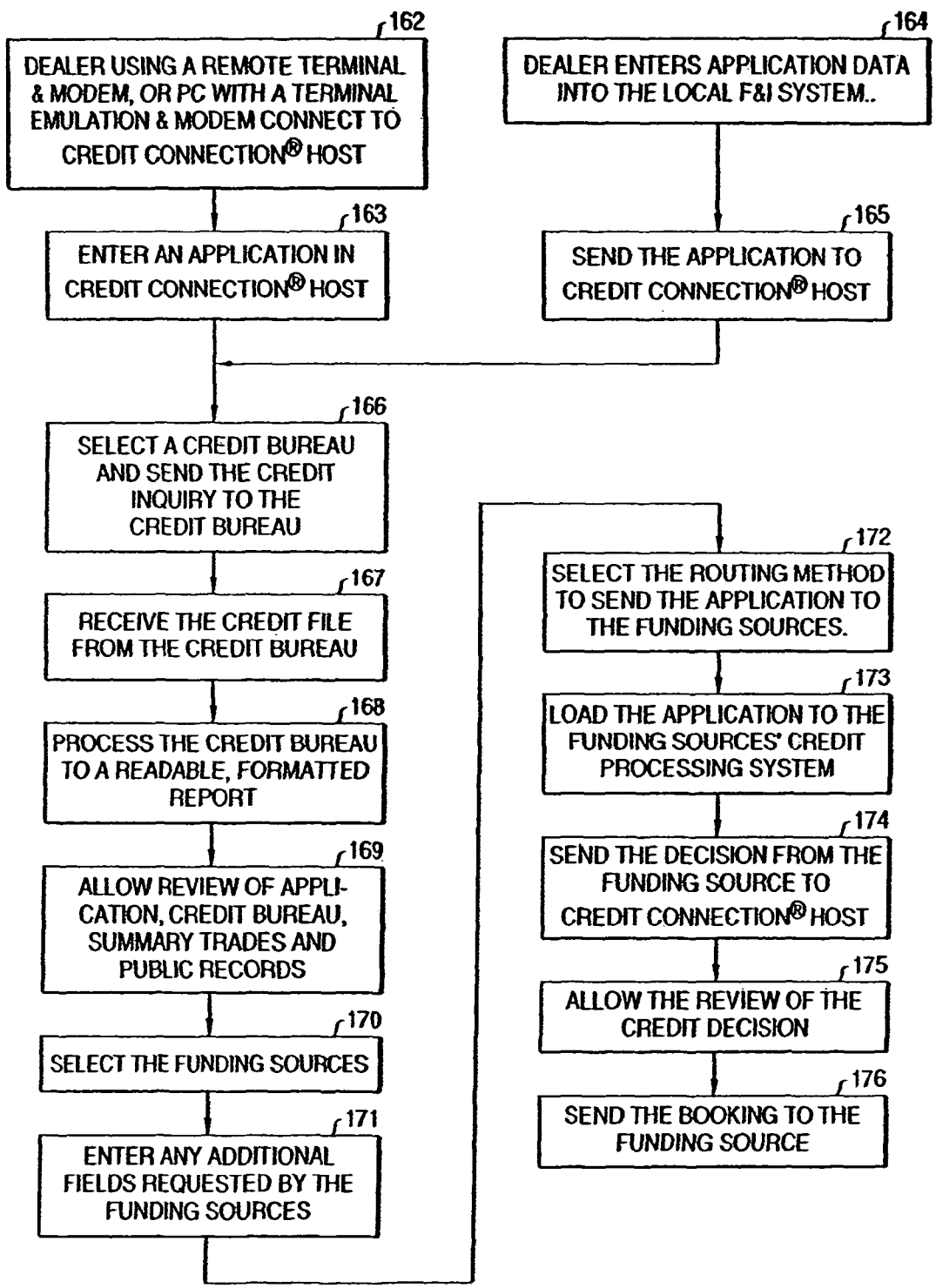
FIG. 1C is an overview processing flow chart for an exemplary embodiment of the invention.

FIG. 1C presents an overview of processing flow for an exemplary embodiment of the invention from another perspective. At block 162, the dealer, using a remote terminal and modem (112c, 113c), or personal computer emulating a terminal, for example, connects with the central processor (102) and logs-on to the system. At block 163, an application is directly entered interactively with the system. On the other hand, if an application is entered into the dealer's local F&I system, i.e., block 164, at block 165, the previously entered application data is sent to the central processor (102) of the system.

At block 166, a credit bureau (or bureaus) is selected and a credit inquiry is sent. At block 167, a credit file is received from the credit bureau, processed at block 168, and reviewed at block 169.

Funding source (or sources) is selected at block 170, and any additional information over and above the basic information entered on the credit application, is requested and entered in block 171. The method of routing to send the application to the selected funding sources is selected in block 172, and in block 173, the credit application, along with additional information, if it was required, is sent to and loaded on the funding source's credit processing system according to the routing method selected.

After processing at the funding source, a decision is sent back at block 174 to be reviewed by the dealer at block 175. If the decision was positive and the terms and conditions acceptable, the booking is sent to the funding source at block 176.

With reference to FIG. 2 which is a high-level flow chart of some of the functions of a program implementing a credit application and routing system according to an exemplary embodiment of the invention, the credit application and routing process will now be described in more detail.

Steps 202 to 213 outline generally the typical steps for connecting with the credit application and routing system and then displaying a main menu. Steps 202 to 211 relate to the logging-on and transfer of an application, which was entered off-line, from a dealer F&I system to the credit application and routing system, while steps 212 and 213 relate to logging-on to the system for entering an application on-line directly from an emulator or dumb terminal. In step 202 the dealer enters application data into the dealer F&I system and in step 203 dials into the credit application and routing system host. The term "dials into" is being used in a general sense to cover any of a variety of ways of connecting to the host and thus should not be construed as limited to a telephone dial up, for example, although that may typically be the case.

At step 204, the dealer system sends a dealer ID. This step should be construed as generally representing other typical security measures, such as verifying the ID, requesting a password, verifying the password, etc. Secure access to the credit application and routing system is provided by dealer configurable ID's and passwords, and a hierarchy of levels of access, for example. Multiple levels of security are thereby facilitated.

Further, the present invention provides security between the funding source and a dealership, i.e., dealers will not be able to directly connect to the funding source, since everything must go through the system according to the present invention. The present invention thus can provide a secure interface between the dealer and the funding source. Only authorized dealers will be able to send applications to the funding source via the present invention. The present invention therefore meets the security expectations of the banks.

As part of system security, some functions may be defined so they can be turned on or off, and users can only execute those functions which are on for them. Examples of functions which may be protected include entering applications, selecting funding sources, transmitting applications, looking at credit bureau reports, calling bureaus, reviewing lender decisions, and pulling reports.

If an application is to be sent as decided at step 205, flow proceeds to step 206 where a transfer mode is enabled, and step 207 where the transfer of the credit application to the credit application and routing system takes place.

The present invention also provides for editing of an electronic application before or after it has been electronically sent to a funding source. Interactive, on-line application data entry, editing and review are facilitated. The present invention further facilitates application entry customization and verifies that specific data fields are entered on the application prior to sending it to the bank. Each bank can add customized data elements to the standard application, thus customizing the application being sent.

Figure 2D:
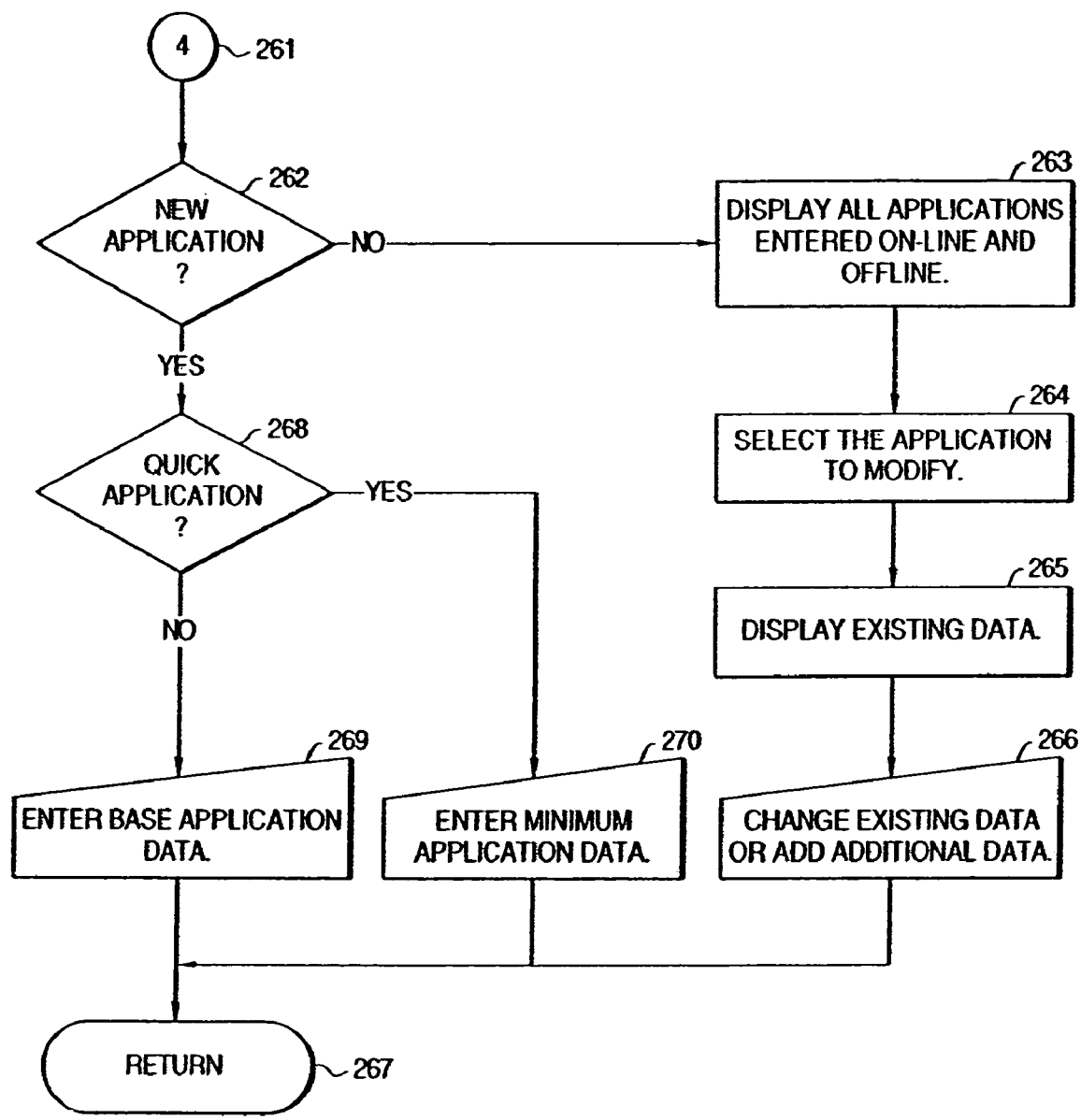
FIG. 2D illustrates in flow chart form the Enter/change Application (4) branch of FIG. 2.

After the transfer is complete, a switch is made to an interactive mode as indicated at step 208. At step 209, the user is prompted for a user ID. The user enters the user ID in step 210, in like fashion with steps 203 and 204, and the credit application and routing system main menu is then displayed, as indicated at step 211. If the dealer is going to enter a new application on-line from a dumb terminal or emulator device, for example, the process begins at step 212, where the dealer dials into the credit application and routing system host and enters an ID, in a like fashion with steps 203 and 204, described above. Flow then proceeds to step 209 where the user ID is entered and where the credit application and routing system main menu is display. This dealer would then select application entry from the main menu (illustrated in FIG. 3A), indicated as circle 4 "Enter/change Application" in FIG. 2. The flow of the application entry (and change) process is illustrated in FIG. 2D and will be described in detail below.

The credit application and routing system main menu provides access to a variety of operations, and representative ones of these are shown as the circles at the bottom of FIG. 2. Circle 1, "Bureaus," represents the operations related to a credit bureau, such as selecting a bureau to access, reviewing the credit information from the bureau, selecting another bureau, etc. Circle 2, "Funding Selection," represents the operations related to funding sources and the operations related to sending a credit application to one or more sources, such as selecting "shot-gunning," conditional sending to multiple sources, or sending to a single funding source, for example. Circle 3, "Send Application," represents operations related to sending an application to a funding source, such as formatting the data, activating a communications routine, etc. Circle 4, "Enter/change Application," represents operations related to entering and/or editing a credit application on-line. Additional optional operations, such the loan vs. lease analysis, the calculator, and the news article access, mentioned above in the summary section, are also provided for, however, their illustration and detailed description is not necessary for an adequate understanding of the invention.

Optional additional useful features, such as a loan calculator, a loan vs. lease analysis spread sheet, access to a vehicle pricing guide, news article retrieval, a pop-up calendar, E-mail, etc., are provided. Lender broadcasts provide a lender with the capability of sending new product news, for example, to any or all dealers, individually or in groups. Funding sources can easily and quickly develop and deploy new products and enhancements, and initial marketing of new products can occur through the broadcast news on the present invention. Enrollment of new products can easily occur with the present invention system. Other electronic news and broadcasts to the entire dealer community, and/or electronic news to a particular dealer by the system administrator is also possible.

FIG. 2A relates to the bureau functions represented by circle 1 in FIG. 2. Assuming at least minimal credit application data for an applicant has been entered, the dealer can select the bureau to access, call the bureau selected, and review the bureau credit data for the applicant in different ways, such as an overview, a summary, or in detail by individual trades. Exemplary displays of credit data are illustrated in FIGS. 3U, 3V, 3W, 3X and 3Y. The dealer can further select another credit bureau to call if, for example, the credit information from one bureau is inadequate for some reason.

FIG. 2A illustrates the bureau selection and send process and is described as follows. Flow begins at circle 1 (215) and proceeds directly to decision 216 on whether to use defaults or not. If the bureau defaults are to be used, flow proceeds to block 217 where the default bureaus are called, and 218 where the received bureau data is formatted and displayed in the inventions summary display, then proceeding to the decision 219 on whether the dealers wants to call additional bureaus. If the dealer wants to call additional bureaus, the flow proceeds to block 220 and block 221 where the bureaus are called and data is displayed the same as in 217 and 218. Following the calling and displaying of the bureaus flow proceeds at block 222, whether to display the bureau data in TTY format. If the dealer wants to display the bureau in TTY format proceed to 223 where the data is displayed in TTY format then to decision 224 as to whether to display additional bureaus in the TTY format. If the dealer does not want the TTY format of the bureau or the dealer has displayed the bureau data in TTY format, the flow proceeds to decision 225 as to whether to display the bureau summary format or not. If the dealer wants to see the summary format, flow proceeds to 226 where the bureau data is formatted and displayed in the summary format then to decision 227 as to whether to display additional bureaus in the summary format, then to 228, to return to main menu. If the dealer does not want the summary format, the flow proceeds directly to 228 to return to main menu.

With reference to FIG. 2B, the Funding Selection operations represented by circle 2 in FIG. 2 are illustrated. Flow begins at circle 2 (231) and proceeds directly to a display of a lender default list 232, and then default routing selections 233 are displayed. Flow proceeds to decision 234A on whether to use dealer defaults or not. If not using the dealer defaults, flow proceeds to 234B to choose lenders and routing, and then to decision block 235.

If the dealer defaults are going to be used (yes), flow proceeds directly to decision block 235 where it is determined if all data is entered, i.e., if processing of selected lenders is completed. If the dealer defaults are not going to be used, or after new lending sources are selected, flow proceeds from decision block 235 (no) to decision block 236 where it is determined whether a funding source requires any additional credit data. If no additional data is required (no), flow returns to decision block 235 to determine if processing of selected lenders is complete.

However, if additional data is required (yes), flow proceeds to decision block 237 where it is determined whether the additional data has been appended to the credit application, i.e., if any additional data has not been entered. If the additional data has been entered, i.e., if there is no additional data to enter, then this funding source selection process is complete and flow returns from decision block 237 (no) to decision 235 to determine if the processing of all lenders is complete. If the additional data has not been entered (yes), then flow proceeds to block 238 where the additional data for the funding source is entered. After the additional data has been entered, flow returns to decision 235 to determine if the processing of all lenders is complete, and the process is repeated for the next lender until all lenders have been processed and this phase is done (239). Of course, after the application has been entered on-line, the dealer can choose to send the application immediately to a funding source using system defaults.

FIGS. 2C-1 and 2C-2 illustrate the Send Application process, circle 3 in FIG. 2. Flow begins at circle 3 (241) and proceeds to decision 242 on whether to send to one lender at a time. If the application is to be sent to all of the selected lenders at the same time, flow proceeds to decision 243 to determine if there are any lenders left to send the application to. If there are additional lenders to be sent to (yes), flow proceeds to decision 244. If the lender is electronically connected to the inventive system (a Credit Connection.®. "CC" lender, for example), flow proceeds to block 245 where the application is electronically transmitted to the lender, then returns to block 243 to decide if more lenders to send to remain. If the lender is not electronically connected to the invention, flow proceeds from block 244 to 246 where the application is faxed to the lender, and flow then returns to 243.

If no additional lenders are to receive the application, flow proceeds from block 243 to 247 and returns to the main menu.

If the application is to be sent to one lender at a time, flow proceeds from block 242 to circle 3A in FIGS. 2C-1 (248), and picks up in FIGS. 2C-2.

FIGS. 2C-2 illustrates the flow where all lenders are sent the application at different times. Flow begins at Circle 3A (248) and proceeds to decision 250 where it is determined if all lenders have received the application. If all lenders have been sent the application (no), flow proceeds to 251 to return to the main menu.

If some lenders remain to receive the application (yes), flow proceeds to decision 252 where it is determined if the last lender was electronically transmitted to. If the last lender was transmitted the application electronically (yes), flow proceeds to decision 253 to determine if a decision has been received from the last lender. If a decision has not been received (no), flow proceeds to decision 254 to determine if a predetermined time has expired since sent to the last lender after which the application is to be sent to the next lender. If time has not expired (no), flow proceeds back to decision 253 to determine if a decision has been received from the last lender. However, if the predetermined time has expired, flow proceeds from decision block 254 to 257 to determine how to send to the next lender, i.e., electronically or by fax.

If a decision has been received from the last lender as determined at block 253, flow proceeds to decision 255, where if the application is approved (yes) flow proceeds to 256 and returns to the main menu. However, if application was not approved (no), flow proceeds to decision 257 to determine how to send the application to the next lender. Decisions 257, 258 and 259 represent the same process and procedures as described with respect to items 244, 245 and 246 in FIGS. 2C-1.

Therefore, FIGS. 2C-1 and 2C-2 illustrate the send application routing process, circle 3 of FIG. 2. A decision on whether or not to use the dealer's default routing is made. If the default is used, flow returns to the main menu. If the default routing is not going to be used, new requirements for routing are entered and flow then returns to the main menu. If more than one funding source is requested, the present invention can route the application to the next funding source either manually or automatically, after a predetermined time delay or a application rejected response, for example. The various types of routing have been described above and include "shot-gunning," sending to each source in turn if the previous funding source declined (rejected) the application, send to each source if the previous funding source has not responded in "N" (a selectable number of) minutes, send to each source in turn if the previous funding source declined or conditioned the application, or any combination of the last three items. The present invention can automatically route the application to the next funding source using either a time delay as determined by the dealer, or using the application's status.

With reference to FIG. 2D, the Enter/change Application operations, represented by circle 4 in FIG. 2, are illustrated. Flow begins at circle 4 (261) and proceeds to decision 262 where it is determined whether this is a new application, or an already entered application to be edited. If the latter is the case (not a new application), flow proceeds to block 263 where a list of all the existing dealer applications entered on-line and off-line are displayed, and then to block 264 where an existing application is selected from the list of currently available applications. At block 265, the application selected is displayed and changing or adding data to the selected application is represented by block 266. When the editing is completed, flow then returns 267 to return to the main menu. Credit applications which were entered on-line or off-line can be accessed and edited.

On the other hand, if a new application is being entered as determined in decision 262 (yes), then flow proceeds to the block 268 decision where a decision to enter a "Quick" application is made. If the Quick application is determined (yes), flow proceeds to block 270 where the Quick application (minimum) data is entered. If the credit application is not to be a Quick application, then flow proceeds to block 269 where base application data is entered. After either type of new application data has been entered, flow proceeds to 267 to return to the main menu.

Various reports are available on-demand. Some basic reports may be pre-compiled for a dealer so that they can be viewed on-line. Optional additional useful features, such as a loan calculator, a loan vs. lease analysis spread sheet, access to a vehicle pricing guide, a pop-up calendar, E-mail, etc., are provided and accessible through menu selection or function key activation. Detailed illustration of these features is not necessary for a complete understanding of the invention.

An on-line lender encyclopedia is available on the system according to the invention. The encyclopedia is a database of lenders which identifies various lenders and summaries specific relevant information about each one, such as policies and credit guidelines for example. Dial-in function for lenders allows them to add/update/delete entries from their encyclopedia, and dealers can see entries for lenders with whom they are signed up.

Next, a series of exemplary display screens will be discussed. Interactive use of the system is menu driven. Beginning with FIG. 3A1, this is an example of a first interactive screen where a user would enter their user ID and password. After correctly entering user ID and password, the next screen, for example as shown in FIG. 3A, would be a main menu including news from the system administrator below it. This is typical of a first screen a user would see after logging onto the system in accordance with an embodiment of the invention.

The main menu according to FIG. 3A has six choices: (1) Application Entry; (2) Quick Application Entry; (3) Pending Decision; (4) Pending Delivery; (U) Utilities; and (X) Exit the system. As indicated in the prompt message below the news block, a menu item may be chosen, or function key F12 can be pressed for more options.

Figure 3B:
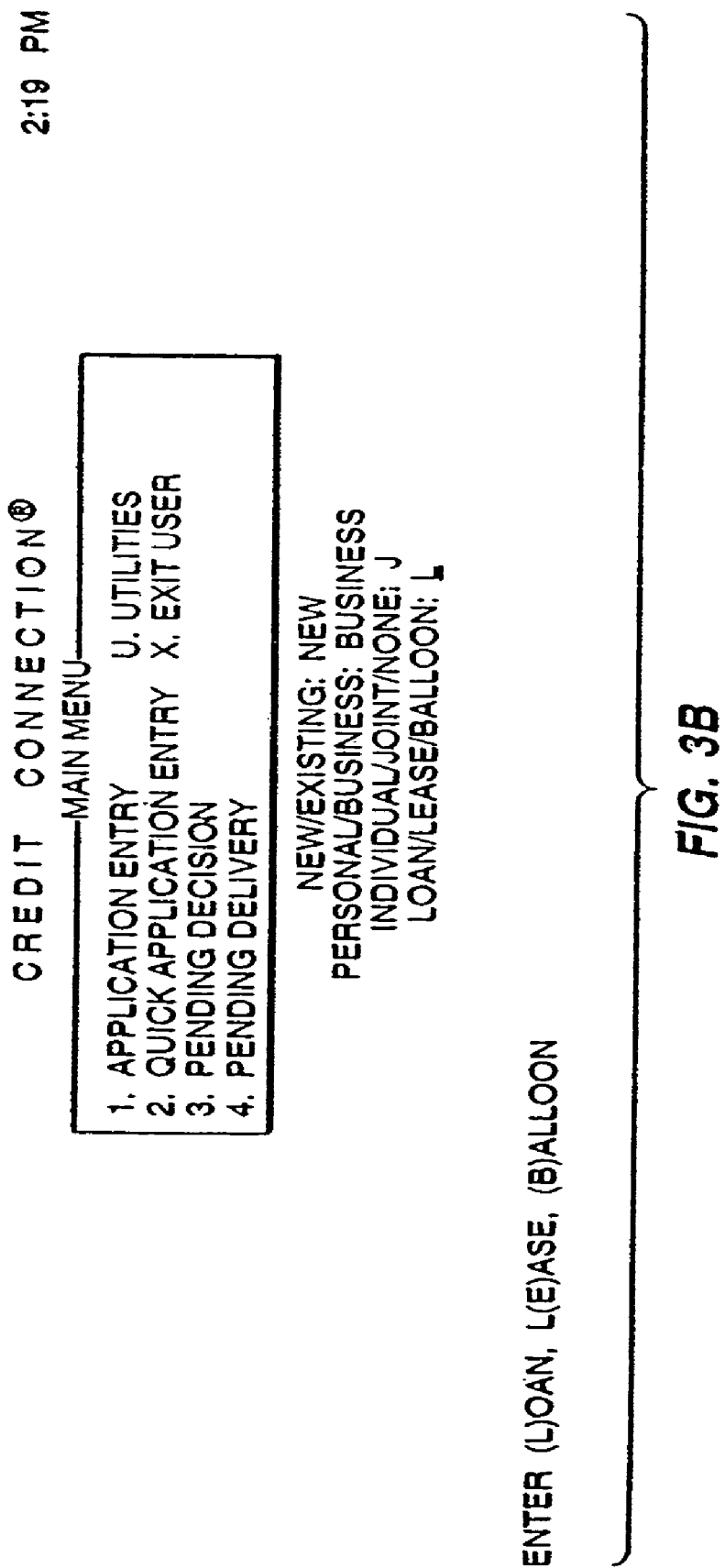

FIG. 3B illustrates the display after pressing "1" for Application Entry. Below the main menu, four application parameters are displayed which can be changed by the user. As displayed, the first parameter can be either "New" or "Existing: and "New" is the current parameter entry. This means the system is expecting entry of a new application, rather than editing of an existing application.

The next parameter, "Personal/Business" is currently "Business" indicating the application will be a business type credit application rather than a personal type.

The next parameter, "Individual/Joint/None" is currently "J" for joint, indicating the application is for a joint business, rather than "Individual" for a single business, or "None."

The final parameter, "Loan/Lease/Balloon" is currently "L" indicating the application is for a loan, rather than for a lease or a balloon type of arrangement.

FIGS. 3B(1) to 3L are the 10 parts of the application to be filled in, according to an embodiment of the invention. The individual parts to be filled in are dependent on the type of application and applicant. FIG. 3B(1) illustrates a screen with a first part of the application to be filled in with business information, only used for a business type application.

FIG. 3C illustrates a screen where the applicant's name, address and other demographic information is entered.

FIG. 3D illustrates a screen where the applicant's employment information is entered, and FIG. 3F is a screen for entering credit and creditor information.

FIGS. 3G, 3H and 3I are screens where a co-applicant name, address, employment and credit information would be entered.

Figure 3L:

Automotive Collateral information is entered on the screen shown in FIG. 3J, Finance Information is entered using the screen illustrated in FIG. 3K, and additional information ("Comments") is entered on the screen illustrated in FIG. 3L. After all of these parts of an application are filled in, the user would return to the main menu, as shown in FIG. 3M.

Figure 3M:
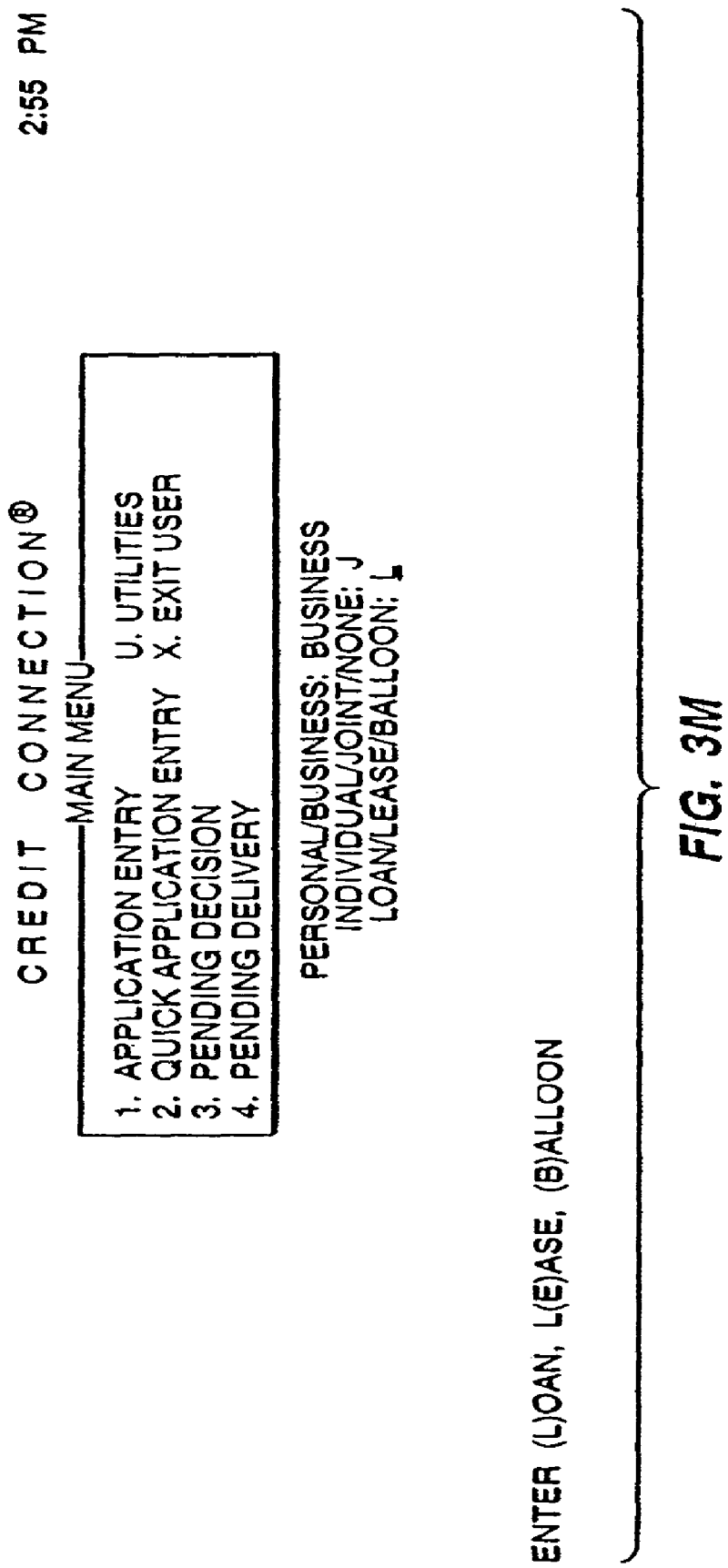
Figure 3A:
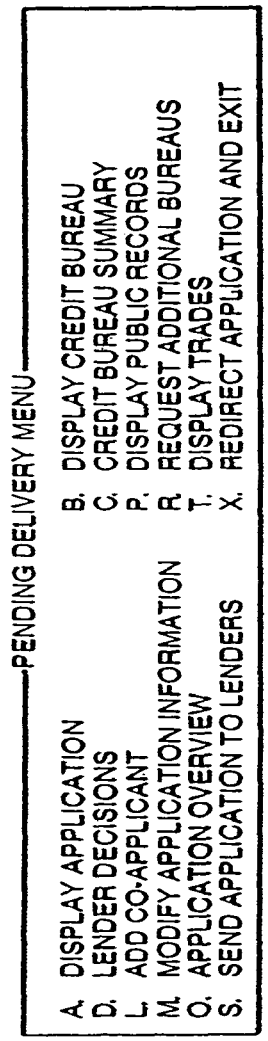

At the main menu, FIG. 3M, after selecting 2, Quick Application entry, the screen as shown in FIG. 3N would be displayed. FIG. 3N illustrates a short version of the application, where only applicant information required for a credit bureau inquiry is entered.

Selecting "Pending Decision" (item 3) from the main menu would display a list (queue) of applications pending decision, as illustrated in FIG. 3O, and a pending decision menu as illustrated in FIG. 3P. From this pending decision menu, various displays can be accessed, including items D, O, S, B, C, P, R and T, which are shown in FIGS. 3Q to 3Y.

If item D, Lender Decisions is selected, a screen such as that shown in FIG. 3Q will be displayed having in particular a list of lenders, application numbers and decisions. The list also has the contact at the lender and other useful information.

Selecting item O, Application Overview, from the pending decision menu displays a screen such a that shown in FIG. 3R. As is apparent, an overview of an application is displayed including applicant information, auto/loan information and credit bureau information.

If item S, send application to lenders, is selected from the pending decision menu, a screen such as that shown in FIG. 3S is displayed showing a list of possible lenders. FIG. 3T displays at the bottom of the figure a box labelled "Enter the Lenders" having a field for a first, second and third lender, and for a routing selection, i.e., "Send to All/One by One." From this screen, a dealer would select up to three lenders and the routing option for an application.

Various credit bureau displays are also accessible from the pending decision menu. For example, selecting item B, Display Credit Bureau, displays a screen such a that shown in FIG. 3U; selecting item C, Credit Bureau Summary, displays a screen such a that shown in FIG. 3V; selecting item P, Display Public Records, displays a screen such as that shown in FIG. 3W; selecting item R, Request Additional Bureaus, displays a screen such as that shown in FIG. 3X; and selecting item T, Display Trades, displays a screen such as that shown in FIG. 3Y.

FIG. 3Z shows a Select Next Station menu box with three items: Pending Decision, Pending Delivery and Completed. The user can manually move an application between the different stations instead of allowing the inventive system to automatically move it. Each of the stations have been or will be explained in this disclosure.

Returning to the Main Menu shown in FIG. 3B, selecting item 4, Pending Delivery, displays a screen such as that shown in FIG. 3AA listing applications which are pending delivery, and a pending delivery menu illustrated in FIG. 3AB with a variety of menu selections, and a Lender List as illustrated in FIG. 3AC. The pending delivery menu provides the same selections as the pending decision menu FIG. 3P.

Returning to the Main Menu shown in FIG. 3B, selecting item U, Utilities, causes Utilities menu FIG. 3AD to be displayed. As an added level of security, only specific dealer staff has access to the utilities menu. Selecting D, Dealer Setup, displays a screen such as that shown in FIG. 3AE with current dealer setup information listed. From this screen, a user can update the dealer setup information.

Selecting L, Lender Setup, from the Utilities Menu shown in FIG. 3AD, displays a screen such as that shown in FIG. 3AF with current lender setup information listed. From this screen, a user can update the lender setup information, add or delete a lender.

Selecting U, User Setup, from the Utilities menu, shown in FIG. 3AD displays a screen such as that shown in FIG. 3AG with a list of current users for this dealer. From this screen a user can update a user's information, add or delete a user.

A typical function key menu is illustrated in FIG. 3AH providing access to additional features. For example, selecting item 3, Lender Lookup, from this menu displays the list of lenders shown in FIG. 3AC. Selecting item 6, Search, from the function key menu displays the screen shown in FIG. 3AI providing search fields and beginning and ending date search constraints. FIG. 3AJ illustrates an example of a search result display initiated from the screen of FIG. 3AI.

Selecting item 8, News, from the function key menu, display a list of news items which can be selected and any system news, such as is illustrated in FIG. AK.

A dealer table at the lender may be provided with flags for:

(1) does the lender share bureau data on declines? and (2) does the lender share bureau data on non-declines?

A lender can save an ARF file (Automated Record Format) for credit bureaus. This file can be transferred to the system according to the present invention which will read the ARF file and load the data into the system's database. ARF files are used by the system to create the bureau summary formats as described above.

Figure 4:
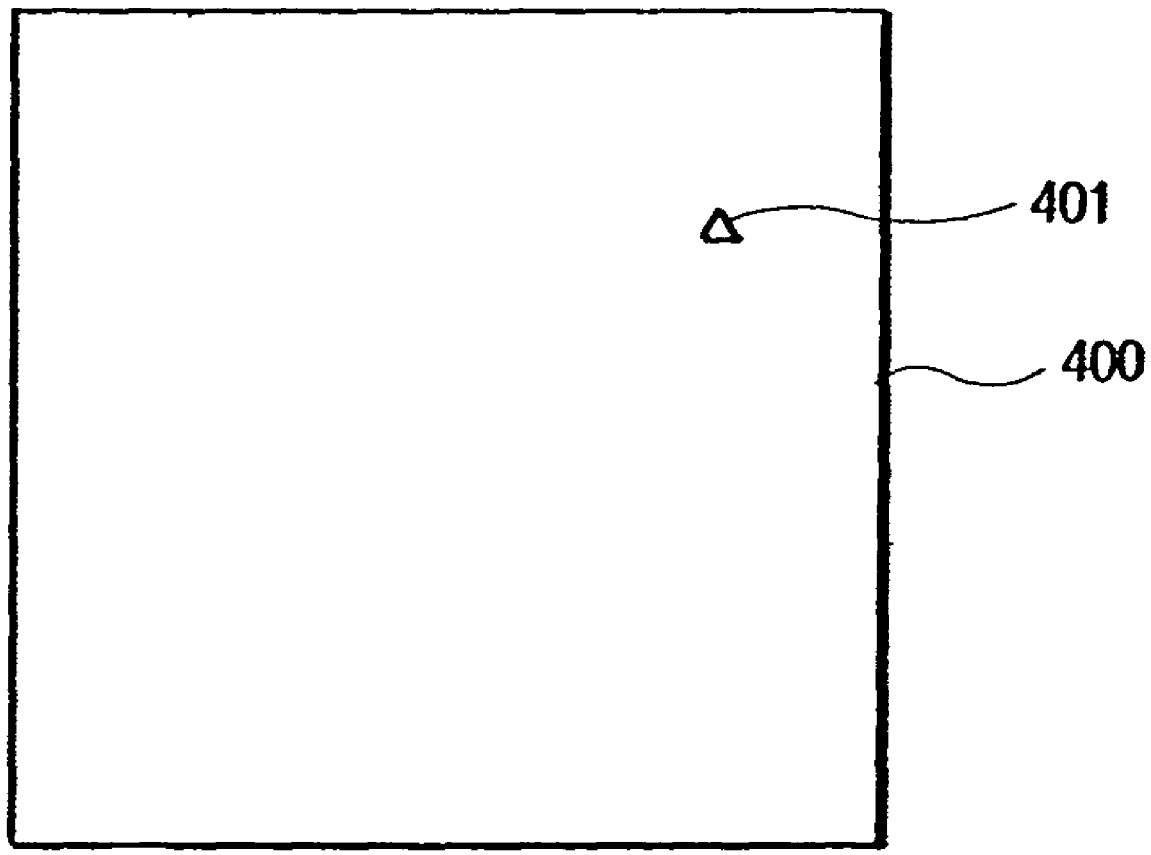
FIG. 4 illustrates a computer readable storage medium having a substrate physically configured to represent a computer program for causing a computer to provide a credit application analysis and decision routing system.

FIG. 4 illustrates a computer readable storage medium 400 having a substrate 401 physically configured to represent a computer program for causing a computer to provide a credit application analysis and decision routing system. The medium 400 could be a floppy disk or disks, optical disk or disks, computer readable magnetic tape or tapes, semiconductor read only memory or memories (ROM), or a programmed logic array or arrays, for example.

It will be apparent to one of ordinary skill in the art that the manner of making and using the claimed invention has been adequately disclosed in the above-written description of the referred embodiment taken together with the drawings.

It will be understood that the above description of the preferred embodiment of the present invention is susceptible to various modifications, changes, and adaptations, and the same are intended to be comprehended within the meaning and range of equivalents of the appended claims.

The present invention allows a bank to have one standardized network and application interface to all of its auto dealers regardless of the dealer's F&I system, however as would be readily appreciated by one skilled in the art, this can be expanded to include non-automotive customers.

What is claimed is:

1. A computer readable medium comprising computer instructions to receive and route credit application information, said instructions comprising:
   executable instructions for receiving a credit application from at least one remote application input location;
   executable instructions for selectively forwarding said received credit application to a plurality of funding sources;
   executable instructions for receiving a funding decision from said plurality of funding sources;
   executable instructions for receiving content from said plurality of funding sources; and
   executable instructions for delivering said content to said at least one remote application input location.

2. A computer readable medium as in claim 1, further comprising:
   executable instructions for receiving from said plurality of funding sources content targeted to select one(s) of said at least one remote application input location; and;
   executable instructions for delivering said targeted content to said select one(s) of said at least one remote application input location.

3. A computer readable medium as in claim 1, wherein content is selected from the group consisting of product information, new and used vehicle RATE PROGRAM pricing and announcement messages.

4. A computer readable medium as in claim 1, further comprising executable instructions for generating at least one defined group of said plurality of funding sources wherein said content is delivered to said at least one defined group.

5. A method for receiving and routing credit application information, comprising the steps of:
   receiving a credit application from at least one remote application input location using a network device;
   selectively forwarding, by a processor, said received credit application to a plurality of funding sources;
   receiving a funding decision and content from said plurality of funding sources using a communications interface;
   receiving content from said plurality of funding sources using the communications interface; and
   delivering said content to said at least one remote application input location using the network device.

6. A method as in claim 5, further comprising the steps of:
   receiving from said plurality of funding sources content targeted to select one(s) of said at least one remote application input location using said communications interface; and;
   delivering said targeted content to said select one(s) of said at least one remote application input location using said network device.

7. A method as in claim 5, wherein said content is selected from the group consisting of product information, new and used vehicle RATE PROGRAM pricing and announcement messages.

8. A method as in claim 5, further comprising the steps of designating, by said processor, at least one defined group of said plurality of funding sources and delivering said content to said at least one defined group using said communications interface.

9. An apparatus for receiving and routing credit application information, comprising:
   a network device to receive a credit application from at least one remote application input location and deliver content to said at least one remote application input location;
   a processor configured to selectively forward said received credit application to a plurality of funding sources; and
   a communications interface to receive at least one of a funding decision and said content from said plurality of funding sources.

10. An apparatus as in claim 9, wherein:
    said communications interface is further configured to receive from said plurality of funding sources content targeted to select one(s) of said at least one remote application input location; and;
    said network device is further configured to deliver said targeted content to said select one(s) of said at least one remote application input location.

11. An apparatus as in claim 9, wherein said content is selected from the group consisting of product information, new and used vehicle RATE PROGRAM pricing and announcement messages.

12. An apparatus as in claim 9, wherein said processor is further configured to generate at least one defined group of said plurality of funding sources and said communications interface is further configured to distribute said content to said at least one defined group.

* * * * *